United States Patent
Otroshi Shahreza et al.

(10) Patent No.: US 11,176,654 B2
(45) Date of Patent: Nov. 16, 2021

(54) QUALITY ASSESSMENT OF A VIDEO

(71) Applicants: Hatef Otroshi Shahreza, Shahreza (IR); Arash Amini, Tehran (IR); Hamid Behroozi, Tehran (IR)

(72) Inventors: Hatef Otroshi Shahreza, Shahreza (IR); Arash Amini, Tehran (IR); Hamid Behroozi, Tehran (IR)

(73) Assignee: SHARIF UNIVERSITY OF TECHNOLOGY, Tehran (IR)

( * ) Notice: Subject to any disclaimer, the term of this patent is extended or adjusted under 35 U.S.C. 154(b) by 13 days.

(21) Appl. No.: 16/830,747

(22) Filed: Mar. 26, 2020

(65) Prior Publication Data
US 2020/0226740 A1 Jul. 16, 2020

Related U.S. Application Data

(60) Provisional application No. 62/824,329, filed on Mar. 27, 2019.

(51) Int. Cl.
*G06T 7/00* (2017.01)
*G06T 5/20* (2006.01)
(Continued)

(52) U.S. Cl.
CPC ......... *G06T 7/0002* (2013.01); *G06N 3/0481* (2013.01); *G06N 3/084* (2013.01);
(Continued)

(58) Field of Classification Search
CPC .......... G06T 7/0002; G06T 5/20; G06T 5/50; G06T 2207/20076; G06T 2207/30168;
(Continued)

(56) References Cited

U.S. PATENT DOCUMENTS

2005/0219362 A1* 10/2005 Garoutte ............... H04N 17/00
348/180
2011/0274361 A1* 11/2011 Bovik ............... G06K 9/00664
382/224
(Continued)

OTHER PUBLICATIONS

Kim, W., et al.,"Deep Video Quality Assessor: From Spatio-temporal Visual Sensitivity to A Convolutional Neural Aggregation Network," ECCV 2018, Sep. 2018.*

*Primary Examiner* — Xuemei G Chen
(74) *Attorney, Agent, or Firm* — Bajwa IP Law Firm; Haris Zaheer Bajwa

(57) ABSTRACT

A method for quality assessment of a video that includes M video frames. The method includes repeating a first iterative process M times and extracting a score distribution for a plurality of scores. An $m^{th}$ iteration of the first iterative process, where $m \in [1,M]$, includes generating an $m^{th}$ frame-level feature set, generating a first recurrent output of a plurality of recurrent outputs based on a zeroth recurrent output of the plurality of recurrent outputs, and generating an $m^{th}$ recurrent output of the plurality of recurrent outputs based on an $(m-1)^{th}$ recurrent output of the plurality of recurrent outputs. The first recurrent output is generated by feeding a first frame-level feature set to a recurrent neural network. The $m^{th}$ recurrent output is generated by feeding the $m^{th}$ frame-level feature set to the recurrent neural network. The score distribution is extracted from an $M^{th}$ recurrent output of the plurality of recurrent outputs.

19 Claims, 35 Drawing Sheets

100

(51) Int. Cl.
  *G06T 5/50* (2006.01)
  *G06N 3/08* (2006.01)
  *G06N 3/04* (2006.01)
  *G06N 20/10* (2019.01)

(52) U.S. Cl.
  CPC ............... *G06N 20/10* (2019.01); *G06T 5/20* (2013.01); *G06T 5/50* (2013.01); *G06T 2207/20076* (2013.01); *G06T 2207/20081* (2013.01); *G06T 2207/20084* (2013.01); *G06T 2207/20216* (2013.01); *G06T 2207/30168* (2013.01)

(58) Field of Classification Search
  CPC . G06T 2207/20084; G06T 2207/20081; G06T 2207/20216; G06T 2207/10016; G06N 3/084; G06N 3/0481; G06N 20/10; G06N 3/0454; G06N 3/0445; G06N 3/082; H04N 17/00
  See application file for complete search history.

(56) References Cited

U.S. PATENT DOCUMENTS

| | | | |
|---|---|---|---|
| 2013/0050503 A1* | 2/2013 | Xu | G06T 7/0002 |
| | | | 348/180 |
| 2016/0157209 A1* | 6/2016 | Baldwin | H04N 21/6131 |
| | | | 370/216 |
| 2017/0185846 A1* | 6/2017 | Hwangbo | G06N 3/08 |
| 2017/0289144 A1* | 10/2017 | Ionita | G06F 21/629 |
| 2018/0041765 A1* | 2/2018 | Hua | G06K 9/00744 |
| 2018/0068195 A1* | 3/2018 | Kolarov | G06T 7/80 |
| 2019/0052932 A1* | 2/2019 | Fu | H04N 21/44209 |
| 2019/0246111 A1* | 8/2019 | Li | H04N 21/235 |
| 2020/0012862 A1* | 1/2020 | Mitra | G06N 20/00 |
| 2020/0021815 A1* | 1/2020 | Topiwala | G06N 3/082 |
| 2020/0192930 A1* | 6/2020 | Wei | G06F 16/00 |
| 2021/0006477 A1* | 1/2021 | Tan | H04L 43/026 |
| 2021/0051088 A1* | 2/2021 | Kovari | H04L 41/16 |

* cited by examiner

102

108

301

QUALITY ASSESSMENT OF A VIDEO

CROSS-REFERENCE TO RELATED APPLICATION

This application claims the benefit of priority from U.S. Provisional Patent Application Ser. No. 62/824,329, filed on Mar. 27, 2019, and entitled "PREDICTING THE DISTRIBUTION OF HUMAN OPINION SCORE IN THE ASSESSMENT OF VIDEO QUALITY," which is incorporated herein by reference in its entirety.

TECHNICAL FIELD

The present disclosure generally relates to video quality assessment, and particularly, to video quality assessment based on neural networks.

BACKGROUND

Image/video quality assessment maps images/videos, regarded as distorted views of real-world scenes, to corresponding quality scores on a numerical scale. Methods for image/video quality assessment may be evaluated based on a performance for benchmark image/video quality databases that are labeled by subjective quality scores obtained from human expert viewers. Predicting a quality score measure may facilitate a content provider to guarantee a desired percentage of satisfied users. One quality score measure is mean opinion score (MOS) that represents an overall quality of an image/video and is given as a decimal number. However, images/videos with approximately same MOS may have different quality score distributions. These distributions may include information about how much consensus or divergence exists among individual ratings.

Conventional image/video quality assessment methods may extract predefined features from an image/video. These features may then be used to predict MOS. These methods may be useful for MOS prediction of synthetically distorted images/videos. However, they may provide low quality predictions for real-world images/videos since real-world images may suffer from various combinations of artifacts. There is, therefore, a need for an image quality assessment method that may provide a high quality prediction for a quality score distribution of a real-world image. There is also a need or a video quality assessment method that may provide a high quality prediction for a quality score distribution of a real-world video.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for quality assessment of a video utilizing a neural network. In an exemplary embodiment, the video may include a plurality of video frames. An exemplary method may include repeating a first iterative process M times where M is a number of the plurality of video frames and extracting a score distribution for a plurality of scores. In an exemplary embodiment, an $m^{th}$ iteration of the first iterative process, where $m \in [1,M]$, may include generating an $m^{th}$ frame-level feature set, generating a first recurrent output of a plurality of recurrent outputs based on a zeroth recurrent output of the plurality of recurrent outputs, and generating an $m^{th}$ recurrent output of the plurality of recurrent outputs based on an $(m-1)^{th}$ recurrent output of the plurality of recurrent outputs. In an exemplary embodiment, the first iterative process may be repeated utilizing one or more processors. An exemplary $m^{th}$ frame-level feature set may be associated with an $m^{th}$ video frame of the plurality of video frames. An exemplary $m^{th}$ frame-level feature set may include a plurality of feature sets. In an exemplary embodiment, the plurality of recurrent outputs may be associated with a recurrent neural network. In an exemplary embodiment, the first recurrent output may be generated by feeding a first frame-level feature set to a recurrent neural network. An exemplary recurrent neural network may be associated with the neural network. In an exemplary embodiment, the zeroth recurrent output may be equal to a zero vector comprising zero elements. In an exemplary embodiment, the $m^{th}$ recurrent output may be generated by feeding the $m^{th}$ frame-level feature set to the recurrent neural network. In an exemplary embodiment, the score distribution may be extracted utilizing the one or more processors. In an exemplary embodiment, the score distribution may be associated with the video. An exemplary score distribution may be extracted from an $M^{th}$ recurrent output of the plurality of recurrent outputs by feeding the $M^{th}$ recurrent output to a first fully connected layer of a plurality of fully connected layers. In an exemplary embodiment, plurality of fully connected layers may be associated with the neural network.

In an exemplary embodiment, generating the $m^{th}$ frame-level feature set may include feeding the $m^{th}$ video frame to a first convolutional layer of a plurality of convolutional layers, generating a second plurality of feature maps, generating an $(i+1)^{th}$ plurality of feature maps, and obtaining an $(i+1)^{th}$ feature set of the plurality of feature sets from the $(i+1)^{th}$ plurality of feature maps. In an exemplary embodiment, the plurality of convolutional layers may be associated with the neural network. In an exemplary embodiment, second plurality of feature maps may be generated by applying the $m^{th}$ video frame to the first convolutional layer. In an exemplary embodiment, the $(i+1)^{th}$ plurality of feature maps may be generated by applying an $i^{th}$ plurality of feature maps to an $i^{th}$ convolutional layer of the plurality of convolutional layers, where $1 \leq i \leq N$ and N is a number of the plurality of convolutional layers.

In an exemplary embodiment, extracting the $(i+1)^{th}$ plurality of feature maps may include generating an $(i+1)^{th}$ plurality of filtered feature maps, generating an $(i+1)^{th}$ plurality of normalized feature maps by applying a batch normalization process, generating an $(i+1)^{th}$ plurality of non-linear feature maps by implementing an $i^{th}$ non-linear activation function, and generating the $(i+1)^{th}$ plurality of feature maps by applying a max pooling. In an exemplary embodiment, generating the $(i+1)^{th}$ plurality of filtered feature maps may include applying an $i^{th}$ plurality of filters on the $i^{th}$ plurality of feature maps. In an exemplary embodiment, the $i^{th}$ plurality of filters may be associated with an $i^{th}$ convolutional layer. In an exemplary embodiment, generating the $(i+1)^{th}$ plurality of normalized feature maps may include applying a batch normalization process on the $(i+1)^{th}$ plurality of filtered feature maps. In an exemplary embodiment, the batch normalization process may be associated with the $i^{th}$ convolutional layer. In an exemplary embodiment, each normalized feature map of the $(i+1)^{th}$ plurality of normalized feature maps may be associated with a respective filtered feature map of the $(i+1)^{th}$ plurality of filtered feature maps. In an exemplary embodiment, generating the $(i+1)^{th}$ plurality of non-linear feature maps may include implementing an $i^{th}$ non-linear activation function on each of the $(i+1)^{th}$ plurality of normalized feature maps. In an exemplary embodiment, the $i^{th}$ non-linear activation function may be associated with the $i^{th}$ convolutional layer. In an exemplary embodiment, generating the $(i+1)^{th}$ plurality of feature maps may include applying a max pooling on each of the $(i+1)^{th}$ plurality of non-linear feature maps. In an exemplary embodiment, the max pooling may be associated with the $i^{th}$ convolutional layer.

In an exemplary embodiment, the method may further include training the neural network prior to repeating the first iterative process. In an exemplary embodiment, training the neural network may include initializing the neural network by a plurality of initial weights and repeating a second iterative process until a termination condition is satisfied. In an exemplary embodiment, the second iterative process may include generating a plurality of updated weights and replacing the plurality of initial weights with the plurality of updated weights. In an exemplary embodiment, the plurality of updated weights may be generated by feeding a training video of a plurality of training videos to the neural network.

In an exemplary embodiment, generating the plurality of updated weights may include repeating a third iterative process M times, extracting a training score distribution for the plurality of scores, generating a plurality of adjustment values by minimizing a loss function, and obtaining the plurality of updated weights. In an exemplary embodiment, an $m^{th}$ iteration of the third iterative process may include generating an $m^{th}$ training frame-level feature set, generating a first training recurrent output based on a zeroth training recurrent output, and generating an $m^{th}$ training recurrent output based on an $(m-1)^{th}$ training recurrent output. In an exemplary embodiment, the $m^{th}$ training frame-level feature set may be associated with an $m^{th}$ training video frame of a plurality of training video frames. In an exemplary embodiment, the plurality of training video frames may be associated with the training video. In an exemplary embodiment, the first training recurrent output may be generated by feeding a first training frame-level feature set to the recurrent neural network. In an exemplary embodiment, the zeroth training recurrent output may be equal to the zero vector. In an exemplary embodiment, the $m^{th}$ training recurrent output may be generated by feeding the $m^{th}$ training frame-level feature set to the recurrent neural network. In an exemplary embodiment, the plurality of scores may be associated with the training video. In an exemplary embodiment, the training score distribution may be extracted from an $M^{th}$ training recurrent output. In an exemplary embodiment, the training score distribution may be extracted by feeding the $M^{th}$ training recurrent output to the first fully connected layer. In an exemplary embodiment, each of the plurality of adjustment values may be associated with a respective initial weight of the plurality of initial weights. In an exemplary embodiment, the plurality of updated weights may be obtained by adding each of the plurality of adjustment values to a respective initial weight of the plurality of initial weights.

In an exemplary embodiment, obtaining the $(i+1)^{th}$ feature set may include applying a global average pooling on the $(i+1)^{th}$ plurality of non-linear feature maps. In an exemplary embodiment, the global average pooling may include obtaining an average of each non-linear feature map of the $(i+1)^{th}$ plurality of non-linear feature maps.

In an exemplary embodiment, feeding the first frame-level feature set to the recurrent neural network may include feeding the first frame-level feature set to a long short-term memory (LSTM) network. In an exemplary embodiment, the LSTM network may include a plurality of LSTM layers. In an exemplary embodiment, feeding the $m^{th}$ frame-level feature set to the recurrent neural network may include feeding the $m^{th}$ frame-level feature set to the LSTM network.

In an exemplary embodiment, extracting score distribution may include generating a first fully connected output of a plurality of fully connected outputs and generating a $k^{th}$ fully connected output of the plurality of fully connected outputs. In an exemplary embodiment, generating the first fully connected output may include applying the $M^{th}$ recurrent output to the first fully connected layer. In an exemplary embodiment, generating the $k^{th}$ fully connected output may include applying a $(k-1)^{th}$ fully connected output of the plurality of fully connected outputs to a $k^{th}$ fully connected layer of the plurality of fully connected layers, where $1 \leq k \leq L$, and L is a number of the plurality of fully connected layers. In an exemplary embodiment, applying the $(k-1)^{th}$ fully connected output to the $k^{th}$ fully connected layer may include implementing an $(N+k)^{th}$ non-linear activation function on the $(k-1)^{th}$ fully connected output. In an exemplary embodiment, an $(N+L)^{th}$ non-linear activation function may include a softmax function. In an exemplary embodiment, a zeroth fully connected output may include the $M^{th}$ recurrent output. In an exemplary embodiment, an $L^{th}$ fully connected output of the plurality of fully connected outputs may include the score distribution.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
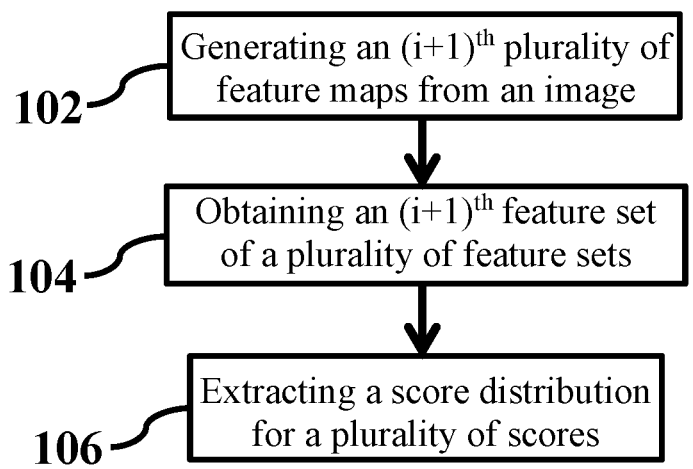
FIG. 1A shows a flowchart of a method for quality assessment of an image, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for quality assessment of an image. An exemplary method may provide a prediction of a score distribution for an exemplary image utilizing a convolutional neural network. In doing so, a number of feature maps may be generated by a number of cascaded convolutional layers. Each convolution layer may generate an exemplary set of feature maps from its input and may pass the exemplary set of feature maps to a next convolutional layer. Each convolutional layer may apply filtering, normalization, and non-linear operations on an exemplary input provided by a previous convolutional layer. To utilize different combinations of feature maps, each set of feature maps generated by each respective convolutional layer may be directly utilized for prediction of the score distribution. For a size of feature maps to be independent of a size of the image, a predefined number of features may be extracted from each respective feature map by applying a global averaging process on each feature map prior to prediction of the score distribution. As a result, a fixed number of inputs may be provided to be applied to a number of fully connected layers that are utilized for score distribution prediction. Each of the fully connected layers may apply a non-linear activation function on its input and may pass a result to a next fully connected layer. Finally, the score distribution may be achieved at an output of the last fully connected layer.

Herein is further disclosed an exemplary method and system for quality assessment of a video. An exemplary method may provide a prediction of a score distribution for an exemplary video utilizing a neural network. In doing so, a number of feature sets may be extracted from an exemplary video frame by a feature extraction unit. An exemplary feature extraction unit may generate feature sets by a number of hand-crafted features. An exemplary feature extraction unit may alternatively generate feature sets by a number of cascaded convolutional layers. Each convolutional layer may apply filtering, normalization, and non-linear operations on an exemplary input provided by a previous convolutional layer. Afterwards, feature sets may be fed to a recurrent neural network. An exemplary recurrent neural network may extract temporal information of the video. When feature sets of all video frames of the video are fed to the exemplary recurrent neural network, an exemplary recurrent neural network output may be fed to a number of cascaded fully connected layers that are utilized for score distribution prediction. Each of the fully connected layers may apply a non-linear activation function on its input and may pass a result to a respective next fully connected layer. Finally, the score distribution may be achieved at an output of the last fully connected layer.

FIG. 1A shows a flowchart of a method for quality assessment of an image, consistent with one or more exemplary embodiments of the present disclosure. An exemplary method 100 may include generating an $(i+1)^{th}$ plurality of feature maps from an image (step 102), obtaining an $(i+1)^{th}$ feature set of a plurality of feature sets from the $(i+1)^{th}$ plurality of feature maps (step 104), and extracting a score distribution for a plurality of scores from the plurality of feature sets (step 106).

Figure 2A:
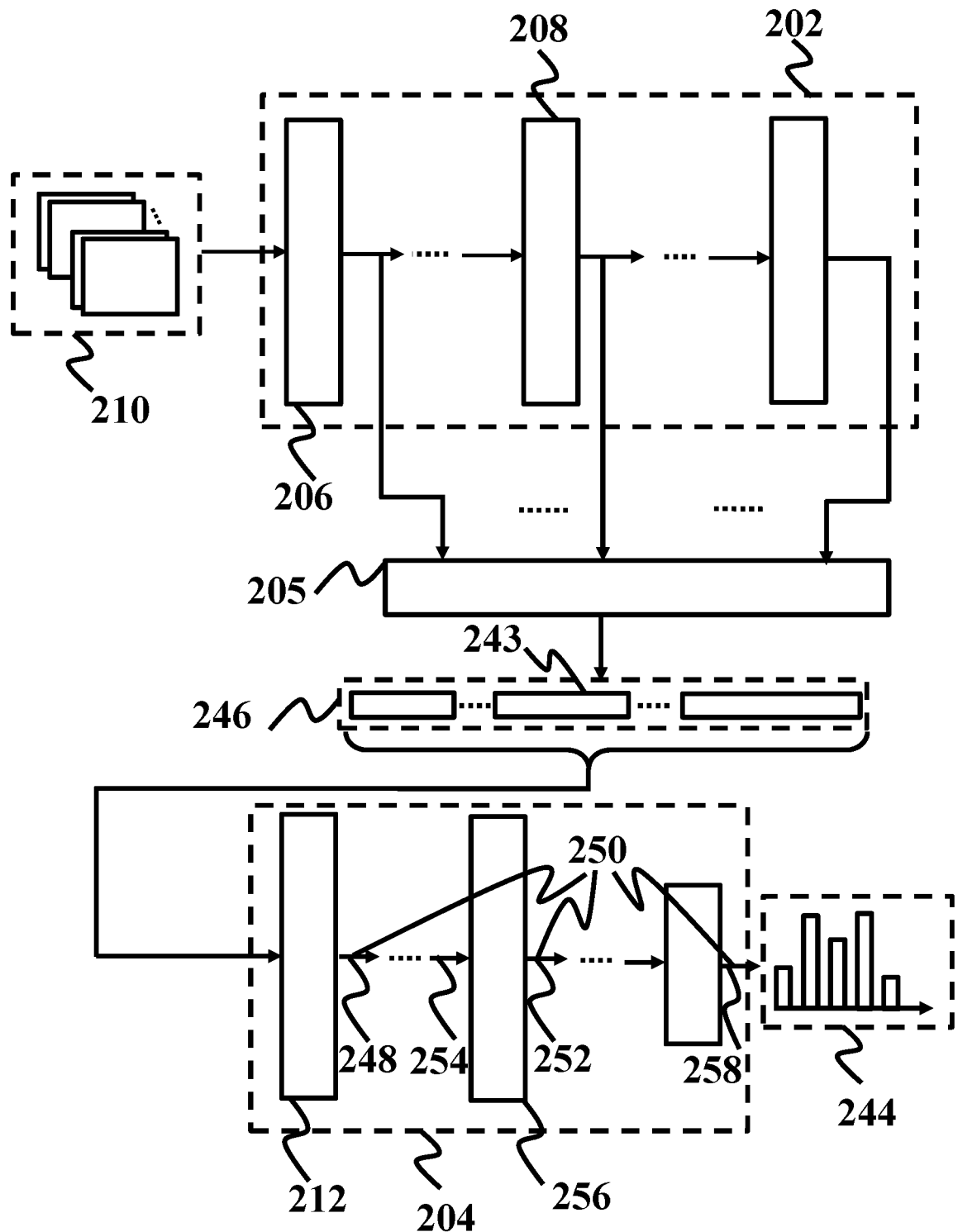
FIG. 2A shows a schematic of a convolutional neural network, consistent with one or more exemplary embodiments of the present disclosure.

FIG. 2A shows a schematic of a convolutional neural network, consistent with one or more exemplary embodiments of the present disclosure. In an exemplary embodiment, different steps of method 100 may be implemented utilizing an exemplary convolutional neural network 200A. In an exemplary embodiment, convolutional neural network 200A may include a plurality of convolutional layers 202, a plurality of fully connected layers 204, and a global average pooling layer 205. In an exemplary embodiment, plurality of convolutional layers 202 may include a first ($1^{st}$) convolutional layer 206 and an $i^{th}$ convolutional layer 208, where $1 \leq i \leq N$ and N is a number of plurality of convolutional layers 202. In an exemplary embodiment, first ($1^{st}$) convolutional layer 206 may be configured to receive an image 210. In an exemplary embodiment, convolutional neural network 200A may be implemented utilizing a processor. In an exemplary embodiment, first ($1^{st}$) convolutional layer 206 may receive image 210 from the processor. In an exemplary embodiment, the processor may receive image 210 from an imaging device (such as a camera) or a memory. In an exemplary embodiment, plurality of fully connected layers 204 may include a first ($1^{st}$) fully connected layer 212.

Figure 2B:
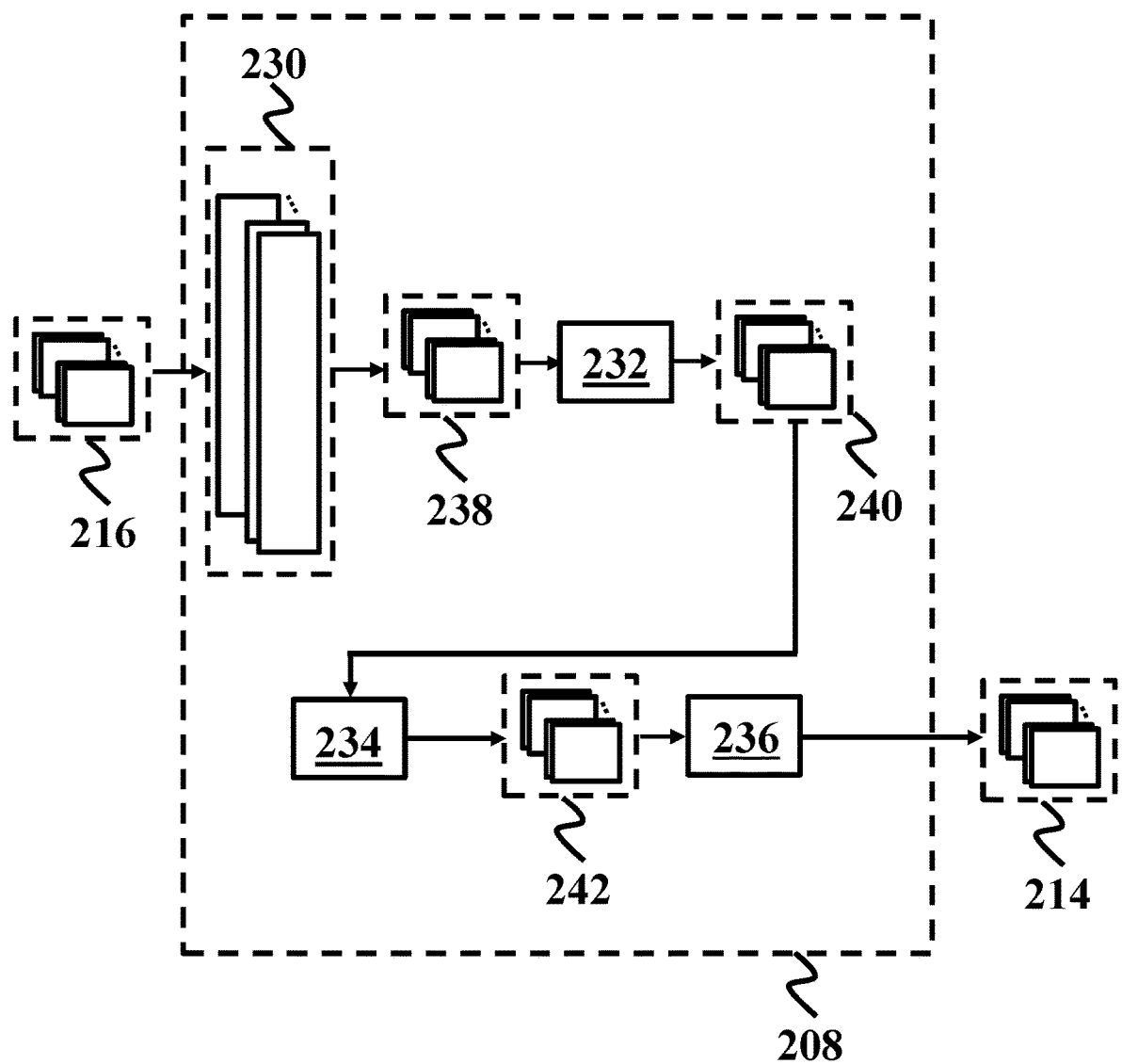
FIG. 2B shows a schematic of a convolutional layer, consistent with one or more exemplary embodiments of the present disclosure.

FIG. 2B shows a schematic of a convolutional layer, consistent with one or more exemplary embodiments of the present disclosure. In an exemplary embodiment, $i^{th}$ convolutional layer 208 may be configured to extract an $(i+1)^{th}$ plurality of feature maps 214 from an $i^{th}$ plurality of feature maps 216. For example, first ($1^{st}$) convolutional layer 206 may be configured to extract a second ($2^{nd}$) plurality of feature maps from a first ($1^{st}$) plurality of feature maps.

Figure 1B:
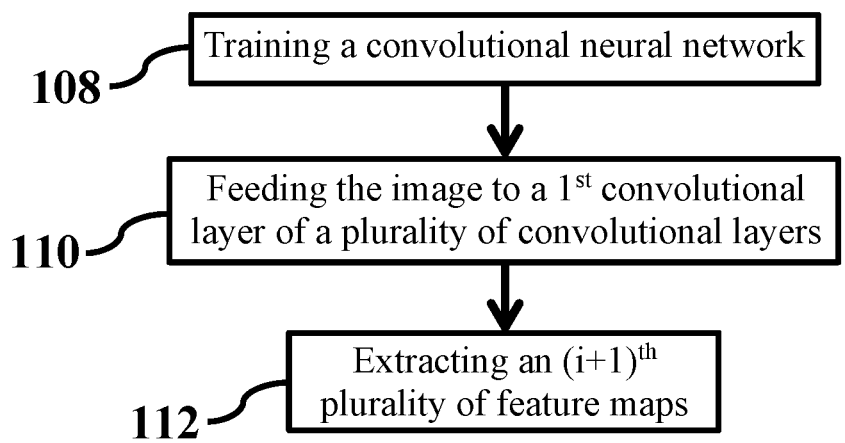
FIG. 1B shows a flowchart for generating a plurality of feature maps, consistent with one or more exemplary embodiments of the present disclosure.

For further detail with respect to step 102, FIG. 1B shows a flowchart for generating a plurality of feature maps, consistent with one or more exemplary embodiments of the present disclosure. Referring to FIGS. 1B, 2A, and 2B, in an exemplary embodiment, generating $(i+1)^{th}$ plurality of feature maps 214 may include training convolutional neural network 200A (step 108), feeding image 210 to first ($1^{st}$) convolutional layer 206 of plurality of convolutional layers 202 (step 110), and extracting $(i+1)^{th}$ plurality of feature maps 214 (step 112).

Figure 1C:
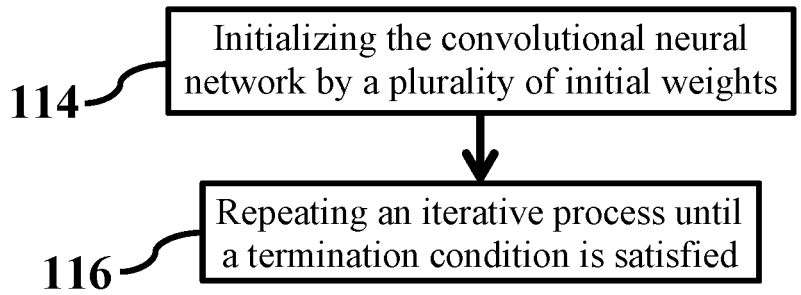
FIG. 1C shows a flowchart for training a convolutional neural network, consistent with one or more exemplary embodiments of the present disclosure.
Figure 2C:
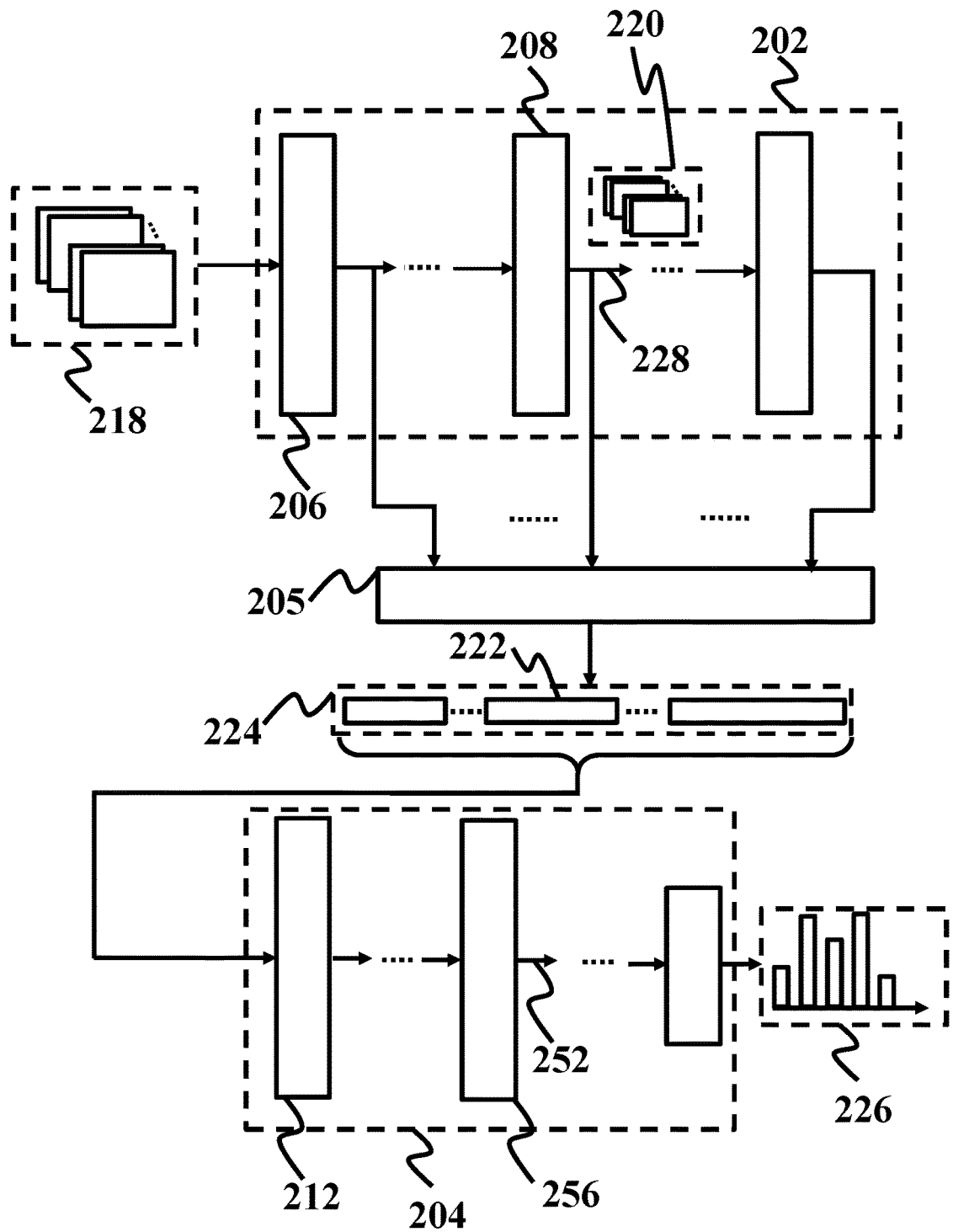
FIG. 2C shows a schematic of a convolutional neural network in a training phase, consistent with one or more exemplary embodiments of the present disclosure.

In further detail with regards to step 108, FIG. 1C shows a flowchart for training a convolutional neural network, consistent with one or more exemplary embodiments of the present disclosure. FIG. 2C shows a schematic of a convolutional neural network in a training phase, consistent with one or more exemplary embodiments of the present disclosure. In an exemplary embodiment, training convolutional neural network 200A may include initializing convolutional neural network 200A by a plurality of initial weights (step 114) and repeating an iterative process until a termination condition is satisfied (step 116).

For further detail regarding step 114, in an exemplary embodiment, initializing convolutional neural network 200A may include generating the plurality of initial weights. In an exemplary embodiment, a respective number of initial weights of the plurality of initial weights may be multiplied by an output of each respective convolutional layer of plurality of convolutional layers 202. In an exemplary embodiment, a respective multiplication result may be fed to a subsequent convolutional layer of plurality of convolutional layers 202. In an exemplary embodiment, a respective number of initial weights of the plurality of initial weights may be multiplied by an output of each respective fully connected layer of plurality of fully connected layers 204. In an exemplary embodiment, a respective multiplication result may be fed to a subsequent fully connected layer of plurality of fully connected layers 204.

In an exemplary embodiment, generating the plurality of initial weights may include generating a plurality of random variables from a predefined probability distribution. In an exemplary embodiment, the predefined probability distribution may be determined by a designer of convolutional neural network 200A according to a required range of each initial weight. In an exemplary embodiment, the predefined probability distribution may be selected from Gaussian or uniform probability distributions.

Figure 1D:
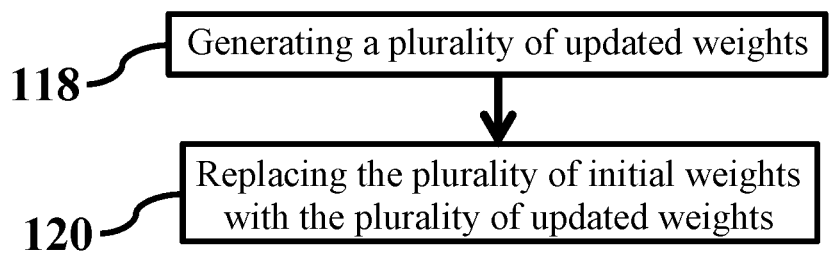
FIG. 1D shows a flowchart of an iterative process, consistent with one or more exemplary embodiments of the present disclosure.

In further detail with respect to step 116, FIG. 1D shows a flowchart of an iterative process, consistent with one or more exemplary embodiments of the present disclosure. In an exemplary embodiment, the iterative process may include generating a plurality of updated weights (step 118) and replacing the plurality of initial weights with the plurality of updated weights (step 120). In an exemplary embodiment, the plurality of updated weights may be generated by feeding a training image 218 of a plurality of training images to convolutional neural network 200A.

Figure 1E:
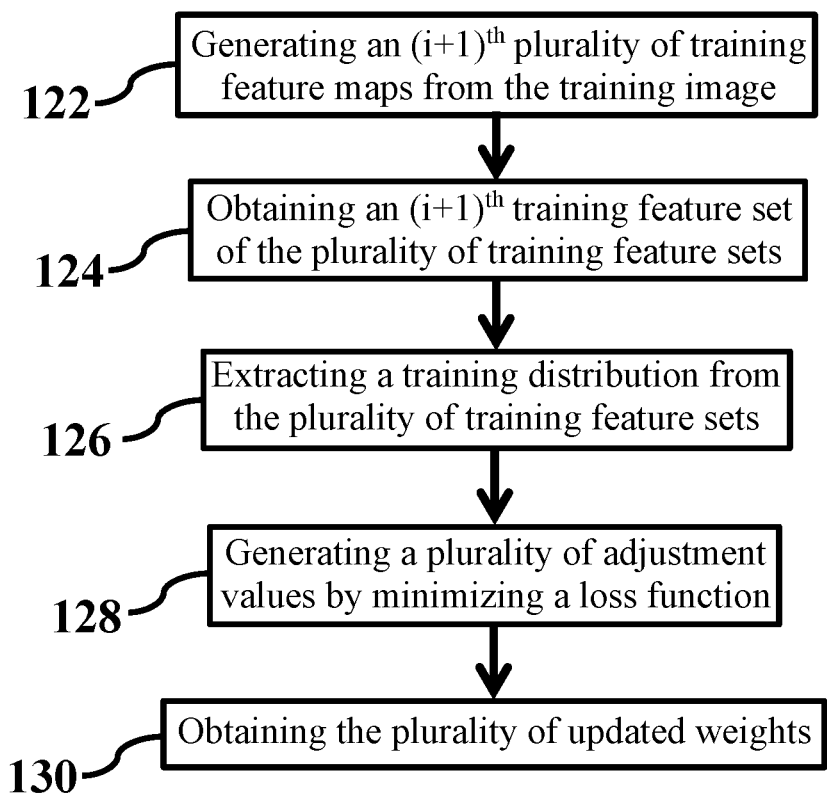
FIG. 1E shows a flowchart for generating a plurality of updated weights, consistent with one or more exemplary embodiments of the present disclosure.

In further detail with respect to step 118, FIG. 1E shows a flowchart for generating a plurality of updated weights, consistent with one or more exemplary embodiments of the present disclosure. Referring to FIGS. 1E and 2C, in an exemplary embodiment, generating the plurality of updated weights may include generating an $(i+1)^{th}$ plurality of training feature maps 220 from training image 218 (step 122), obtaining an $(i+1)^{th}$ training feature set 222 of a plurality of training feature sets 224 from $(i+1)^{th}$ plurality of training feature maps 220 (step 124), extracting a training distribution 226 from plurality of training feature sets 224 (step 126), generating a plurality of adjustment values by minimizing a loss function (step 128), and obtaining the plurality of updated weights (step 130). In an exemplary embodiment, the iterative process may be repeated until a value of the loss function becomes lower than a predefined threshold. In an exemplary embodiment, the predefined threshold may be set by a designer of convolutional neural network 200A according to a required performance of convolutional neural network 200A. In an exemplary embodiment, to increase the performance of convolutional neural network 200A, a value of the predefined threshold may be decreased. In an exemplary embodiment, the loss function may be defined as a function of different components (e.g., mean, variance, etc.) of training distribution 226 and a ground truth distribution associated with the training image.

In an exemplary embodiment, the loss function may be defined by the following:

$$L(p, q) = \sum_{m=1}^{M} p_m \log\left(\frac{p_m}{q_m}\right)$$

where $L(.,.)$ is the loss function, p is training distribution 226, q is a ground truth distribution associated with the training image, $p_m$ is an $m^{th}$ component of the training distribution, $q_m$ is an $m^{th}$ component of the ground truth distribution, and M is a number of the plurality of scores. An exemplary ground truth distribution may be obtained from a plurality of viewers. In doing so, each viewer of the plurality of viewers may assign a score from the plurality of scores to training image 218. Next, in an exemplary embodiment, a histogram of scores for training image 218 may be obtained and regarded as the ground truth distribution associated with training image 218. In an exemplary embodiment, the loss function may represent a measure of distance between the ground truth distribution and training distribution 226. Other exemplary types of loss functions may also be defined in step 116, e.g., earth mover's distance, mean square error, or mean absolute error.

Figure 1F:
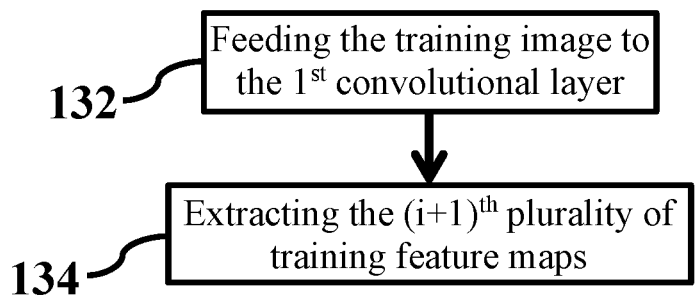
FIG. 1F shows a flowchart for generating a plurality of training feature maps, consistent with one or more exemplary embodiments of the present disclosure.

For further detail with respect to step 122, FIG. 1F shows a flowchart for generating a plurality of training feature maps, consistent with one or more exemplary embodiments of the present disclosure. Referring to FIGS. 1F and 2C, in an exemplary embodiment, generating $(i+1)^{th}$ plurality of training feature maps 220 may include feeding training image 218 to first $(1^{st})$ convolutional layer 206 of plurality of convolutional layers 202 (step 132) and extracting $(i+1)^{th}$ plurality of training feature maps 220 from an output 228 of $i^{th}$ convolutional layer 208 (step 134).

For further detail with respect to step 132, in an exemplary embodiment, training image 218 may include a first $(1^{st})$ plurality of training feature maps. Therefore, feeding training image 218 to first $(1^{st})$ convolutional layer 206 may include feeding each training feature map of first $(1^{st})$ plurality of training feature maps to first $(1^{st})$ convolutional layer 206. In an exemplary embodiment, each feature map of the first $(1^{st})$ plurality of training feature maps may be associated with a channel of training image 218, e.g., a red, a green, or a blue channel.

In further detail regarding step 134, in an exemplary embodiment, convolutional neural network 200A may be a deep neural network. Therefore, a performance of training convolutional neural network 200A may be negatively impacted by overfitting. In an exemplary embodiment, when a deep neural network gets impacted by overfitting, the deep neural network may provide very low values of error defined as a difference between ground truth and training outputs. However, the performance of the deep neural network for test data may be drastically degraded. To resolve this issue, in an exemplary embodiment, extracting $(i+1)^{th}$ plurality of training feature maps 220 may include applying a first dropout process on the output of $i^{th}$ convolutional layer 208. The first dropout process may eliminate an element of each of $(i+1)^{th}$ plurality of training feature maps 220 with a predefined probability that may be set by a designer of convolutional neural network 200A. Therefore, extracting each of $(i+1)^{th}$ plurality of training feature maps 220 associated with training image 218 may be subjected to a specific first dropout process that may eliminate a specific set of elements of $(i+1)^{th}$ plurality of training feature maps 220. In an exemplary embodiment, the predefined probability may be adjusted such that a negative impact of overfitting is suppressed, i.e., a value of the loss function in a testing phase becomes lower than a required threshold.

In training convolutional neural network 200A, a value of each element in $(i+1)^{th}$ plurality of feature maps 214 may vary in a large interval. Consequently, in an exemplary embodiment, a training speed of convolutional neural network 200A may be low, since convolutional neural network 200A may need to be trained for a very wide interval of values at each layer. To compensate this issue, in an exemplary embodiment, each of plurality of convolutional layers 202 may include a batch normalization process. In an exemplary embodiment, the batch normalization process may normalize $(i+1)^{th}$ plurality of feature maps 214 utilizing an average and a standard deviation of a set of $(i+1)^{th}$ plurality of feature maps 214 associated with a batch of training images. In doing so, the plurality of training images may be partitioned into a plurality of training image batches. Next, an exemplary set of $(i+1)^{th}$ plurality of feature maps 214 associated with each of training image batches may be obtained. Afterwards, in an exemplary embodiments, an average and a standard deviation of the set of $(i+1)^{th}$ plurality of feature maps 214 may be obtained and all elements of the set of $(i+1)^{th}$ plurality of feature maps 214 may be normalized in accordance to the average and the standard deviation. Next, in an exemplary embodiments, all elements of the set of $(i+1)^{th}$ plurality of feature maps 214 may be scaled and shifted by a scale and a shift variable which may be learned during training process. Therefore, in an exemplary embodiments, all elements of $(i+1)^{th}$ plurality of feature maps 214 may follow a normal distribution which may considerably reduce a required time for training convolutional neural network 200A. In an exemplary embodiment, extracting $(i+1)^{th}$ plurality of training feature maps 220 may be similar to extracting $(i+1)^{th}$ plurality of feature maps 214. Moreover, in an exemplary embodiment, obtaining an $(i+1)^{th}$ training feature set 222 may be similar to obtaining $(i+1)^{th}$ feature set 243.

Referring again to FIGS. 1E and 2C, step 126 may include extracting a training distribution 226 from plurality of training feature sets 224. In further detail with respect to step 126, in an exemplary embodiment, extracting training distribution 226 may include feeding plurality of training feature sets 224 to first $(1^{st})$ fully connected layer 212 of plurality of fully connected layers 204. In an exemplary embodiment, extracting training distribution 226 may include applying a second dropout process on a $k^{th}$ fully connected output 252. In an exemplary embodiment, the second dropout process may include eliminating each element of $k^{th}$ fully connected output 252 with a predefined probability for training image 218. Therefore, extracting each training distribution associated with each of the plurality of training images may be subjected to a specific second dropout process that may eliminate a specific set of output elements of $k^{th}$ fully connected output 252.

For further detail with regards to step 128, in an exemplary embodiment, each of the plurality of adjustment values may be associated with a respective initial weight of the plurality of initial weights. In an exemplary embodiment, minimizing the loss function may be performed utilizing a gradient descent method. In an exemplary gradient descent method, each adjustment value of the plurality of adjustment values may be proportional to a gradient of the loss function associated with each initial weight of the plurality of initial weights. Exemplary adjustment values associated with each convolutional layer of plurality of convolutional layers 202 and each fully connected layer of plurality of fully connected layers 204 may be obtained utilizing a back propagation algorithm. For further detail with respect to step 130, in an exemplary embodiment, the plurality of updated weights may be obtained by adding each of the plurality of adjustment values to a respective initial weight of the plurality of initial weights.

Referring again to FIG. 1B, in an exemplary embodiment, step 110 may include feeding image 210 to first ($1^{st}$) convolutional layer 206. In further detail regarding step 110, in an exemplary embodiment, image 210 may include a first ($1^{st}$) plurality of feature maps. In an exemplary embodiment, each feature map of the first ($1^{st}$) plurality of feature maps may be associated with a channel of image 210. For example, each feature map of the first ($1^{st}$) plurality of feature maps may be associated with one of a red, a green, or a blue channel of image 210. In an exemplary embodiment, feeding image 210 to first ($1^{st}$) convolutional layer 206 may include feeding each of the first ($1^{st}$) plurality of feature maps to first ($1^{st}$) convolutional layer 206.

Figure 1G:
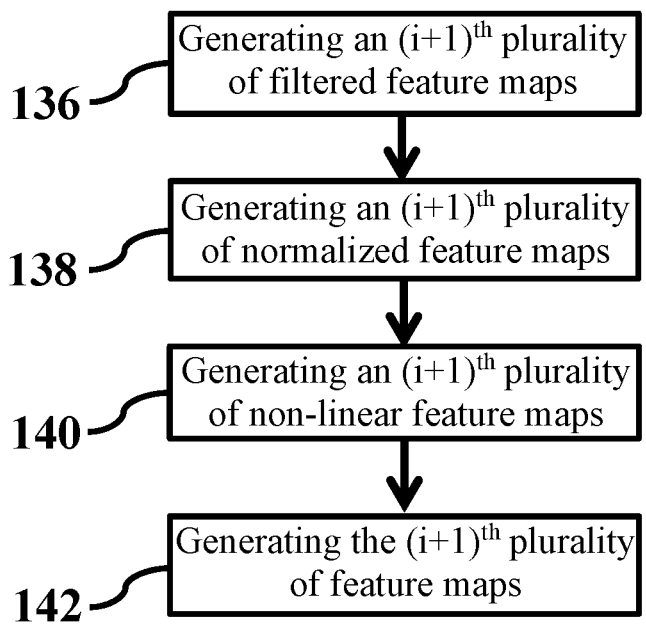
FIG. 1G shows a flowchart for extracting a plurality of feature maps, consistent with one or more exemplary embodiments of the present disclosure.

For further detail with respect to step 112, FIG. 1G shows a flowchart for extracting an $(i+1)^{th}$ plurality of feature maps, consistent with one or more exemplary embodiments of the present disclosure. Referring to FIG. 2B, in an exemplary embodiment, $i^{th}$ convolutional layer 208 may include an $i^{th}$ plurality of filters 230, a batch normalization layer 232, an $i^{th}$ non-linear activation layer 234, and a pooling layer 236. In an exemplary embodiment, extracting $(i+1)^{th}$ plurality of feature maps 214 may include generating an $(i+1)^{th}$ plurality of filtered feature maps 238 (step 136), generating an $(i+1)^{th}$ plurality of normalized feature maps 240 (step 138), generating an $(i+1)^{th}$ plurality of non-linear feature maps 242 (step 140), and generating $(i+1)^{th}$ plurality of feature maps 214 (step 142).

In further detail with regards to step 136, in an exemplary embodiment, generating $(i+1)^{th}$ plurality of filtered feature maps 238 may include applying $i^{th}$ plurality of filters 230 on $i^{th}$ plurality of feature maps 216. In an exemplary embodiment, each filter of $i^{th}$ plurality of filters 230 may include $N_i$ number of two dimensional filters, where $N_i$ is a number of $i^{th}$ plurality of feature maps 216. An exemplary two dimensional filter may include a matrix which may perform a convolution operation on a window of a respective feature map of $i^{th}$ plurality of feature maps 216. In other words, an exemplary filter of $i^{th}$ plurality of filters 230 may include a three dimensional filter which may be generated by stacking $N_i$ two dimensional filters. In an exemplary embodiment, applying $i^{th}$ plurality of filters 230 on $i^{th}$ plurality of feature maps 216 may include applying each of two dimensional filters on a respective feature map of $i^{th}$ plurality of feature maps 216 and obtaining a respective result. In an exemplary embodiment, the respective result may correspond to an output of an exemplary two dimensional filter. An element of each of $(i+1)^{th}$ plurality of filtered feature maps 238 may be obtained by a summation over respective results associated with each of two dimensional filters. Next, in an exemplary embodiment, a respective filtered feature map of $(i+1)^{th}$ plurality of filtered feature maps 238 may be obtained by sweeping each two dimensional filter on the respective feature map. In an exemplary embodiment, applying $i^{th}$ plurality of filters 230 on $i^{th}$ plurality of feature maps 216 may include applying a separable convolution on $i^{th}$ plurality of feature maps 216. An exemplary separable convolution may break down $N_i$ two dimensional convolutions into two simpler types of convolutions, i.e., a depth wise convolution and a point wise convolution. This may reduce a number of all weights of a neural network and may result in computational efficiency.

For further detail with respect to step 138, in an exemplary embodiment, generating $(i+1)^{th}$ plurality of normalized feature maps 240 may include applying a batch normalization process on $(i+1)^{th}$ plurality of filtered feature maps 238. In an exemplary embodiment, the batch normalization process may be associated with batch normalization layer 232. In an exemplary embodiment, each normalized feature map of $(i+1)^{th}$ plurality of normalized feature maps 240 may be associated with a respective filtered feature map of $(i+1)^{th}$ plurality of filtered feature maps 238. The batch normalization process may be similar to that of step 134. However, there may be no training image batches in generating $(i+1)^{th}$ plurality of normalized feature maps 240. Therefore, in an exemplary embodiment, an average and a standard deviation used for batch normalization may be obtained from a set of averages and a set of standard deviations associated with all batches of training image batches.

In further detail regarding step 140, in an exemplary embodiment, generating $(i+1)^{th}$ plurality of non-linear feature maps 242 may include implementing an $i^{th}$ non-linear activation function on each of $(i+1)^{th}$ plurality of normalized feature maps 240. In an exemplary embodiment, the $i^{th}$ non-linear activation function may be associated to the $i^{th}$ non-linear activation layer 234. In an exemplary embodiment, implementing the $i^{th}$ non-linear activation function may include implementing one of a rectified linear unit (ReLU) function or an exponential linear unit (ELU) function. In an exemplary embodiment, implementing each of the $i^{th}$ non-linear activation function may include implementing other types of activation functions such as leaky ReLU, scaled ELU, parametric ReLU, etc.

For further detail with regards to step 142, in an exemplary embodiment, generating $(i+1)^{th}$ plurality of feature maps 214 may include applying a max pooling on each of $(i+1)^{th}$ plurality of non-linear feature maps 242. In an exemplary embodiment, the max pooling may be performed utilizing pooling layer 236. In an exemplary embodiment, generating $(i+1)^{th}$ plurality of feature maps 214 may further include applying an average pooling on each of $(i+1)^{th}$ plurality of non-linear feature maps 242. In an exemplary embodiment, the average pooling may be associated with pooling layer 236. An exemplary pooling layer may apply a window of a predefined size on each of $(i+1)^{th}$ plurality of non-linear feature maps 242 and obtain a maximum or average of windowed version of each of $(i+1)^{th}$ plurality of non-linear feature maps 242. Therefore, in an exemplary embodiment, each of $(i+1)^{th}$ plurality of feature maps 214 may be generated by sweeping the window on each of (i+1)$^{th}$ plurality of non-linear feature maps 242. As a result, a size of each of (i+1)$^{th}$ plurality of non-linear feature maps 242 may be smaller than a size of a respective non-linear feature map of (i+1)$^{th}$ plurality of non-linear feature maps 242. Consequently, a number of required operations may proportionally be decreased.

Referring again to FIGS. 1A, 2A, and 2B, in an exemplary embodiment, step 104 may include obtaining (i+1)$^{th}$ feature set 243 of a plurality of feature sets 246 from (i+1)$^{th}$ plurality of feature maps 214. In further detail regarding step 104, in an exemplary embodiment, obtaining an (i+1)$^{th}$ feature set 243 may include applying a global average pooling on (i+1)$^{th}$ plurality of non-linear feature maps 242. In an exemplary embodiment, global average pooling layer 205 may be configured to perform the global average pooling. In an exemplary embodiment, the global average pooling may include obtaining an average of each non-linear feature map of (i+1)$^{th}$ plurality of non-linear feature maps 242. In an exemplary embodiment, global average pooling layer 205 may be configured to obtain a set of statistical features from each of (i+1)$^{th}$ plurality of non-linear feature maps 242. For example, global average pooling layer 205 may be configured to obtain a standard deviation, or a moment of an arbitrary order. In an exemplary embodiment, a size of an output of a convolutional layer may be proportional to a size of an input of the convolutional layer. In an exemplary embodiment, when a size of the input of the convolutional layer is H×W and a size of a two dimensional filter corresponding to the convolutional layer is M×N, a size of an output of the convolutional layer may become (H−M+1)×(W−N+1). Obtaining each feature set from each of (i+1)$^{th}$ plurality of non-linear feature maps 242 using global statistics, i.e., using all elements of each of (i+1)$^{th}$ plurality of non-linear feature maps 242, may result in feature sets of a size that may be independent of a size of each of i$^{th}$ plurality of feature maps 216. As a result, in an exemplary embodiment, a score distribution 244 with a predefined number of plurality of scores for image 210 may be obtained from convolutional neural network 200A where image 210 may be of an arbitrary size.

In an exemplary embodiment, obtaining the plurality of feature sets from each convolutional layer of plurality of convolutional layers 202 may lead to different combinations of feature maps. In an exemplary embodiment, feature sets obtained from both low convolutional layers (e.g., first (1$^{st}$) convolutional layer 206) and high convolutional layers (e.g., an N$^{th}$ convolutional layer, where N is a number of plurality of convolutional layers 202) may provide more information to plurality of fully connected layers 204 compared with obtaining features sets solely from the N$^{th}$ convolutional layer. On the other hand, plurality of fully connected layers 204 may be connected to low convolutional layers through feature sets obtained from feature maps associated low convolutional layers. Therefore, a value of gradient may be considerable with respect to weights in low convolutional layers, which may prevent a vanishing gradient phenomenon.

Figure 1H:
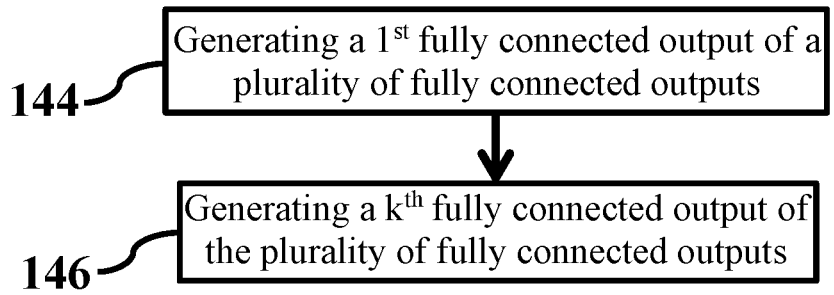
FIG. 1H shows a flowchart for extracting a score distribution, consistent with one or more exemplary embodiments of the present disclosure.

For further detail with respect to step 106, FIG. 1H shows a flowchart of for extracting a score distribution, consistent with one or more exemplary embodiments of the present disclosure. Referring to FIG. 2A, in an exemplary embodiment, the plurality of scores may be associated with image 210. In an exemplary embodiment, score distribution 244 may be extracted by feeding plurality of feature sets 246 to first (1$^{st}$) fully connected layer 212. In an exemplary embodiment, extracting score distribution 244 may include generating a first (1$^{st}$) fully connected output 248 of a plurality of fully connected outputs 250 (step 144) and generating k$^{th}$ fully connected output 252 of the plurality of fully connected outputs (step 146).

In further detail with regards to step 144, in an exemplary embodiment, generating first (1$^{st}$) fully connected output 248 may include applying plurality of feature sets 246 to first (1$^{st}$) fully connected layer 212 of plurality of fully connected layers 204. In an exemplary embodiment, applying plurality of feature sets 246 to first (1$^{st}$) fully connected layer 212 may include arranging plurality of feature sets 246 into a feature vector and applying the feature vector to first (1$^{st}$) fully connected layer 212.

For further detail regarding step 146, in an exemplary embodiment, generating k$^{th}$ fully connected output 252 may include applying a (k−1)$^{th}$ fully connected output 254 of plurality of fully connected outputs 250 to a k$^{th}$ fully connected layer 256 of plurality of fully connected layers 204, where 1≤k≤L, and L is a number of plurality of fully connected layers 204. In an exemplary embodiment, applying the (k−1)$^{th}$ fully connected output to k$^{th}$ fully connected layer 256 may include implementing an (N+k)$^{th}$ non-linear activation function on (k−1)$^{th}$ fully connected output 254. In an exemplary embodiment, implementing the (N+k)$^{th}$ non-linear activation function may include implementing one of a rectified linear unit (ReLU) function or an exponential linear unit (ELU) function. In an exemplary embodiment, implementing the (N+k)$^{th}$ non-linear activation function may include implementing other types of activation functions such as leaky ReLU, scaled ELU, parametric ReLU, etc. In an exemplary embodiment, an (N+L)$^{th}$ non-linear activation function may include a softmax function. In an exemplary embodiment, a 0$^{th}$ fully connected output may include plurality of feature sets 246. In an exemplary embodiment, an L$^{th}$ fully connected output 258 of plurality of fully connected outputs 250 may include score distribution 244.

Figure 3A:
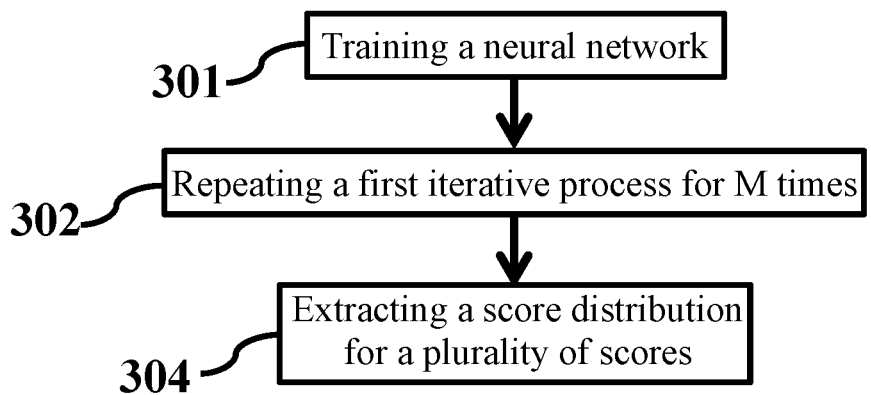
FIG. 3A shows a flowchart of a method for quality assessment of a video, consistent with one or more exemplary embodiments of the present disclosure.

FIG. 3A shows a flowchart of a method for quality assessment of a video, consistent with one or more exemplary embodiments of the present disclosure. An exemplary method 300 may include training a neural network (step 301), repeating a first iterative process M times (step 302), and extracting a score distribution for a plurality of scores (step 304).

Figure 4A:
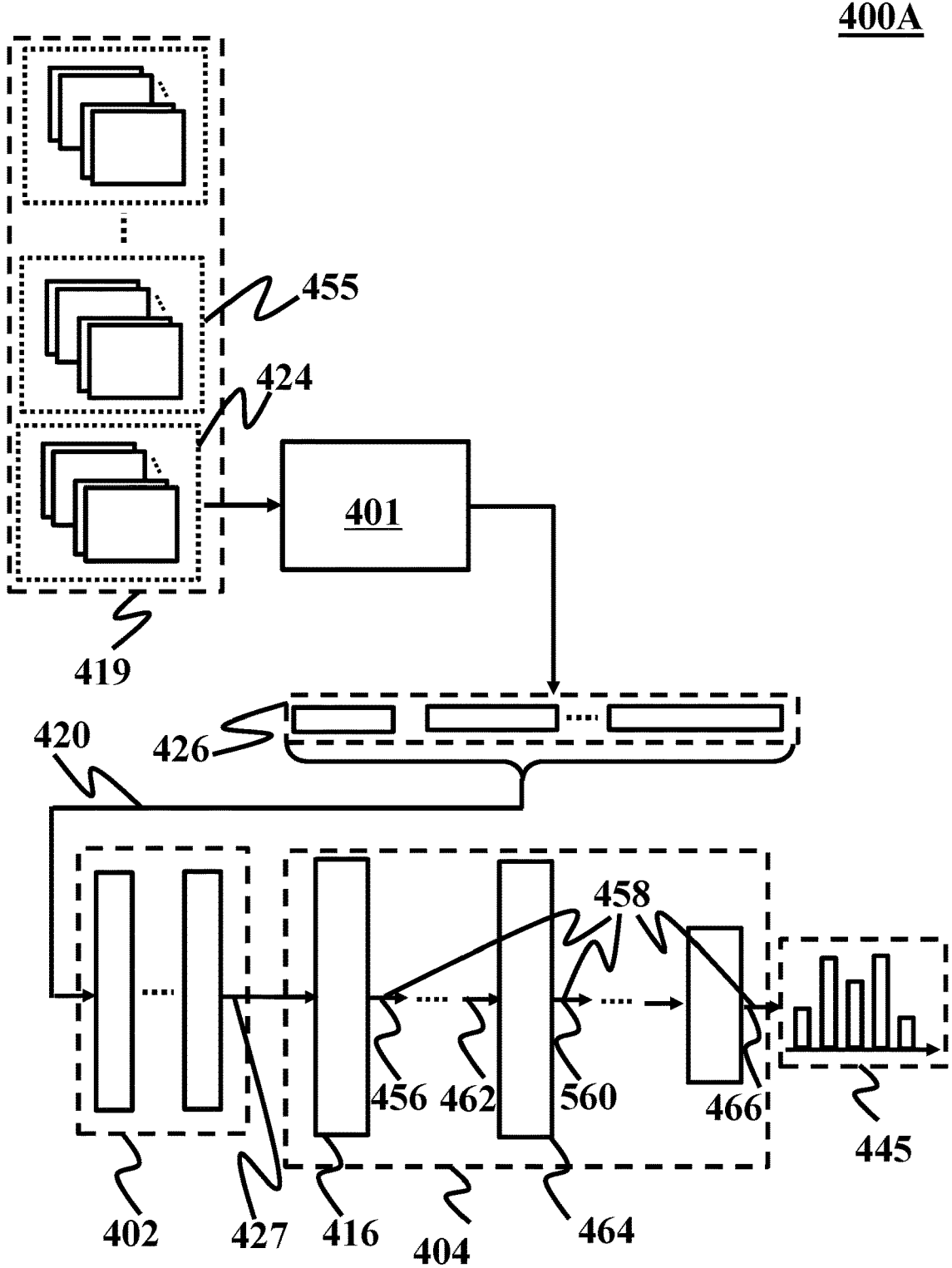
FIG. 4A shows a schematic of a neural network, consistent with one or more exemplary embodiments of the present disclosure.

FIG. 4A shows a schematic of a neural network, consistent with one or more exemplary embodiments of the present disclosure. In an exemplary embodiment, different steps of method 300 may be implemented utilizing a neural network 400.

Figure 3B:
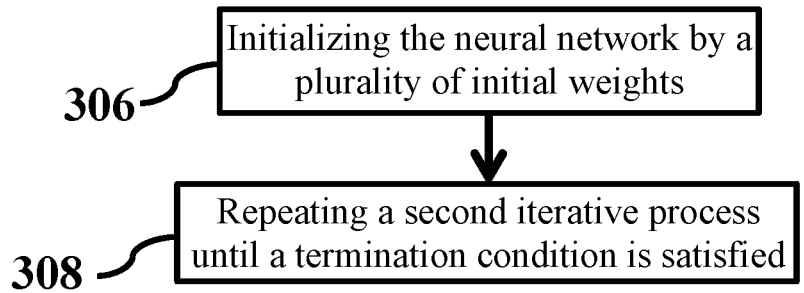
FIG. 3B shows a flowchart of training a neural network, consistent with one or more exemplary embodiments of the present disclosure.

In further detail regarding step 301, FIG. 3B shows a flowchart of training a neural network, consistent with one or more exemplary embodiments of the present disclosure. In an exemplary embodiment, training neural network 400 may include initializing neural network 400 by a plurality of initial weights (step 306) and repeating a second iterative process until a termination condition is satisfied (step 308).

Figure 4B:
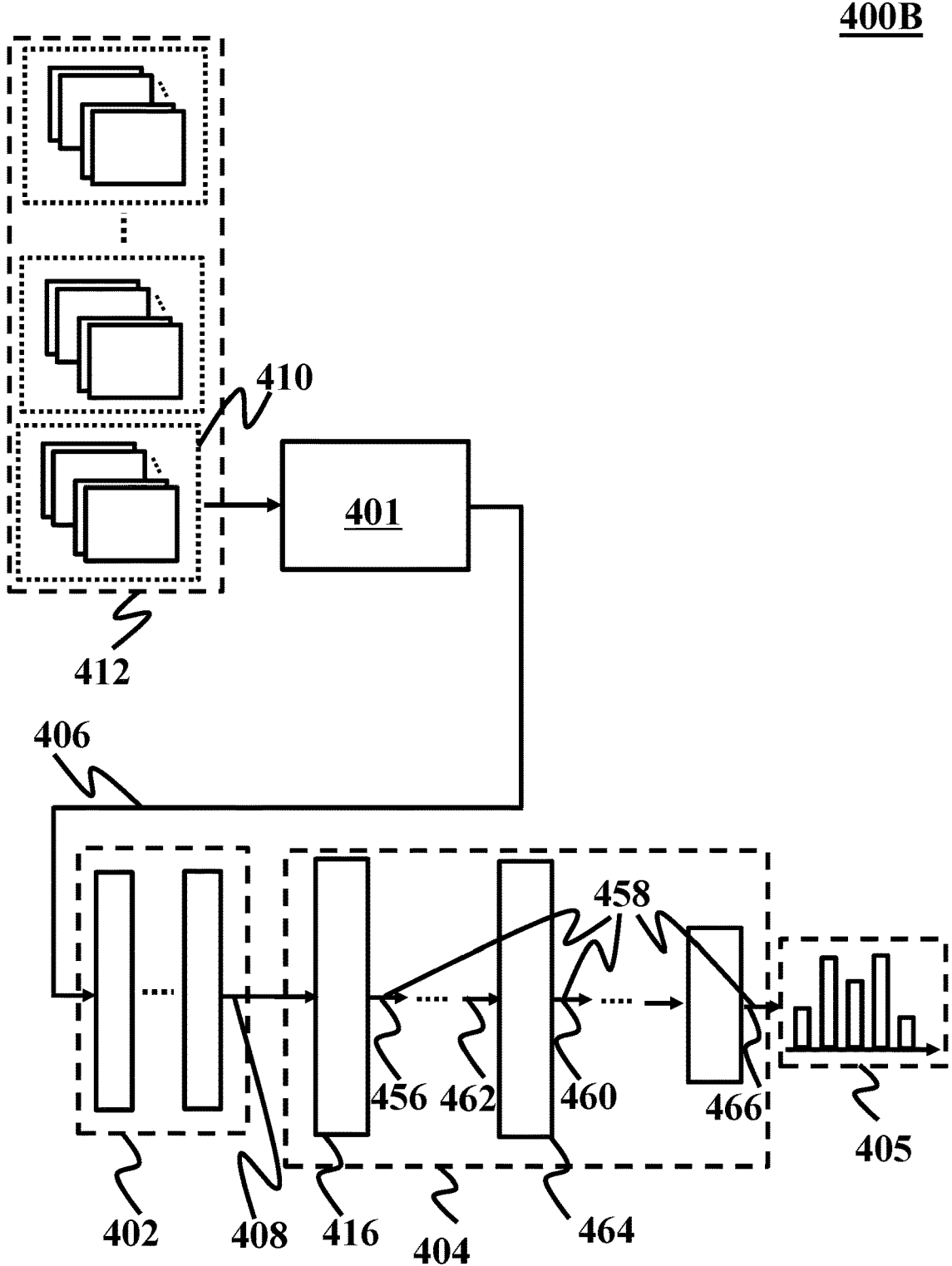
FIG. 4B shows a schematic of a neural network in a training phase, consistent with one or more exemplary embodiments of the present disclosure.

FIG. 4B shows a schematic of a neural network in a training phase, consistent with one or more exemplary embodiments of the present disclosure. In an exemplary embodiment, neural network 400 may include a feature extraction unit 401, a recurrent neural network 402, and a plurality of fully connected layers 404.

In further detail with respect to step 306, in an exemplary embodiment, initializing neural network 400 may include generating the plurality of initial weights. In an exemplary embodiment, neural network 400 may include a plurality of neurons. In an exemplary embodiment, each neuron of the plurality of neurons may include a respective neuron output of a plurality of neuron outputs. In an exemplary embodiment, a respective number of initial weights of the plurality of initial weights may be multiplied by each respective neuron output of the plurality of neuron outputs. In an exemplary embodiment, a respective multiplication result may be fed to a subsequent neuron of the plurality of neurons. In an exemplary embodiment, generating the plurality of initial weights may include generating a plurality of random variables from a predefined probability distribution. In an exemplary embodiment, the predefined probability distribution may be determined by a designer of neural network 400 according to a required range of each initial weight based on a saturation region of a plurality of non-linear activation functions applied on the plurality of neurons. In an exemplary embodiment, the predefined probability distribution may be selected from Gaussian or uniform probability distributions.

For further detail with regard to step 308, in an exemplary embodiment, the plurality of updated weights may be generated by feeding a training video of a plurality of training videos to neural network 400. In an exemplary embodiment, the training video may be fed to neural network 400 by the processor. In an exemplary embodiment, the processor may receive the training video from a video capturing device (such as a camera) or a memory.

In an exemplary embodiment, the second iterative process may be repeated until a value of the loss function becomes lower than a predefined threshold. In an exemplary embodiment, the predefined threshold may be set by a designer of neural network 400 according to a required performance of neural network 400. In an exemplary embodiment, to increase the performance of neural network 400, i.e., to achieve lower values of the loss function, a value of the predefined threshold may be decreased. In an exemplary embodiment, the loss function may be defined as a function of different components (e.g., mean, variance, etc.) of a training score distribution 405 and a ground truth distribution.

In an exemplary embodiment, the loss function may be defined by the following:

$$L(p, q) = \begin{cases} \sum_{m=1}^{M} p_m \log\left(\frac{p_m}{q_m}\right), \text{ or} \\ \sum_{m=1}^{M} |p_m - q_m| \end{cases} \quad \text{Equation (1)}$$

where $L(.,.)$ is the loss function, p is training score distribution 405, q is the ground truth distribution, $p_m$ is an $m^{th}$ component of training score distribution 405, $q_m$ is an $m^{th}$ component of the ground truth distribution, and M is a number of the plurality of scores. An exemplary ground truth distribution may be obtained from a plurality of viewers. In doing so, each viewer of the plurality of viewers may assign a score from the plurality of scores to the training video. Next, in an exemplary embodiment, a histogram of scores for the training video may be obtained and regarded as the ground truth distribution. In an exemplary embodiment, the loss function may represent a measure of distance between the ground truth distribution and training score distribution 405. Other exemplary types of loss functions may also be defined in step 308, e.g., earth mover's distance, mean square error, or mean absolute error.

Figure 3C:
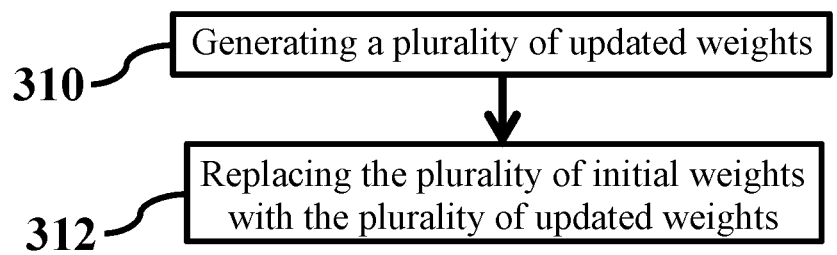
FIG. 3C shows a flowchart of a second iterative process, consistent with one or more exemplary embodiments of the present disclosure.

FIG. 3C shows a flowchart of a second iterative process, consistent with one or more exemplary embodiments of the present disclosure. In an exemplary embodiment, the second iterative process may include generating a plurality of updated weights (step 310) and replacing the plurality of initial weights with the plurality of updated weights (step 312).

Figure 3D:
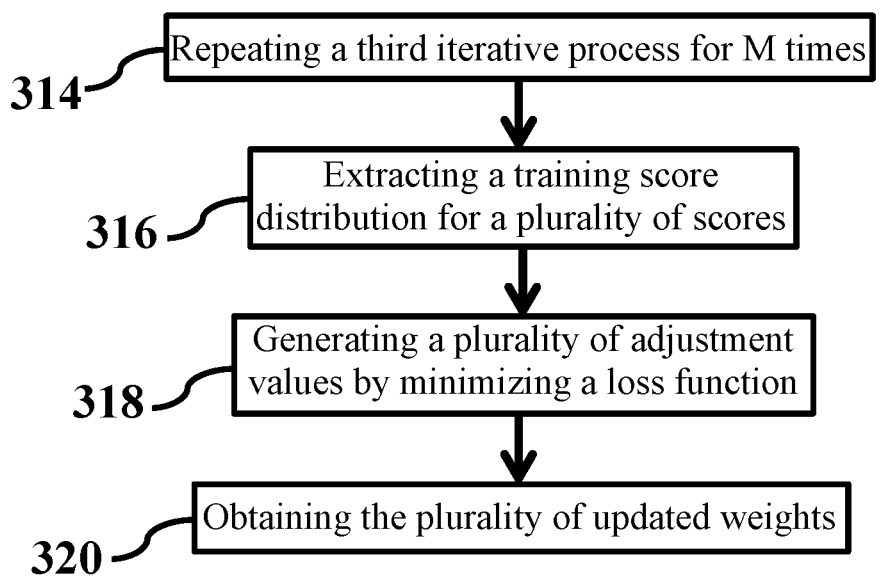
FIG. 3D shows a flowchart of generating a plurality of updated weights, consistent with one or more exemplary embodiments of the present disclosure.

In further detail with respect to step 310, FIG. 3D shows a flowchart of generating a plurality of updated weights, consistent with one or more exemplary embodiments of the present disclosure. In an exemplary embodiment, generating the plurality of updated weights may include repeating a third iterative process M times (step 314), extracting training score distribution 405 for the plurality of scores (step 316), generating a plurality of adjustment values by minimizing a loss function (step 318), and obtaining the plurality of updated weights (step 320).

Figure 3E:
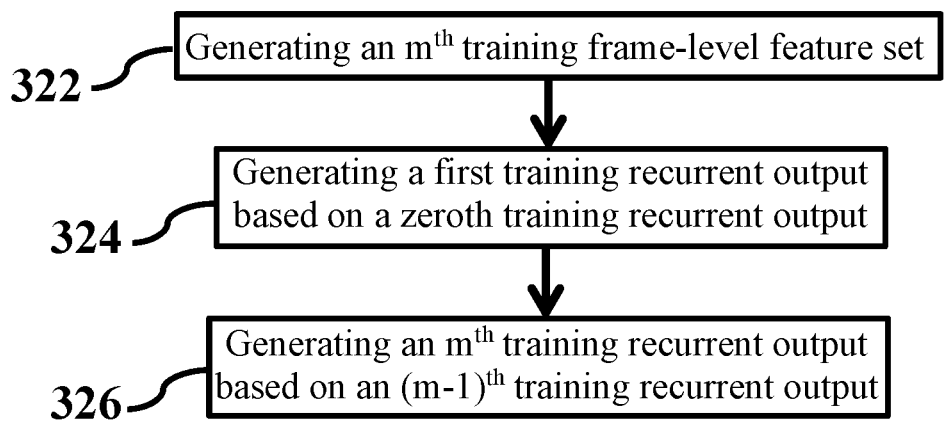
FIG. 3E shows a flowchart of an iteration of the third iterative process, consistent with one or more exemplary embodiments of the present disclosure.

For further detail regarding step 314, FIG. 3E shows a flowchart of an $m^{th}$ iteration of the third iterative process, consistent with one or more exemplary embodiments of the present disclosure. Referring to FIGS. 3E and 4B, in an exemplary embodiment, an $m^{th}$ iteration of the third iterative process, where m ∈ [1,M] and M is a number of a plurality of video frames 419, may include generating an $m^{th}$ training frame-level feature set 406 (step 322), generating a first training recurrent output based on a zeroth training recurrent output (step 324), and generating an $m^{th}$ training recurrent output 408 based on an $(m-1)^{th}$ training recurrent output (step 326).

For further detail with respect to step 322, in an exemplary embodiment, $m^{th}$ training frame-level feature set 406 may be extracted from an $m^{th}$ training video frame 410 of a plurality of training video frames 412. In an exemplary embodiment, the training video may include plurality of training video frames 412. In an exemplary embodiment, $m^{th}$ training frame-level feature set 406 may be generated utilizing feature extraction unit 401. In an exemplary embodiment, neural network 400 may be a deep neural network. An exemplary deep neural network may include a plurality of layers between an input layer of the deep neural network and an output layer of the deep neural network. Therefore, a performance of training neural network 400 may be negatively impacted by overfitting. In an exemplary embodiment, when a deep neural network gets impacted by overfitting, the deep neural network may provide very low values of error defined as a difference between ground truth and training outputs. However, the performance of the deep neural network for test data may be drastically degraded. To resolve this issue, in an exemplary embodiment, generating $m^{th}$ training frame-level feature set 406 may include applying a first dropout process on feature extraction unit 401.

In further detail regarding step 324, in an exemplary embodiment, the first training recurrent output may be generated by feeding a first training frame-level feature set to recurrent neural network 402. In an exemplary embodiment, the zeroth training recurrent output may be equal to a zero vector. In an exemplary embodiment, the zero vector may include zero elements. For further detail with respect to step 326, in an exemplary embodiment, $m^{th}$ training recurrent output 408 may be generated by feeding $m^{th}$ training frame-level feature set 406 to recurrent neural network 402.

Referring again to FIG. 3D, in an exemplary embodiment, step 316 may include extracting training score distribution 405. In further detail with regard to step 316, in an exemplary embodiment, training score distribution 405 may be extracted from an $M^{th}$ training recurrent output. Referring again to FIG. 4A, in an exemplary embodiment, training score distribution 405 may be extracted from the training video. In an exemplary embodiment, training score distribution 405 may be extracted by feeding the $M^{th}$ training recurrent output to a first fully connected layer 416 of plurality of fully connected layers 404. In an exemplary embodiment, extracting training score distribution 405 may include a second dropout process on plurality of fully connected layers 404.

For further detail regarding step 318, in an exemplary embodiment, minimizing the loss function may be performed utilizing a gradient descent method. In an exemplary gradient descent method, each adjustment value of the plurality of adjustment values may be proportional to a gradient of the loss function with respect to a respective initial weight of the plurality of initial weights. In an exemplary embodiment, the plurality of adjustment values may be obtained utilizing a back propagation algorithm. For further detail with respect to step 320, in an exemplary embodiment, the plurality of updated weights may be obtained by adding each of the plurality of adjustment values to a respective initial weight of the plurality of initial weights.

Figure 3F:
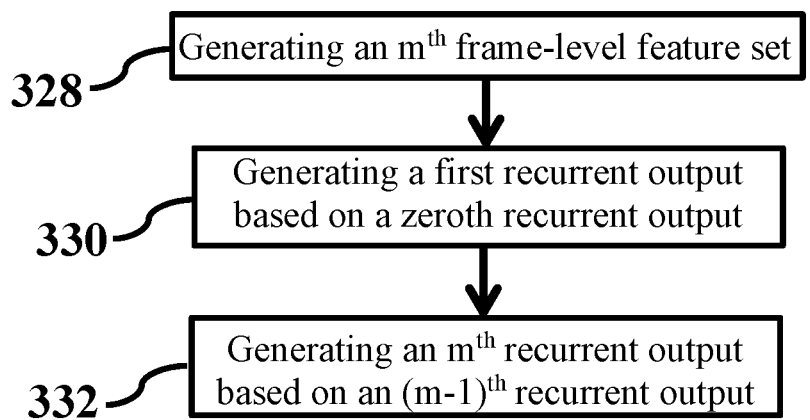
FIG. 3F shows a flowchart of an iteration of a first iterative process, consistent with one or more exemplary embodiments of the present disclosure.

Referring again to FIG. 3A, in an exemplary embodiment, step 302 may include repeating a first iterative process M times. In further detail regarding step 302, FIG. 3F shows a flowchart of an $m^{th}$ iteration of a first iterative process, consistent with one or more exemplary embodiments of the present disclosure. Referring again to FIGS. 3F and 4A, In an exemplary embodiment, an $m^{th}$ iteration of the first iterative process, as explained above, where $m \in [1,M]$ and M is a number of plurality of video frames 419, may include generating an $m^{th}$ frame-level feature set 420 (step 328), generating a first recurrent output of a plurality of recurrent outputs based on a zeroth recurrent output of the plurality of recurrent outputs (step 330), and generating an $m^{th}$ recurrent output of the plurality of recurrent outputs based on an $(m-1)^{th}$ recurrent output of the plurality of recurrent outputs (step 332).

In an exemplary embodiment, the first iterative process may be repeated utilizing one or more processors. In an exemplary embodiment, the video may include plurality of video frames 419. In an exemplary embodiment, $m^{th}$ frame-level feature set 420 may be generated utilizing feature extraction unit 401. In an exemplary embodiment, feature extraction unit 401 may be implemented utilizing one or more processors. An exemplary $m^{th}$ frame-level feature set 420 may be extracted from an $m^{th}$ video frame 424 of plurality of video frames 419. An exemplary $m^{th}$ frame-level feature set 420 may include a plurality of feature sets 426.

Figure 3G:
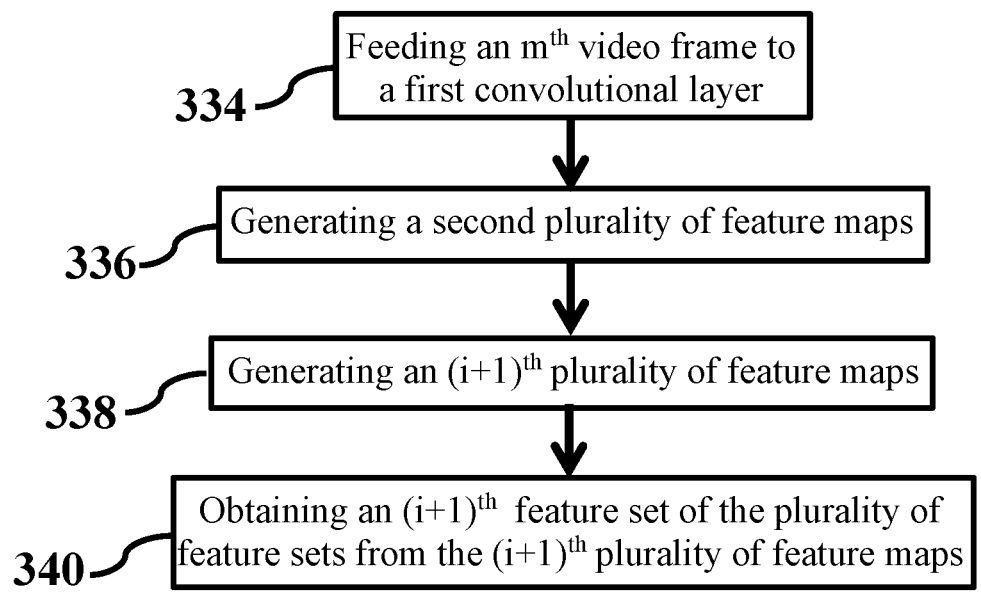
FIG. 3G shows a flowchart of generating a frame-level feature set, consistent with one or more exemplary embodiments of the present disclosure.

For further details with respect to step 328, FIG. 3G shows a flowchart of a method for generating an $m^{th}$ frame-level feature set, consistent with one or more exemplary embodiments of the present disclosure. An exemplary method 328A may include a first implementation of step 328. In an exemplary embodiment, generating $m^{th}$ frame-level feature set 420 may include feeding $m^{th}$ video frame 424 to a first convolutional layer of a plurality of convolutional layers (step 334), generating a second plurality of feature maps (step 336), generating an $(i+1)^{th}$ plurality of feature maps (step 338), and obtaining an $(i+1)^{th}$ feature set of plurality of feature sets 426 from $(i+1)^{th}$ plurality of feature maps (step 340).

Figure 4C:
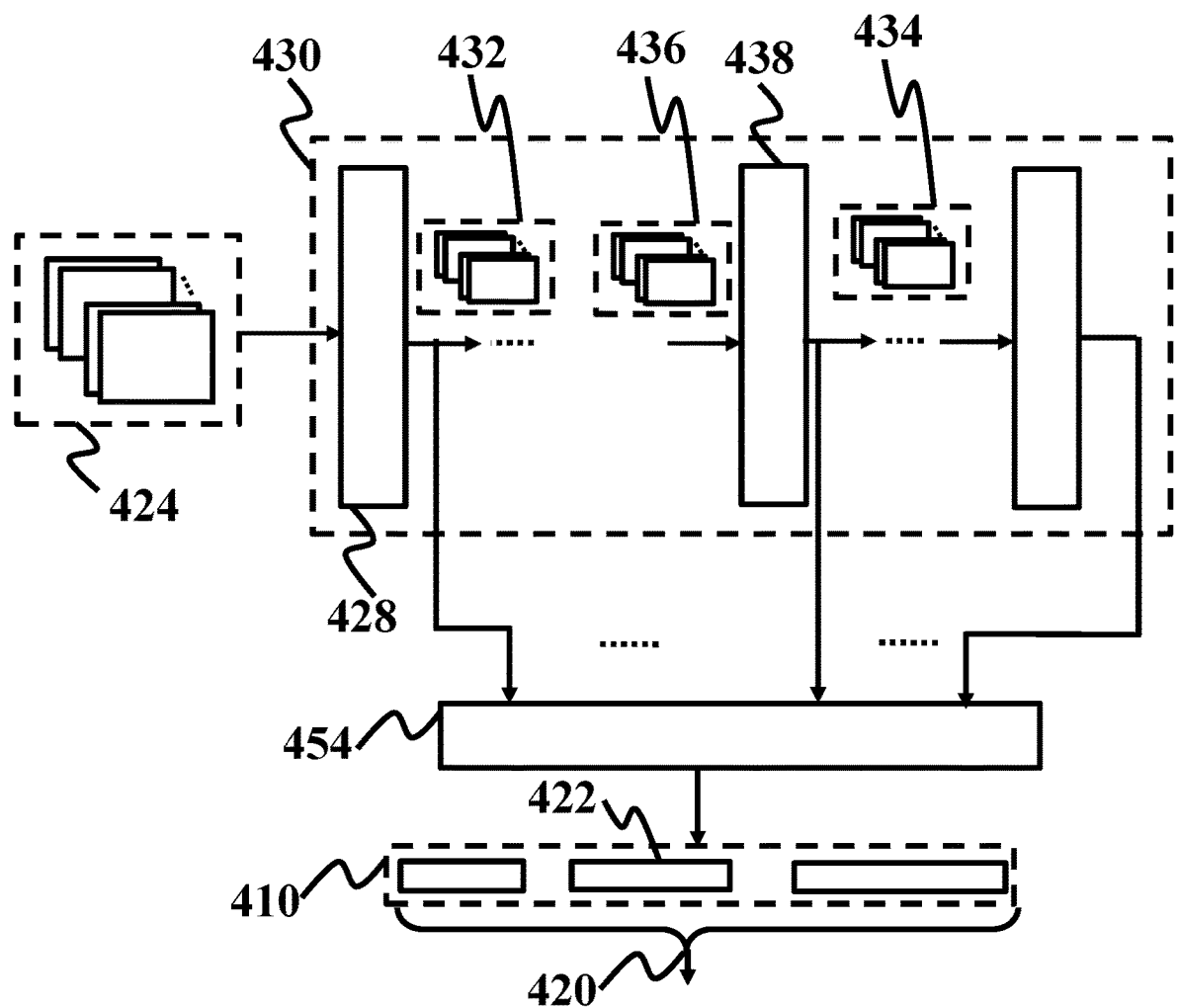
FIG. 4C shows a schematic of a plurality of convolutional layers, consistent with one or more exemplary embodiments of the present disclosure.

FIG. 4C shows a schematic of a plurality of convolutional layers, consistent with one or more exemplary embodiments of the present disclosure. In an exemplary embodiment, neural network 400 may further include a plurality of convolutional layers 430. In an exemplary embodiment, plurality of convolutional layers 430 may include a first convolutional layer 428 and an $i^{th}$ convolutional layer 438.

An exemplary first convolutional layer 428 may be configured to generate a second plurality of feature maps 432. In an exemplary embodiment, $i^{th}$ convolutional layer 438 may be configured to generate an $(i+1)^{th}$ plurality of feature maps 434.

In an exemplary embodiment, plurality of convolutional layers 430 may include a first implementation of feature extraction unit 401. In an exemplary embodiment, second plurality of feature maps 432 may be generated by applying $m^{th}$ video frame 424 to first convolutional layer 428. In an exemplary embodiment, $(i+1)^{th}$ plurality of feature maps 434 may be generated by applying an $i^{th}$ plurality of feature maps 436 to $i^{th}$ convolutional layer 438 of plurality of convolutional layers 430, where $1 \leq i \leq N$ and N is a number of plurality of convolutional layers 430.

In further detail with regard to step 334, in an exemplary embodiment, $m^{th}$ video frame 424 may be fed to first convolutional layer 428 by the processor. In an exemplary embodiment, the processor may receive $m^{th}$ video frame 424 from a video capturing device (such as a camera) or a memory. For further detail regarding step 336, in an exemplary embodiment, second plurality of feature maps 432 may be generated by applying $m^{th}$ video frame 424 to first convolutional layer 428. In an exemplary embodiment, generating the second plurality of feature maps may be similar to generating $(i+1)^{th}$ plurality of feature maps 434.

Figure 3H:
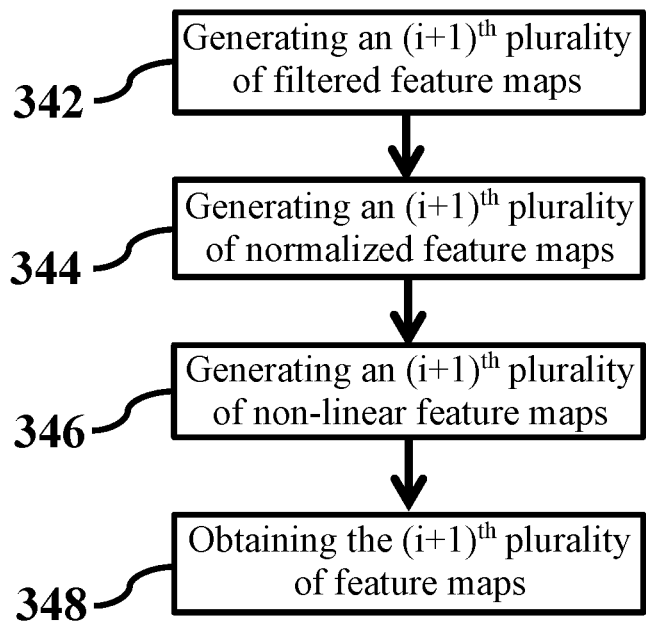
FIG. 3H shows a flowchart of generating a plurality of feature maps, consistent with one or more exemplary embodiments of the present disclosure.

For further detail with respect to step 338, FIG. 3H shows a flowchart of generating an $(i+1)^{th}$ plurality of feature maps, consistent with one or more exemplary embodiments of the present disclosure. In an exemplary embodiment, generating $(i+1)^{th}$ plurality of feature maps 434 may include generating an $(i+1)^{th}$ plurality of filtered feature maps (step 342), generating an $(i+1)^{th}$ plurality of normalized feature maps (step 344), generating an $(i+1)^{th}$ plurality of non-linear feature maps (step 346), and obtaining $(i+1)^{th}$ plurality of feature maps 434 (step 348).

Figure 4D:
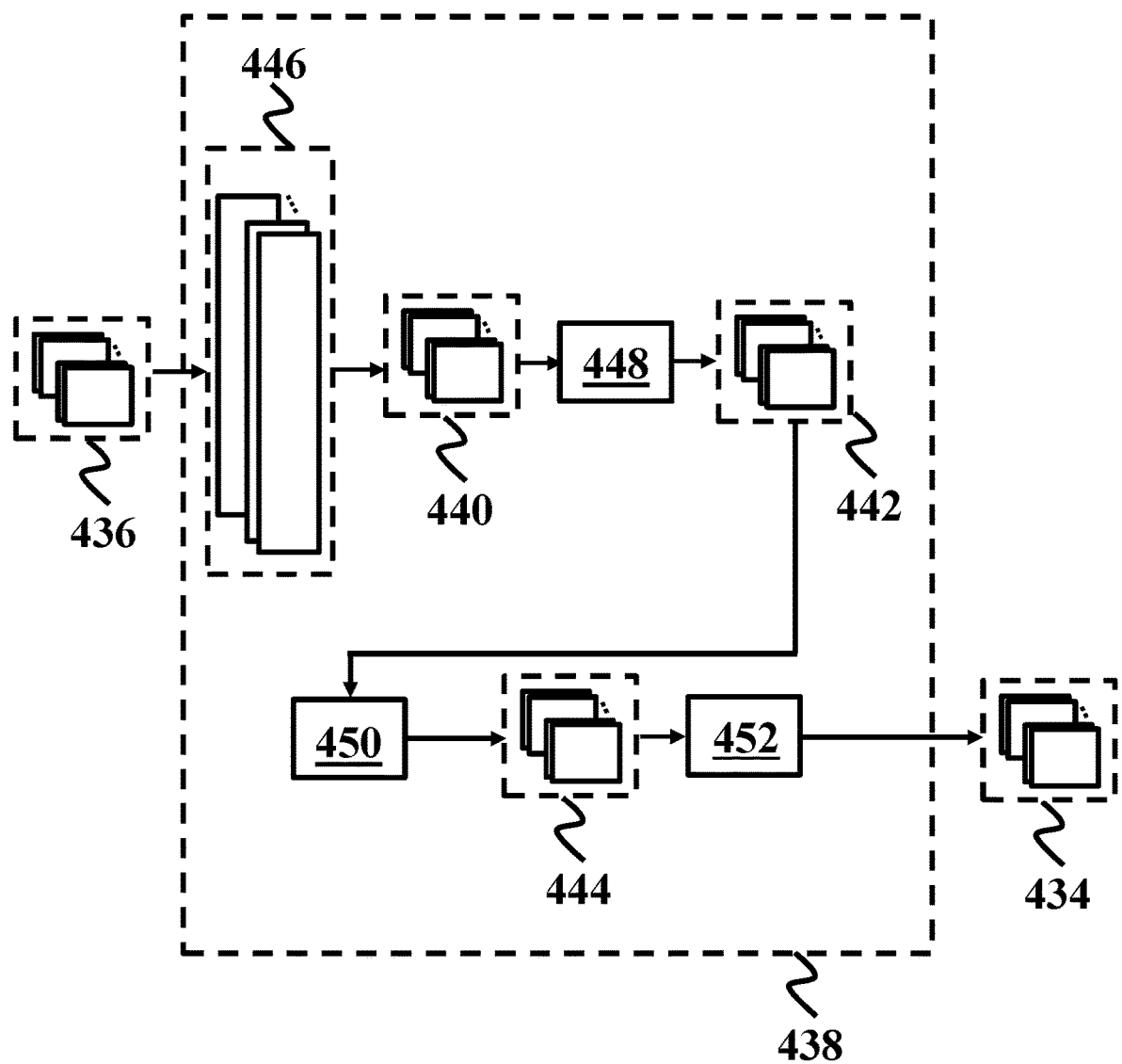
FIG. 4D shows a schematic of a convolutional layer, consistent with one or more exemplary embodiments of the present disclosure.

FIG. 4D shows a schematic of a convolutional layer, consistent with one or more exemplary embodiments of the present disclosure. In an exemplary embodiment, $i^{th}$ convolutional layer 438 may include an $i^{th}$ plurality of filters 446, a batch normalization layer 448, an $i^{th}$ activation layer 450, and a pooling layer 452.

In further detail with respect to step 342, in an exemplary embodiment, generating may include applying $i^{th}$ plurality of filters 446 on $i^{th}$ plurality of feature maps 436. In an exemplary embodiment, each filter of $i^{th}$ plurality of filters 446 may include $N_i$ number of two dimensional filters, where $N_i$ is a number of $i^{th}$ plurality of feature maps 436. An exemplary two dimensional filter may include a matrix which may perform a convolution operation on a window of a respective feature map of $i^{th}$ plurality of feature maps 436. In other words, an exemplary filter of $i^{th}$ plurality of filters 446 may include a three dimensional filter which may be generated by stacking $N_i$ two dimensional filters. In an exemplary embodiment, applying $i^{th}$ plurality of filters 446 on $i^{th}$ plurality of feature maps 436 may include applying each of two dimensional filters on a respective feature map of $i^{th}$ plurality of feature maps 436 and obtaining a respective result. In an exemplary embodiment, the respective result may correspond to an output of an exemplary two dimensional filter. An element of each of may be obtained by a summation over respective results obtained from each of two dimensional filters. Next, in an exemplary embodiment, a respective filtered feature map of may be obtained by sweeping each two dimensional filter on the respective feature map. In an exemplary embodiment, applying $i^{th}$ plurality of filters 446 on $i^{th}$ plurality of feature maps 436 may include applying a separable convolution on $i^{th}$ plurality of feature maps 436. An exemplary separable convolution may break down $N_i$ two dimensional convolutions into two simpler types of convolutions, i.e., a depth wise convolution and a point wise convolution. This may reduce a number of all weights of a neural network and may result in computational efficiency.

For further detail regarding step 344, in an exemplary embodiment, generating an $(i+1)^{th}$ plurality of normalized feature maps 442 feature maps may include applying a batch normalization process on. In an exemplary embodiment, batch normalization layer 448 may be configured to perform the batch normalization process. In an exemplary embodiment, each normalized feature map of $(i+1)^{th}$ plurality of normalized feature maps 442 may be obtained from a respective filtered feature map of.

In further detail with regard to step 346, in an exemplary embodiment, generating an $(i+1)^{th}$ plurality of non-linear feature maps 444 $(i+1)^{th}$ plurality of non-linear feature maps 444 may include implementing an $i^{th}$ non-linear activation function on each of $(i+1)^{th}$ plurality of normalized feature maps 442. In an exemplary embodiment, $i^{th}$ activation layer 450 may be configured to implement the $i^{th}$ non-linear activation function.

For further detail with respect to step 348, in an exemplary embodiment, generating $(i+1)^{th}$ plurality of feature maps 434 may include applying a max pooling on each of $(i+1)^{th}$ plurality of non-linear feature maps 444. In an exemplary embodiment, the max pooling may be applied utilizing a pooling layer 452. In an exemplary embodiment, generating $(i+1)^{th}$ plurality of feature maps 434 may further include applying an average pooling on each of $(i+1)^{th}$ plurality of non-linear feature maps 444. An exemplary pooling layer may apply a window of a predefined size on each of $(i+1)^{th}$ plurality of non-linear feature maps 444 and obtain a maximum or average of windowed version of each of $(i+1)^{th}$ plurality of non-linear feature maps 444. Therefore, in an exemplary embodiment, each of $(i+1)^{th}$ plurality of feature maps 434 may be generated by sweeping the window on each of $(i+1)^{th}$ plurality of non-linear feature maps 444. As a result, a size of each of $(i+1)^{th}$ plurality of non-linear feature maps 444 may be smaller than a size of a respective non-linear feature map of $(i+1)^{th}$ plurality of non-linear feature maps 444. Consequently, a number of required operations may proportionally be decreased.

Referring again to FIG. 3G, in an exemplary embodiment, step 340 may include obtaining an $(i+1)^{th}$ feature set 436 of plurality of feature sets 426 from $(i+1)^{th}$ plurality of feature maps 434. In further detail regarding step 340, in an exemplary embodiment, obtaining $(i+1)^{th}$ feature set 436 may include applying a global average pooling on $(i+1)^{th}$ plurality of non-linear feature maps 444. In an exemplary embodiment, neural network 400 may further include a global average pooling layer 454. In an exemplary embodiment, the global average pooling may be applied utilizing global average pooling layer 454. In an exemplary embodiment, the global average pooling may include obtaining an average of each non-linear feature map of $(i+1)^{th}$ plurality of non-linear feature maps 444. In an exemplary embodiment, the global average pooling may include obtaining a set of statistical features from each of $(i+1)^{th}$ plurality of non-linear feature maps 444. For example, global average pooling layer 205 may include obtaining a standard deviation or a moment of an arbitrary order. In an exemplary embodiment, a size of an output of convolutional layer may be proportional to a size of an input of the convolutional layer. In an exemplary embodiment, when a size of the input of the convolutional layer is H×W and a size of a two dimensional filter corresponding to the convolutional layer is M×N, a size of an output of the convolutional layer may become (H−M+1)×(W−N+1). Obtaining each feature set from each of $(i+1)^{th}$ plurality of non-linear feature maps 444 using global statistics, i.e., using all elements of each of $(i+1)^{th}$ plurality of non-linear feature maps 444, may result in feature sets of a size that may be independent of a size of each of $i^{th}$ plurality of feature maps 436. As a result, in an exemplary embodiment, a score distribution 445 with a predefined number of plurality of scores for the video may be obtained from neural network 400 where the video may be of an arbitrary size.

In an exemplary embodiment, obtaining plurality of feature sets 426 from each convolutional layer of plurality of convolutional layers 430 may lead to different combinations of feature maps. In an exemplary embodiment, feature sets obtained from both low convolutional layers (e.g., first convolutional layer 428) and high convolutional layers (e.g., an $N^{th}$ convolutional layer, where N is a number of plurality of convolutional layers 430) may provide more information to recurrent neural network 402 compared with obtaining features sets solely from the $N^{th}$ convolutional layer. On the other hand, recurrent neural network 402 may be connected to low convolutional layers through feature sets obtained from feature maps extracted from low convolutional layers. Therefore, a value of gradient may be considerable with respect to weights in low convolutional layers, which may prevent a vanishing gradient phenomenon.

Figure 3I:
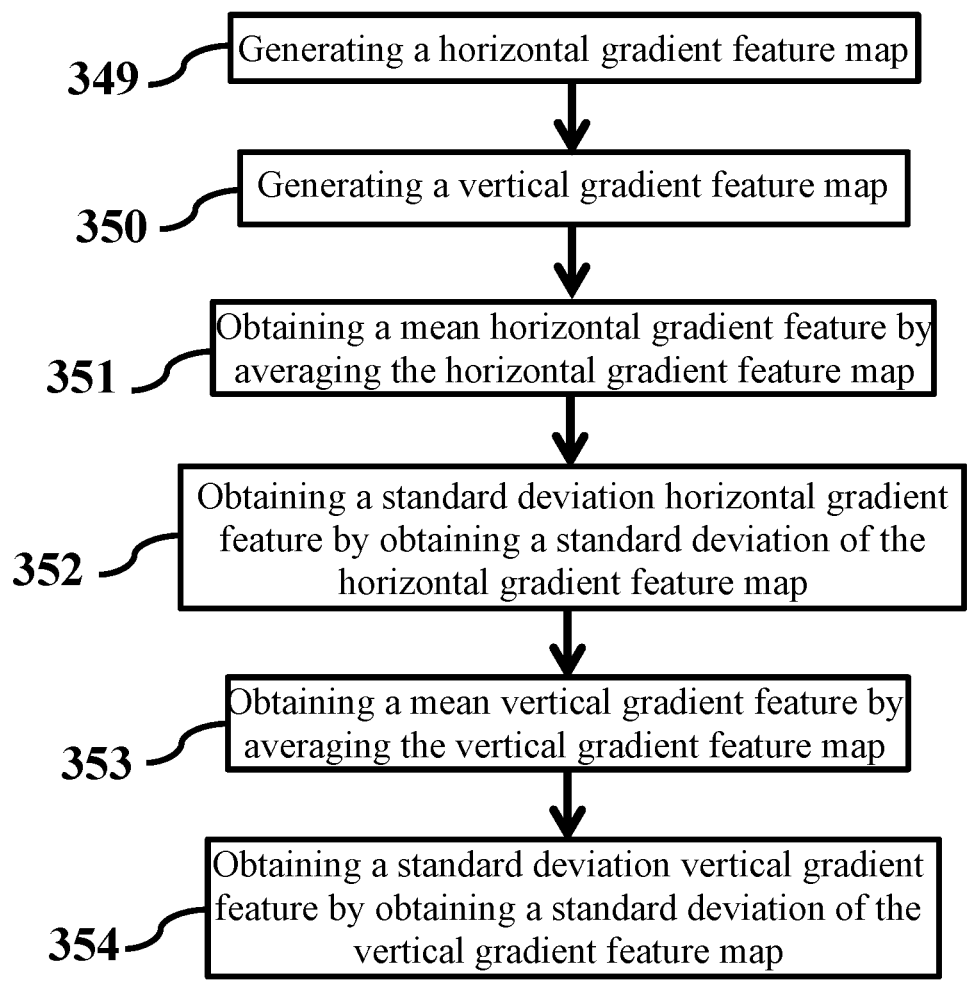
FIG. 3I shows a flowchart of a method for generating a first feature set, consistent with one or more exemplary embodiments of the present disclosure.

Referring again to FIG. 3F, in an exemplary embodiment, step 328 may include generating the $m^{th}$ frame-level feature set 420. In an exemplary embodiment, generating the $m^{th}$ frame-level feature set 420 may include generating the plurality of feature sets 426. FIG. 3I shows a flowchart of a method for generating a first feature set, consistent with one or more exemplary embodiments of the present disclosure. An exemplary method 328B may include a second implementation of step 328. An exemplary method 328B may include generating a first feature set of plurality of feature sets 426. In an exemplary embodiment, method 328B may include generating a horizontal gradient feature map (step 349), generating a vertical gradient feature map (step 350), obtaining a mean horizontal gradient feature (step 351), obtaining a standard deviation horizontal gradient feature (step 352), obtaining a mean vertical gradient feature (step 353), and obtaining a standard deviation vertical gradient feature (step 354).

In an exemplary embodiment, step 349 may include generating the horizontal gradient feature map. In an exemplary embodiment, the horizontal gradient feature map may be generated by applying a horizontal gradient filter of a size $r_1 \times p_1$ on an $m^{th}$ luminance channel of $m^{th}$ video frame 424, where $r_1$ and $p_1$ are positive integers.

In an exemplary embodiment, step 350 may include generating the vertical gradient feature map. In an exemplary embodiment, the vertical gradient feature map may be generated by applying a vertical gradient filter of a size $r_1 \times p_1$ on the $m^{th}$ luminance channel.

In an exemplary embodiment, step 351 may include obtaining the mean horizontal gradient feature map. An exemplary mean horizontal gradient feature may be obtained by averaging the horizontal gradient feature map. In an exemplary embodiment, the first feature set may include the mean horizontal gradient feature.

In an exemplary embodiment, step 352 may include obtaining a standard deviation horizontal gradient feature. An exemplary standard deviation horizontal gradient feature may be obtained by obtaining a standard deviation of the horizontal gradient feature map. In an exemplary embodiment, the first feature set may further include the standard deviation horizontal gradient feature.

In an exemplary embodiment, step 353 may include obtaining a mean vertical gradient feature. An exemplary mean vertical gradient feature may be obtained by averaging the vertical gradient feature map. In an exemplary embodiment, the first feature set may further include the mean vertical gradient.

In an exemplary embodiment, step 354 may include obtaining the standard deviation vertical gradient feature. An exemplary standard deviation vertical gradient feature may be obtained by obtaining a standard deviation of the vertical gradient feature map. In an exemplary embodiment, the first feature set may further include the standard deviation vertical gradient feature.

In an exemplary embodiment, the horizontal gradient filter together with the vertical gradient filter may provide an approximation of a gradient of the $m^{th}$ luminance channel. In an exemplary embodiment, the horizontal gradient filter together with the vertical gradient filter may be utilized for extracting edge information from $m^{th}$ video frame 424.

Figure 3J:
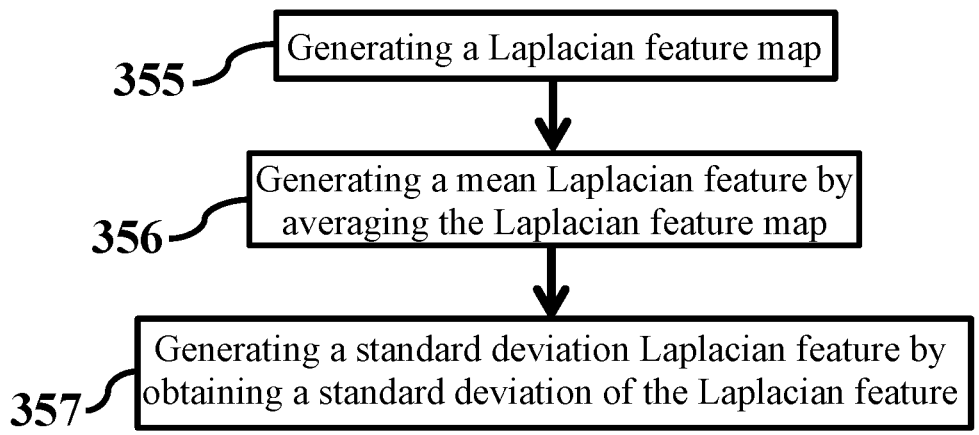
FIG. 3J shows a flowchart of a method for generating a second feature set, consistent with one or more exemplary embodiments of the present disclosure.

FIG. 3J shows a flowchart of a method for generating a second feature set, consistent with one or more exemplary embodiments of the present disclosure. An exemplary method 328C may include a third implementation of step 328. An exemplary method 328C may include generating a second feature set of plurality of feature sets 426. In an exemplary embodiment, method 328C may include generating a Laplacian feature map (step 355), generating a mean Laplacian feature (step 356), and generating a standard deviation Laplacian feature (step 357).

In an exemplary embodiment, step 355 may include generating the Laplacian feature map. An exemplary Laplacian feature map may be generated by applying a Laplacian filter of size $r_2 \times p_2$ on the $m^{th}$ luminance channel. In an exemplary embodiment, step 356 may include generating the mean Laplacian feature. An exemplary mean Laplacian feature may be generated by averaging the Laplacian feature map. In an exemplary embodiment, the second feature set may include the mean Laplacian feature.

In an exemplary embodiment, step 357 may include generating the standard deviation Laplacian feature. An exemplary standard deviation Laplacian feature may be generated by obtaining a standard deviation of the Laplacian feature map. In an exemplary embodiment, the second feature set may further include the standard deviation Laplacian feature. An exemplary Laplacian filter may be utilized to highlight regions in $m^{th}$ video frame 424 with high intensity change. Therefore, Laplacian feature map may include edge information of $m^{th}$ video frame 424.

Figure 3K:
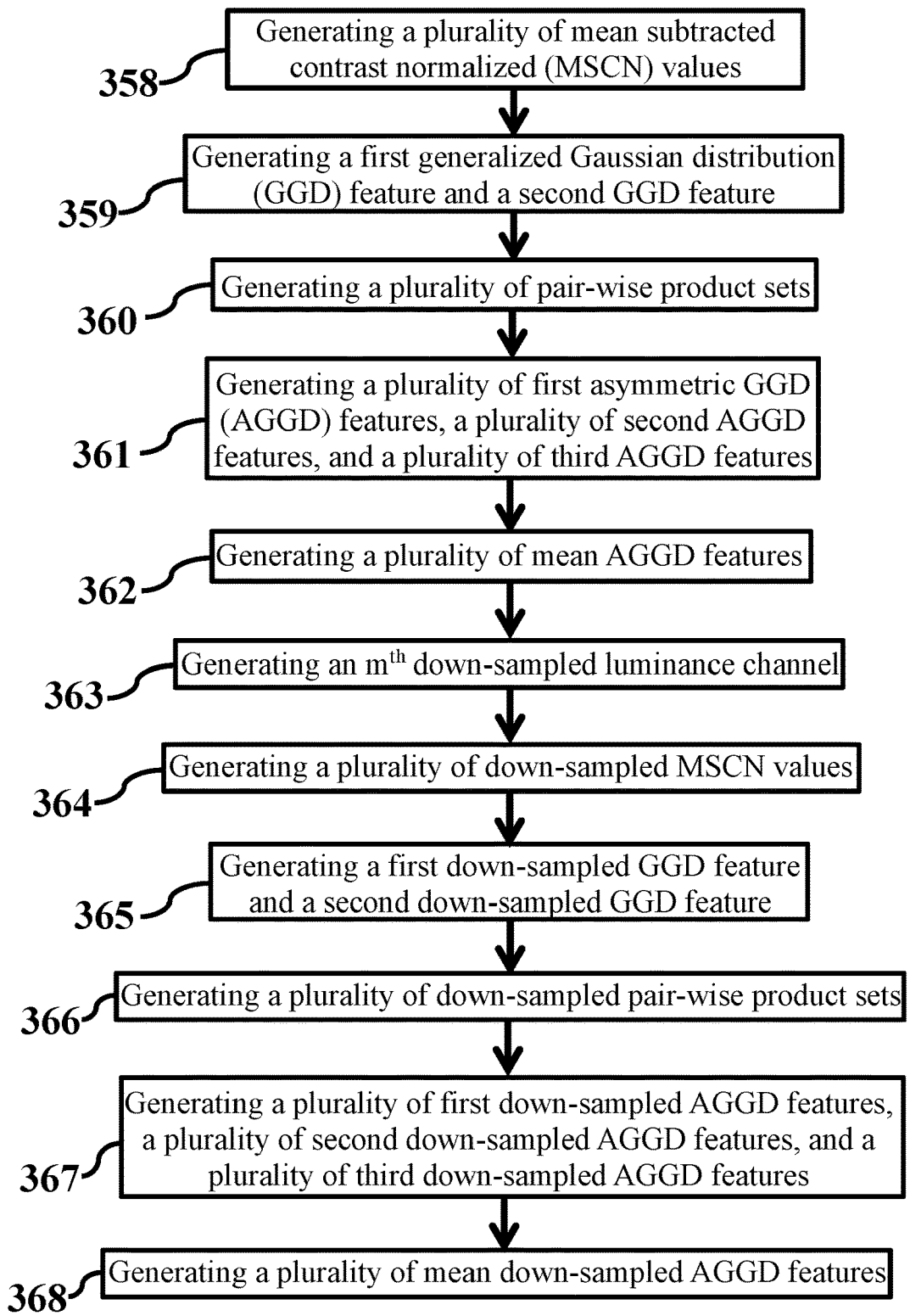
FIG. 3K shows a flowchart of a method for generating a third feature set, consistent with one or more exemplary embodiments of the present disclosure.

FIG. 3K shows a flowchart of a method for generating a third feature set, consistent with one or more exemplary embodiments of the present disclosure. An exemplary method 328D may include a fourth implementation of step 328. An exemplary method 328D may include generating a third feature set of plurality of feature sets 426. In an exemplary embodiment, method 328D may include generating a plurality of mean subtracted contrast normalized (MSCN) values (step 358), generating a first generalized Gaussian distribution (GGD) feature and a second GGD feature (step 359), generating a plurality of pair-wise product sets (step 360), generating a plurality of first asymmetric GGD (AGGD) features, a plurality of second AGGD features, and a plurality of third AGGD features (step 361), generating a plurality of mean AGGD features (step 362), generating an $m^{th}$ down-sampled luminance channel (step 363), generating a plurality of down-sampled MSCN values (step 364), generating a first down-sampled GGD feature and a second down-sampled GGD feature (step 365), generating a plurality of down-sampled pair-wise product sets (step 366), generating a plurality of first down-sampled AGGD features, a plurality of second down-sampled AGGD features, and a plurality of third down-sampled AGGD features (step 367), and generating a plurality of mean down-sampled AGGD features (step 368).

In an exemplary embodiment, step 358 may include generating the plurality of MSCN values. In an exemplary embodiment, plurality of MSCN values may be generated by generating an $(r,p)^{th}$ MSCN value of the plurality of MSCN values. In an exemplary embodiment, the $(r,p)^{th}$ MSCN value may be generated according to an operation defined by the following:

$$\hat{F}_1(r, p) = \frac{F_1(r, p) - \mu_1(r, p)}{\sigma_1(r, p) + C_1}, \qquad \text{Equation (2)}$$

where $\hat{F}_1(r,p)$ is the $(r,p)^{th}$ MSCN value where $r \in [1,H]$, $p \in [1,W]$, H is a height of $m^{th}$ video frame 424, W is a width of $m^{th}$ video frame 424, and $C_1$ is a first constant number. In an exemplary embodiment, $F_1(r,p)$ may include an $(r,p)^{th}$ luminance value of a plurality of luminance values. In an exemplary embodiment, the $m^{th}$ luminance channel may include the $(r,p)^{th}$ luminance value. In an exemplary embodiment, $\mu_1(r,p)$ may include an $(r,p)^{th}$ first weighted local mean of a plurality of first weighted local means. In an exemplary embodiment, the $(r,p)^{th}$ first weighted local mean may be defined by the following:

$$\mu_1(r,p) = \Sigma_{k=-K_1}^{K_1} \Sigma_{l=-L_1}^{L_1} w_{k,l} F_1(r+k, p+l), \qquad \text{Equation (3)}$$

where $K_1$ is a height of a first Gaussian filter, $L_1$ is a width of the first Gaussian filter, and $w_{k,l}$ is a $(k,l)^{th}$ weight of the first Gaussian filter. In an exemplary embodiment, the $(k,l)^{th}$ weight of the first Gaussian filter may be defined by the following:

$$w_{k,l} = \frac{e^{-a_1(k^2+l^2)}}{\sum_{k=-K_1}^{K_1} \sum_{l=-L_1}^{L_1} e^{-a_1(k^2+l^2)}}, \qquad \text{Equation (4)}$$

where $\alpha_1$ is a second constant number. In an exemplary embodiment, $\sigma_1(r,p)$ may include an $(r,p)^{th}$ first weighted local standard deviation of a plurality of first weighted local standard deviations. In an exemplary embodiment, the $(r,p)^{th}$ first weighted local standard deviation may be defined by the following:

$$\sigma_1(r, p) = \sqrt{\sum_{k=-K_1}^{K_1} \sum_{l=-L_1}^{L_1} w_{k,l} [F_1(r+k, p+l) - \mu_1(r, p)]^2}, \qquad \text{Equation (5)}$$

In an exemplary embodiment, step 359 may include generating the first GGD feature and the second GGD feature. In an exemplary embodiment, the first GGD feature and the second GGD feature may be generated by applying a moment-matching method on the plurality of MSCN values. In an exemplary embodiment, the third feature set may include the first GGD feature and the second GGD feature. In an exemplary embodiment, the moment-matching method may include a GGD defined by the following:

$$f_1(x; \alpha_1, \beta_1) = \frac{\alpha_1}{2\beta_1 \Gamma\left(\frac{1}{\alpha_1}\right)} e^{-\frac{|x|^{\alpha_1}}{\beta_1^{\alpha_1}}}, \quad \text{Equation (6)}$$

where $f_1(.;.,.)$ is the GGD, $\Gamma(.)$ is a gamma function, $\alpha_1$ is the first GDD feature, and $\beta_1$ is the second GDD feature.

In an exemplary embodiment, step 360 may include generating the plurality of pair-wise product sets. In an exemplary embodiment, the plurality of pair-wise product sets may be generated by generating a plurality of pair-wise product values. In an exemplary embodiment, a pair-wise product set of the plurality of pair-wise product sets may include a respective plurality of pair-wise product values. In an exemplary embodiment, generating the plurality of pair-wise product values may include generating an $(r,p,\tilde{r},\tilde{p})^{th}$ pair-wise product value of the plurality of pair-wise product values. In an exemplary embodiment, the $(r,p,\tilde{r},\tilde{p})^{th}$ pair-wise product value may be generated according to an operation defined by the following:

$$G_1(r,p,\tilde{r},\tilde{p}) = \hat{F}_1(r,p) \times \hat{F}_1(\tilde{r},\tilde{p}), \quad \text{Equation (7)}$$

where $G_1(r,p,\tilde{r},\tilde{p})$ is the $(r,p,\tilde{r},\tilde{p})^{th}$ pair-wise product value, $|r-\tilde{r}|+|p-\tilde{p}|=1$, $\tilde{r} \in [1,H]$, and $\tilde{p} \in [1,W]$.

In an exemplary embodiment, step 361 may include generating the plurality of first AGGD features, the plurality of second AGGD features, and the plurality of third AGGD features. In an exemplary embodiment, the plurality of first AGGD features, the plurality of second AGGD features, and the plurality of third AGGD features may be generated by applying the moment-matching method on the plurality of pair-wise product sets. In an exemplary embodiment, each of the plurality of pair-wise product sets may include a respective plurality of first AGGD features, a respective plurality of second AGGD features, and a respective plurality of third AGGD features. In an exemplary embodiment, the third feature set may further include the plurality of first AGGD features, the plurality of second AGGD features, and the plurality of third AGGD features. In an exemplary embodiment, the moment-matching method may include an AGGD defined by the following:

$$f_2(x; \gamma_1, \beta_{l,1}, \beta_{r,1}) = \begin{cases} \dfrac{\gamma_1}{(\beta_{l,1}+\beta_{r,1})\Gamma\left(\frac{1}{\gamma_1}\right)} e^{-\frac{|x|^{\gamma_1}}{\beta_l^{\gamma_1}}}, & \forall x \leq 0 \\ \dfrac{\gamma_1}{(\beta_{l,1}+\beta_{r,1})\Gamma\left(\frac{1}{\gamma_1}\right)} e^{-\frac{|x|^{\gamma_1}}{\beta_{r,1}^{\gamma_1}}}, & \forall x > 0 \end{cases} \quad \text{Equation (8)}$$

where $f_2(.;.,.,.)$ is the AGGD, $\gamma_1$ is a first AGGD feature of the plurality of first AGGD features, $\beta_{l,1}$ is a second AGGD feature of the plurality of second AGGD features, and $\beta_{r,1}$ is a third AGGD feature of the plurality of third AGGD features.

In an exemplary embodiment, step 362 may include generating the plurality of mean AGGD features. In an exemplary embodiment, the plurality of mean AGGD features may be generated by generating each of the plurality of mean AGGD features according to a set of operations defined by the following:

$$\eta_1 = (\beta_{r,1} - \beta_{l,1})\frac{\Gamma\left(\frac{2}{\gamma_1}\right)}{\Gamma\left(\frac{1}{\gamma_1}\right)}, \quad \text{Equation (9)}$$

where $\eta_1$ is a mean AGGD feature of the plurality of mean AGGD features. In an exemplary embodiment, the plurality of mean AGGD features may be obtained from a respective pair-wise product set. In an exemplary embodiment, the third feature set may further include the plurality of mean AGGD features.

In an exemplary embodiment, step 363 may include generating the $m^{th}$ down-sampled luminance channel. In an exemplary embodiment, the $m^{th}$ down-sampled luminance channel may be generated by down sampling the $m^{th}$ luminance channel with a factor of 2.

In an exemplary embodiment, step 364 may include generating the plurality of down-sampled MSCN values. In an exemplary embodiment, the plurality of down-sampled MSCN values may be generated by generating a $(t,s)^{th}$ down-sampled MSCN value of the plurality of down-sampled MSCN values. In an exemplary embodiment, the $(t,s)^{th}$ down-sampled MSCN value may be generated according to an operation defined by the following:

$$\hat{F}_2(t,s) = \frac{F_2(t,s) - \mu_2(t,s)}{\sigma_2(t,s) + C_2}, \quad \text{Equation (10)}$$

where $\hat{F}_2(t,s)$ is the $(t,s)^{th}$ down-sampled MSCN value, $$t \in \left[1, \left\lfloor\frac{H}{2}\right\rfloor\right], s \in \left[1, \left\lfloor\frac{W}{2}\right\rfloor\right],$$

and $C_2$ is a third constant number. In an exemplary embodiment, $F_2(t,s)$ may include a $(t,s)^{th}$ down-sampled luminance value of a plurality of down-sampled luminance values. In an exemplary embodiment, the $(t,s)^{th}$ down-sampled luminance value may be obtained from the $m^{th}$ down-sampled luminance channel. In an exemplary embodiment, $\mu_2(t,s)$ may include a $(t,s)^{th}$ second weighted local mean of a plurality of second weighted local means. In an exemplary embodiment, the $(t,s)^{th}$ second weighted local mean may be defined by the following:

$$\mu_2(t,s) = \sum_{k=-K_2}^{K_2} \sum_{l=-L_2}^{L_2} g_{k,l} F_2(t+k, s+l), \quad \text{Equation (11)}$$

where $K_2$ is a height of a second Gaussian filter, $L_1$ is a width of the second Gaussian filter, and $g_{k,l}$ is a $(k,l)^{th}$ weight of the second Gaussian filter. In an exemplary embodiment, the $(k,l)^{th}$ weight of the second Gaussian filter may be defined by the following:

$$g_{k,l} = \frac{e^{-a_2(k^2+l^2)}}{\sum_{k=-K}^{K}\sum_{l=-L}^{L} e^{-a_2(k^2+l^2)}}, \quad \text{Equation (12)}$$

where $\alpha_1$ is a fourth constant number. In an exemplary embodiment, $\sigma_1(r,p)$ may include a $(t,s)^{th}$ second weighted local standard deviation of a plurality of second weighted local standard deviations. In an exemplary embodiment, the $(t,s)^{th}$ second weighted local standard deviation may be defined by the following:

$$\sigma_2(t,s) = \sqrt{\Sigma_{k=-K}^{K}\Sigma_{l=-L}^{L}g_{k,l}[F_2(t+k,s+l)-\mu_2(t,s)]^2}, \quad \text{Equation (13)}$$

In an exemplary embodiment, step 365 may include generating the first down-sampled GGD feature and the second down-sampled GGD feature. In an exemplary embodiment, the first down-sampled GGD feature and the second down-sampled GGD feature may be generated by applying the moment-matching method on the plurality of down-sampled MSCN values. In an exemplary embodiment, the third feature set may further include the first down-sampled GGD feature and the second down-sampled GGD feature. In an exemplary embodiment, the moment-matching method may include the GGD defined by the following:

$$f_1(x; \alpha_2, \beta_2) = \frac{\alpha_2}{2\beta_2 \Gamma\left(\frac{1}{\alpha_2}\right)} e^{-\frac{|x|^{\alpha_2}}{\beta_2^{\alpha_2}}}, \quad \text{Equation (14)}$$

where $\alpha_2$ is the first down-sampled GDD feature, and $\beta_2$ is the second down-sampled GDD feature.

In an exemplary embodiment, step 366 may include generating the plurality of down-sampled pair-wise product sets. In an exemplary embodiment, the plurality of down-sampled pair-wise product sets may be generated by generating a plurality of down-sampled pair-wise product values. In an exemplary embodiment, each of the plurality of down-sampled pair-wise product sets may be obtained from the plurality of down-sampled pair-wise product values. In an exemplary embodiment, generating the plurality of down-sampled pair-wise product values may include generating a $(t,s,\tilde{t},\tilde{s})^{th}$ down-sampled pair-wise product value of the plurality of down-sampled pair-wise product values. In an exemplary embodiment, the $(t,s,\tilde{t},\tilde{s})^{th}$ down-sampled pair-wise product value may be generated according to an operation defined by the following:

$$G_2(t,s,\tilde{t},\tilde{s}) = \tilde{F}_2(t,s) \times \tilde{F}_2(\tilde{t},\tilde{s}), \quad \text{Equation (15)}$$

where $G_2(t,s,\tilde{t},\tilde{s})$ is the $(t,s,\tilde{t},\tilde{s})$ down-sampled pair-wise product value, $$|t-\tilde{t}| + |s-\tilde{s}| = 1, \tilde{t} \in \left[1, \left\lfloor\frac{H}{2}\right\rfloor\right], \text{ and } \tilde{s} \in \left[1, \left\lfloor\frac{W}{2}\right\rfloor\right].$$

In an exemplary embodiment, step 367 may include generating the plurality of first down-sampled AGGD features, the plurality of second down-sampled AGGD features, and the plurality of third down-sampled AGGD features. In an exemplary embodiment, the plurality of first down-sampled AGGD features, the plurality of second down-sampled AGGD features, and the plurality of third down-sampled AGGD features may be generated by applying the moment-matching method on the plurality of down-sampled pair-wise product sets. In an exemplary embodiment, each of the plurality of first down-sampled AGGD features, the plurality of second down-sampled AGGD features, and the plurality of third down-sampled AGGD features may be obtained from a respective down-sampled pair-wise product set of the plurality of down-sampled pair-wise product sets. In an exemplary embodiment, the third feature set may further include the plurality of first down-sampled AGGD features, the plurality of second down-sampled AGGD features, and the plurality of third down-sampled AGGD features. In an exemplary embodiment, the moment-matching method may include the AGGD defined by the following:

$$f_2(x; \gamma_2, \beta_{l,2}, \beta_{r,2}) = \begin{cases} \dfrac{\gamma_2}{(\beta_{l,2}+\beta_{r,2})\Gamma\left(\dfrac{1}{\gamma_2}\right)} e^{-\frac{|x|^{\gamma_2}}{\beta_{l,2}^{\gamma_2}}}, & \forall x \leq 0 \\[2ex] \dfrac{\gamma_2}{(\beta_{l,2}+\beta_{r,2})\Gamma\left(\dfrac{1}{\gamma_2}\right)} e^{-\frac{|x|^{\gamma_2}}{\beta_{r,2}^{\gamma_2}}}, & \forall x > 0 \end{cases} \quad \text{Equation (16)}$$

where $\gamma_2$ is a first down-sampled AGGD feature of the plurality of first down-sampled AGGD features, $\beta_{l,2}$ is a second down-sampled AGGD feature of the plurality of second down-sampled AGGD features, and $\beta_{r,2}$ is a third down-sampled AGGD feature of the plurality of third down-sampled AGGD features.

In an exemplary embodiment, step 368 may include generating the plurality of mean down-sampled AGGD features. In an exemplary embodiment, the plurality of mean down-sampled AGGD features may be generated by generating each of the plurality of mean down-sampled AGGD features according to an operation defined by the following:

$$\eta_2 = (\beta_{r,2} - \beta_{l,2}) \frac{\Gamma\left(\dfrac{2}{\gamma, 2}\right)}{\Gamma\left(\dfrac{1}{\gamma, 2}\right)}, \quad \text{Equation (17)}$$

where $\eta_2$ is a mean down-sampled AGGD feature of the plurality of mean down-sampled AGGD features. In an exemplary embodiment, each of mean down-sampled AGGD features may be obtained from a respective down-sampled pair-wise product set. In an exemplary embodiment, third feature set may further include the plurality of mean down-sampled AGGD features.

Figure 3L:
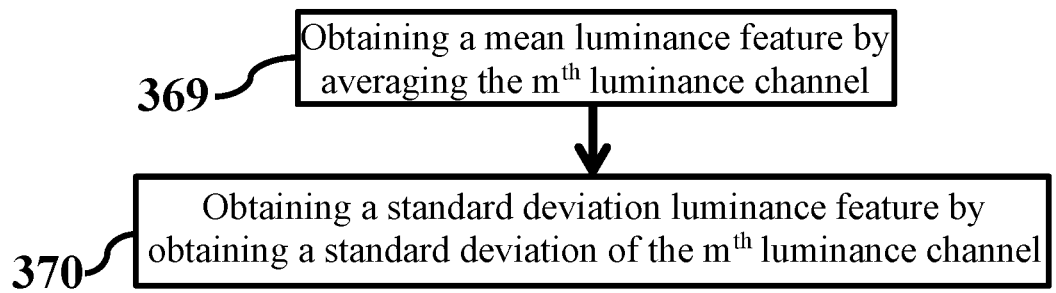
FIG. 3L shows a flowchart of a method for generating a fourth feature set, consistent with one or more exemplary embodiments of the present disclosure.

FIG. 3L shows a flowchart of a method for generating a fourth feature set, consistent with one or more exemplary embodiments of the present disclosure. An exemplary method 328E may include a fifth implementation of step 328. An exemplary method 328E may include generating a fourth feature set of plurality of feature sets 426. In an exemplary embodiment, method 328E may include obtaining a mean luminance feature (step 369), and obtaining a standard deviation luminance feature (step 370).

In an exemplary embodiment, step 369 may include obtaining the mean luminance feature. An exemplary mean luminance feature may be obtained by averaging the $m^{th}$ luminance channel. In an exemplary embodiment, fourth feature set may include the mean luminance feature.

In an exemplary embodiment, step 370 may include obtaining the standard deviation luminance feature. An exemplary standard deviation luminance feature may be obtained by obtaining a standard deviation of the $m^{th}$ luminance channel. In an exemplary embodiment, the fourth feature set may further include the standard deviation luminance feature.

Figure 3M:
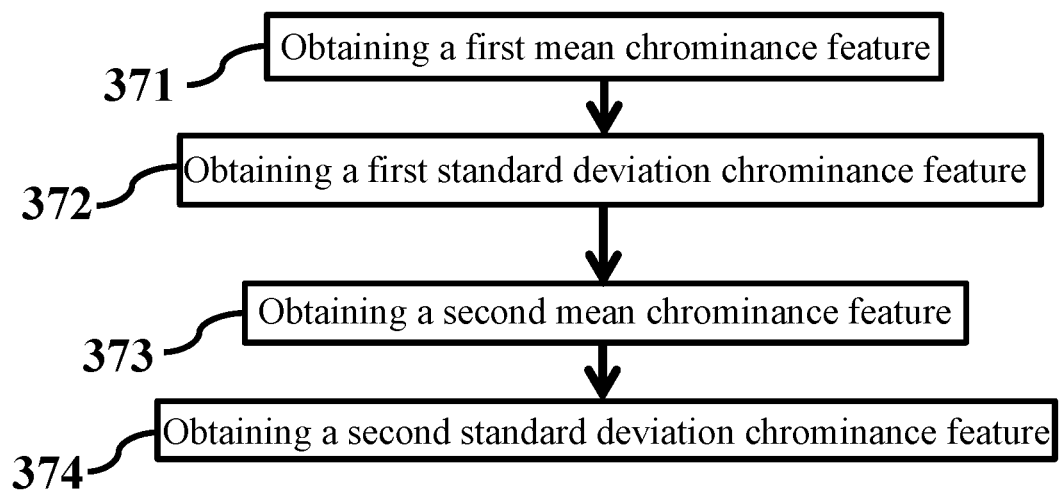
FIG. 3M shows a flowchart of a method for generating a fifth feature set, consistent with one or more exemplary embodiments of the present disclosure.

FIG. 3M shows a flowchart of a method for generating a fifth feature set, consistent with one or more exemplary embodiments of the present disclosure. An exemplary method 328F may include a sixth implementation of step 328. An exemplary method 328F may include generating a fifth feature set of plurality of feature sets 426. In an exemplary embodiment, method 328F may include obtaining a first mean chrominance feature (step 371), obtaining a first standard deviation chrominance feature (step 372), obtaining a second mean chrominance feature (step 373), and obtaining a second standard deviation chrominance feature (step 374).

In an exemplary embodiment, step 371 may include obtaining the first mean chrominance feature. An exemplary first mean chrominance feature may be obtained by averaging a first chrominance channel of $m^{th}$ video frame 424. In an exemplary embodiment, the fifth feature set may include the first mean chrominance feature.

In an exemplary embodiment, step 372 may include obtaining the first standard deviation chrominance feature. In an exemplary embodiment, the first standard deviation chrominance feature may be obtained by obtaining a standard deviation of the first chrominance channel. In an exemplary embodiment, the fifth feature set may further include the first standard deviation chrominance channel.

In an exemplary embodiment, step 373 may include obtaining the second mean chrominance feature. An exemplary second mean chrominance feature may be obtained by averaging a second chrominance channel of $m^{th}$ video frame 424. In an exemplary embodiment, the fifth feature set may further include the second mean chrominance feature. In an exemplary embodiment, step 374 may include obtaining the second standard deviation chrominance feature. An exemplary second standard deviation chrominance feature may be obtained by obtaining a standard deviation of the second chrominance channel. In an exemplary embodiment, the fifth feature set may further include the second standard deviation chrominance channel.

Figure 3N:
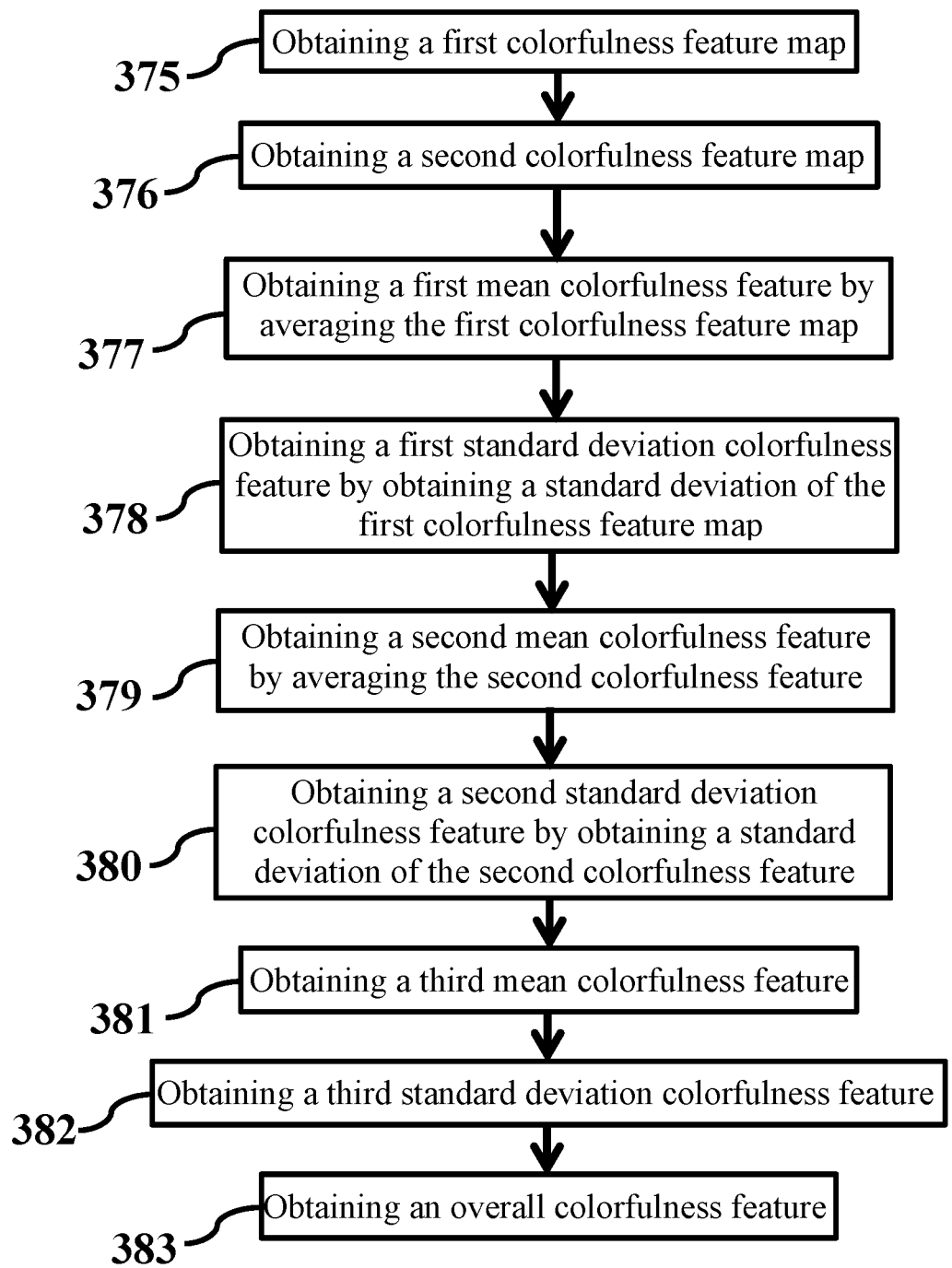
FIG. 3N shows a flowchart of a method for generating a sixth feature set, consistent with one or more exemplary embodiments of the present disclosure.

FIG. 3N shows a flowchart of a method for generating a sixth feature set, consistent with one or more exemplary embodiments of the present disclosure. An exemplary method 328G may include a seventh implementation of step 328. An exemplary method 328G may include generating a sixth feature set of plurality of feature sets 426. In an exemplary embodiment, method 328G may include obtaining a first colorfulness feature map (step 375), obtaining a second colorfulness feature map (step 376), obtaining a first mean colorfulness feature (step 377), obtaining a first standard deviation colorfulness feature (step 378), obtaining a second mean colorfulness feature (step 379), obtaining a second standard deviation colorfulness feature (step 380), obtaining a third mean colorfulness feature (step 381), obtaining a third standard deviation colorfulness feature (step 382), and obtaining an overall colorfulness feature (step 383).

In an exemplary embodiment, step 375 may include obtaining the first colorfulness feature map. An exemplary first colorfulness feature map may be obtained according to an operation defined by the following:

$$rg = R - G, \qquad \text{Equation (18)}$$

where rg is the first colorfulness feature map, R is a red channel of $m^{th}$ video frame 424, and G is a green channel of $m^{th}$ video frame 424.

In an exemplary embodiment, step 376 may include obtaining the second colorfulness feature map. An exemplary second colorfulness feature map may be obtained according to a set of operations defined by the following:

$$yb = 0.5(R+G) - B, \qquad \text{Equation (19)}$$

where yb is the second colorfulness feature map and B is a blue channel of $m^{th}$ video frame 424.

In an exemplary embodiment, step 377 may include obtaining the first mean colorfulness feature. An exemplary first mean colorfulness feature may be obtained by averaging the first colorfulness feature map. In an exemplary embodiment, the sixth feature set may include the first mean colorfulness feature.

In an exemplary embodiment, step 378 may include obtaining the first standard deviation colorfulness feature. An exemplary first standard deviation colorfulness feature may be obtained by obtaining a standard deviation of the first colorfulness feature map. In an exemplary embodiment, the sixth feature set may further include the first standard deviation colorfulness feature.

In an exemplary embodiment, step 379 may include obtaining the second mean colorfulness feature. An exemplary second mean colorfulness feature may be obtained by averaging the second colorfulness feature map. In an exemplary embodiment, the sixth feature set may further include the second mean colorfulness feature.

In an exemplary embodiment, step 380 may include obtaining the second standard deviation colorfulness feature. An exemplary second standard deviation colorfulness feature may be obtained by obtaining a standard deviation of the second colorfulness feature map. In an exemplary embodiment, the sixth feature set may further include the second standard deviation colorfulness feature.

In an exemplary embodiment, step 381 may include obtaining the third mean colorfulness feature. An exemplary third mean colorfulness feature may be obtained according to an operation defined by the following:

$$\mu_{yrgb} = \sqrt{\mu_{rg}^2 + \mu_{yb}^2}, \qquad \text{Equation (20)}$$

where $\mu_{yrgb}$ is the third mean colorfulness feature, $\mu_{rg}$ is the first mean colorfulness feature, and $\mu_{yb}$ is the second mean colorfulness feature. In an exemplary embodiment, the sixth feature set may further include third mean colorfulness feature.

In an exemplary embodiment, step 382 may include obtaining the third standard deviation colorfulness feature. An exemplary third standard deviation colorfulness feature may be obtained according to an operation defined by the following:

$$\sigma_{yrgb} = \sqrt{\sigma_{rg}^2 + \sigma_{yb}^2}, \qquad \text{Equation (21)}$$

where $\sigma_{yrgb}$ is the third standard deviation colorfulness feature, $\sigma_{rg}$ is the first standard deviation colorfulness feature, and $\sigma_{yb}$ is the second standard deviation colorfulness feature. In an exemplary embodiment, the sixth feature set may further include third standard deviation colorfulness feature.

In an exemplary embodiment, step 383 may include obtaining the overall colorfulness feature. An exemplary overall colorfulness feature may be obtained according to an operation defined by:

$$M_{yrgb} = \sigma_{yrgb} + 0.3\mu_{yrgb}, \qquad \text{Equation (22)}$$

where $M_{yrgb}$ is the overall colorfulness feature. In an exemplary embodiment, the sixth feature set may further include the overall colorfulness feature.

Figure 3O:
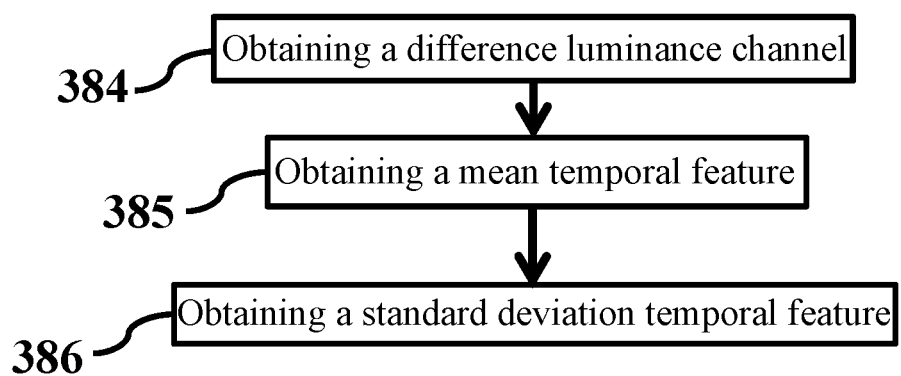
FIG. 3O shows a flowchart of a method for generating a seventh feature set, consistent with one or more exemplary embodiments of the present disclosure.

FIG. 3O shows a flowchart of a method for generating a seventh feature set, consistent with one or more exemplary embodiments of the present disclosure. An exemplary method 328H may include an eighth implementation of step 328. An exemplary method 328H may include generating a seventh feature set of plurality of feature sets 426. In an exemplary embodiment, method 328H may include obtaining a difference luminance channel (step 384), obtaining a mean temporal feature (step 385), and obtaining a standard deviation temporal feature (step 386).

In an exemplary embodiment, step 384 may include obtaining the difference luminance channel. Referring to FIG. 4A, an exemplary difference luminance channel may be obtained by subtracting an $(m-1)^{th}$ luminance channel of an $(m-1)^{th}$ video frame 455 from the $m^{th}$ luminance channel.

In an exemplary embodiment, step 385 may include obtaining the mean temporal feature. An exemplary mean temporal feature may be obtained by averaging the difference luminance channel. In an exemplary embodiment, the seventh feature set may include the mean temporal feature.

In an exemplary embodiment, step 386 may include obtaining the standard deviation temporal feature. An exemplary standard deviation temporal feature may be obtained by obtaining a standard deviation of the difference luminance channel. In an exemplary embodiment, the seventh feature set may further include the standard deviation temporal feature.

Referring again to FIG. 3F, in an exemplary embodiment, step 330 may include generating a first recurrent output. In further detail regarding step 330, in an exemplary embodiment, the first recurrent output may be generated utilizing the processor. In an exemplary embodiment, the first recurrent output may be generated by feeding a first frame-level feature set to recurrent neural network 402.

Figure 4E:
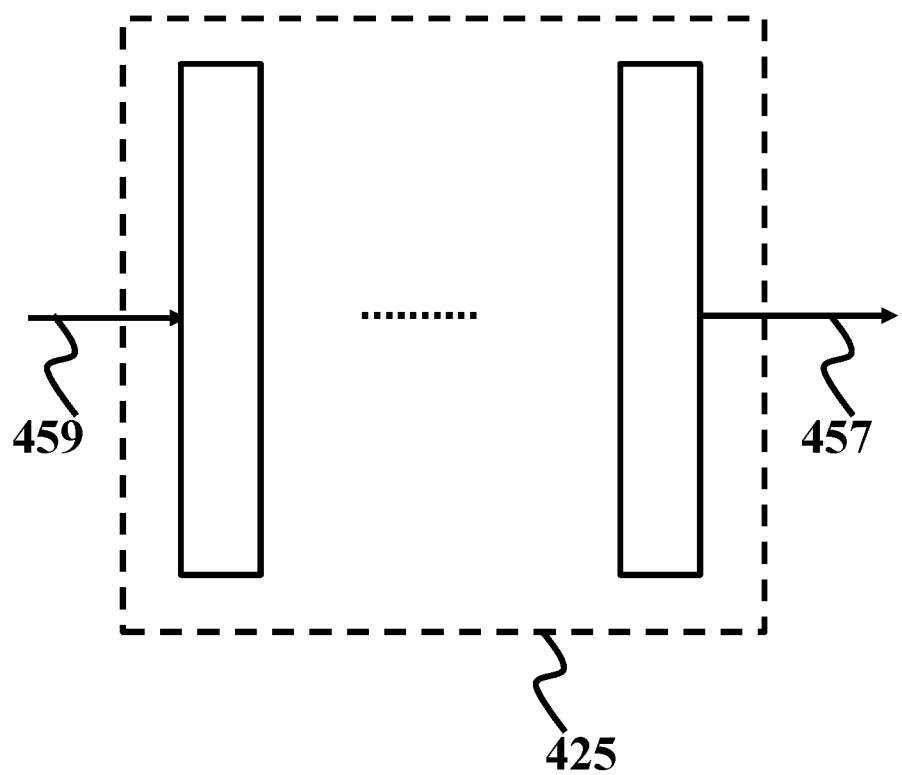
FIG. 4E shows a schematic of a recurrent neural network, consistent with one or more exemplary embodiments of the present disclosure.

FIG. 4E shows a schematic of a recurrent neural network, consistent with one or more exemplary embodiments of the present disclosure. In an exemplary embodiment, the zeroth recurrent output may be equal to the zero vector. Referring to FIGS. 4A and 4E, in an exemplary embodiment, feeding the first frame-level feature set to recurrent neural network 402 may include feeding the first frame-level feature set to a long short-term memory (LSTM) network 402A. In an exemplary embodiment, LSTM network 402A may include a plurality of LSTM layers 425. In an exemplary embodiment, LSTM network 402A may include a plurality of feedback connections. In an exemplary embodiment, the plurality of feedback connections may feed a preceding output of LSTM network 402A to a present input of the LSTM network 402A. In an exemplary embodiment, LSTM network 402A may include a plurality of cell states. In an exemplary embodiment, the plurality of cell states may be updated according to the present input. As a result, temporal information of the video may be extracted from the plurality of cell states.

For further detail with regard to step 332, in an exemplary embodiment, an $m^{th}$ recurrent output 457 may be generated utilizing the processor. In an exemplary embodiment, recurrent neural network 402 may be configured to generated an $m^{th}$ recurrent output 457 based on an $(m-1)^{th}$ recurrent output 459.

In an exemplary embodiment, an $m^{th}$ recurrent output 457 may be generated by feeding $m^{th}$ frame-level feature set 420 to recurrent neural network 402. In an exemplary embodiment, feeding $m^{th}$ frame-level feature set 420 to recurrent neural network 402 may include feeding $m^{th}$ frame-level feature set 420 to the LSTM network.

Figure 3P:
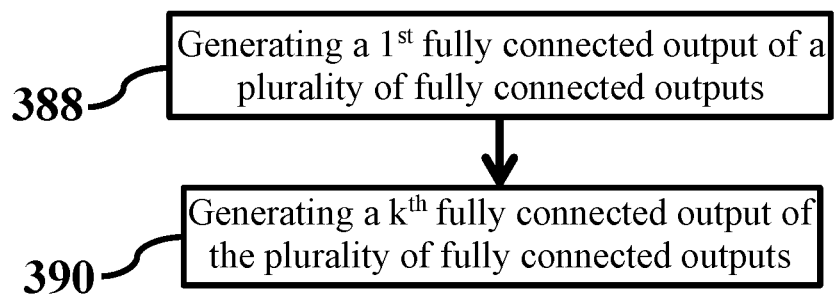
FIG. 3P shows a flowchart of for extracting a score distribution, consistent with one or more exemplary embodiments of the present disclosure.

Referring again to FIG. 3A, in an exemplary embodiment, step 304 may include extracting score distribution 445. In further detail with respect to step 304, FIG. 3P shows a flowchart of for extracting a score distribution, consistent with one or more exemplary embodiments of the present disclosure. Referring again to FIGS. 3P and 4A, in an exemplary embodiment, extracting score distribution 445 may include generating a first fully connected output 456 of a plurality of fully connected outputs 458 (step 388) and generating a $k^{th}$ fully connected output 460 of plurality of fully connected outputs 458 (step 390). In an exemplary embodiment, score distribution 445 may be extracted utilizing the processor.

For further detail regarding step 388, in an exemplary embodiment, generating first fully connected output 456 may include applying an $M^{th}$ recurrent output 427 of the plurality of recurrent outputs to first fully connected layer 416. For further detail regarding step 390, in an exemplary embodiment, generating $k^{th}$ fully connected output 460 may include applying a $(k-1)^{th}$ fully connected output 462 of plurality of fully connected outputs 458 to a $k^{th}$ fully connected layer 464 of plurality of fully connected layers 404, where $1 \le k \le L$, and L is a number of plurality of fully connected layers 404. In an exemplary embodiment, applying $(k-1)^{th}$ fully connected output 462 to $k^{th}$ fully connected layer 464 may include implementing an $(N+k)^{th}$ non-linear activation function on $(k-1)^{th}$ fully connected output 462. In an exemplary embodiment, implementing the $(N+k)^{th}$ non-linear activation function may include implementing one of a rectified linear unit (ReLU) function or an exponential linear unit (ELU) function. In an exemplary embodiment, implementing the $(N+k)^{th}$ non-linear activation function may include implementing other types of activation functions such as leaky ReLU, scaled ELU, parametric ReLU, etc. In an exemplary embodiment, an $(N+L)^{th}$ non-linear activation function may include a softmax function. In an exemplary embodiment, a zeroth fully connected output may include $M^{th}$ recurrent output 427. In an exemplary embodiment, an $L^{th}$ fully connected output 466 of plurality of fully connected outputs 458 may include score distribution 445.

Figure 5:
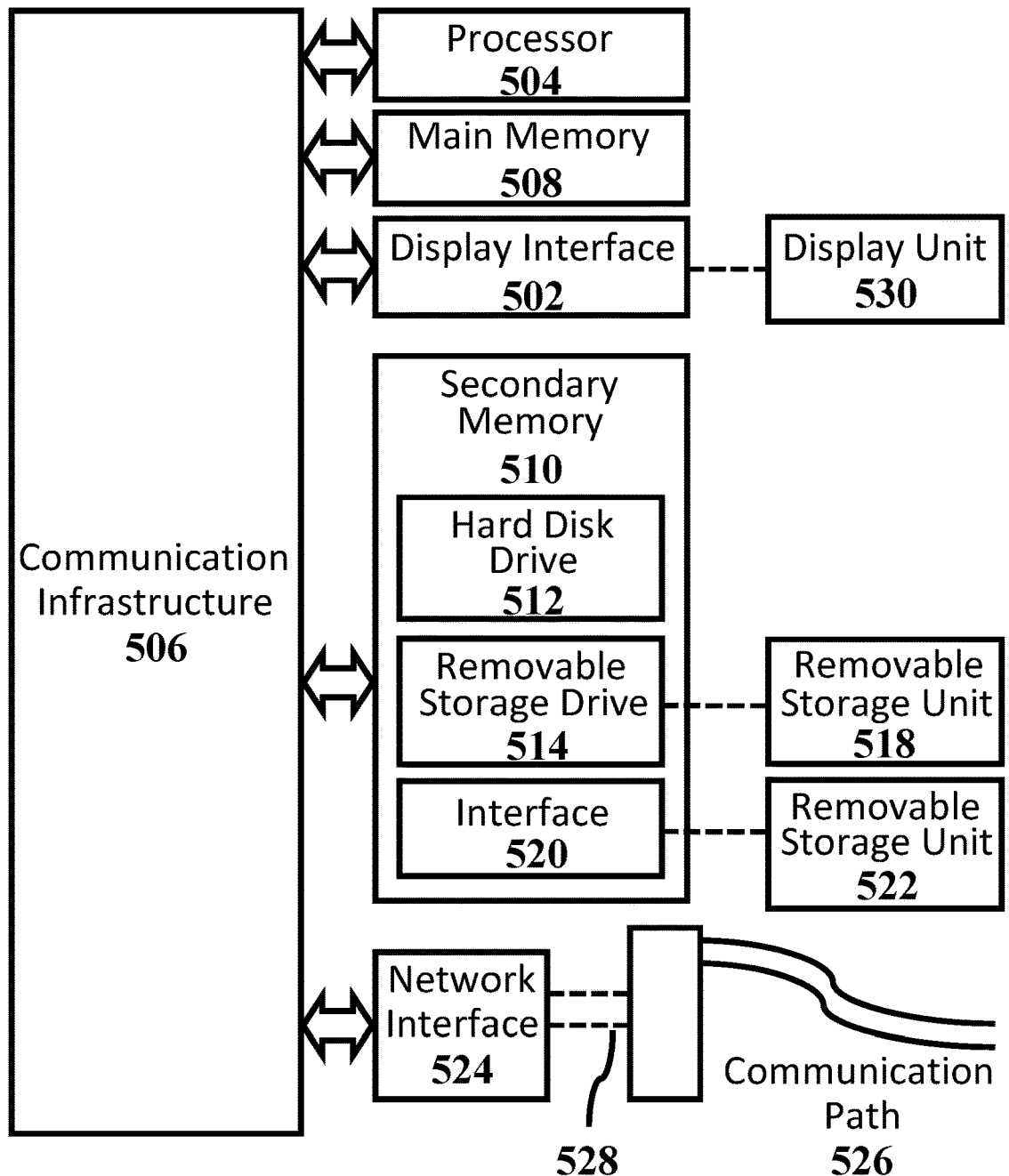
FIG. 5 shows a high-level functional block diagram of a computer system, consistent with one or more exemplary embodiments of the present disclosure.

FIG. 5 shows an example computer system 500 in which an embodiment of the present invention, or portions thereof, may be implemented as computer-readable code, consistent with exemplary embodiments of the present disclosure. For example, different steps of method 100 and method 300 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-4E.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose (e.g., a graphical processing unit) or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 308 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 100 illustrated by flowchart 100 of FIG. 1A and in method 300 illustrated by flowchart 300 of FIG. 3A discussed above. Accordingly, such computer programs represent controllers of computer system 500. Where exemplary embodiments of method 100 and method 300 are implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

EXAMPLE 1

Figure 6:
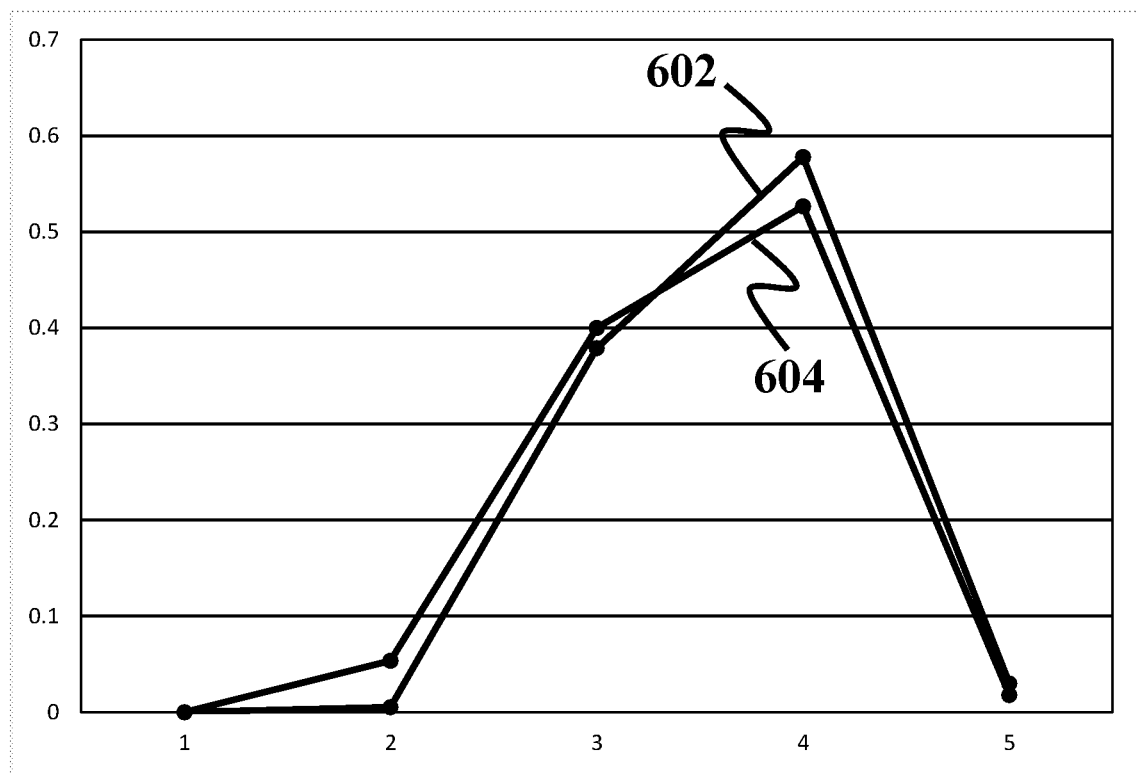
FIG. 6 shows a ground truth distribution and a score distribution of an image, consistent with exemplary embodiments of the present disclosure.

In this example, a performance of a method (analogous to method 100) for quality assessment of an image (analogous to image 210) is demonstrated. Different steps of the method are implemented utilizing a convolutional neural network (analogous to convolutional neural network 200A). The image and a plurality of training images include three channels associated with a red, a green, and a blue channel. The convolutional neural network includes four convolutional layers (each analogous to $i^{th}$ convolutional layer 208) including 32, 64, 128, and 256 number of two dimensional filters (analogous to $i^{th}$ plurality of filters 230). All of two dimensional filters are of a 5×5 size. Each convolutional layer includes a batch normalization layer, an ELU non-linear activation function layer, a dropout layer, and a max pooling layer. The dropout layer is configured to apply a first dropout process in which dropout probabilities of convolutional layers are set to about 0.2, 0.2, 0.3, and 0.4 from first ($1^{st}$) convolutional layer (analogous to first ($1^{st}$) convolutional layer 206) to $4^{th}$ convolutional layer, respectively. The pooling layer of each convolutional layer includes a max pooling layer with a window of 3×3 size. A global average layer (analogous to global average pooling layer 205) obtains an average of each of a plurality of feature maps (analogous to (i+1)$^{th}$ plurality of feature maps 214). The convolutional neural network further includes three fully connected layers (analogous to plurality of fully connected layers 204), including 512, 512, and 5 neurons. A second dropout process is applied to two first fully connected layers with a dropout probability of 0.2. FIG. 6 shows a ground truth distribution and a score distribution of an image, consistent with exemplary embodiments of the present disclosure. As FIG. 6 shows, a score distribution 602 (analogous to score distribution 244) obtained by the convolutional neural network matches a ground truth distribution 604 for the image.

EXAMPLE 2

In this example, a performance of a method (analogous to method 300) for quality assessment of a video is demonstrated. Different steps of the method are implemented utilizing a neural network (analogous to neural network 400). An m$^{th}$ frame-level feature set (analogous to m$^{th}$ frame-level feature set 420) includes a plurality of feature sets (analogous to plurality of feature sets 426). The plurality of feature sets include a plurality of hand-crafted feature sets (analogous to the first feature set to the seventh feature set). The plurality of hand-crafted feature sets include 51 features.

Figure 7:
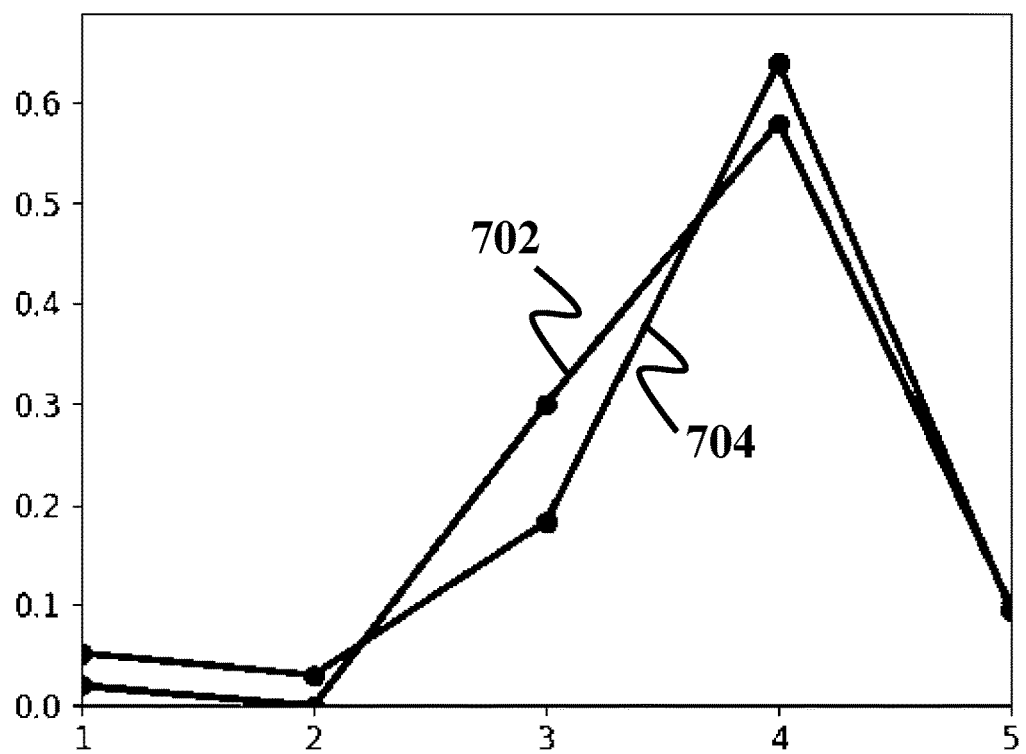
FIG. 7 shows a ground truth distribution and a score distribution of a video, consistent with exemplary embodiments of the present disclosure.

The neural network further includes a recurrent neural network (recurrent neural network 402). The recurrent neural network includes three LSTM layers (analogous to plurality of LSTM layers 425) including 204, 204, and 102 neurons. The neural network further includes three fully connected layers (analogous to plurality of fully connected layers 404), including 102, 102, and 5 neurons. A second dropout process is applied to two first fully connected layers with a dropout probability of 0.5. FIG. 7 shows a ground truth distribution and a score distribution of a video, consistent with exemplary embodiments of the present disclosure. As FIG. 7 shows, a score distribution 702 (analogous to score distribution 445) obtained by the neural network matches a ground truth distribution 704 for the video.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for quality assessment of a video utilizing a neural network, the video comprising a plurality of video frames, the method comprising:
    repeating, utilizing one or more processors, a first iterative process M times, where M is a number of the plurality of video frames, an $m^{th}$ iteration of the first iterative process, where $m \in [1,M]$, comprising:
  generating an $m^{th}$ frame-level feature set associated with an $m^{th}$ video frame of the plurality of video frames, the $m^{th}$ frame-level feature set comprising a plurality of feature sets;
  generating a first recurrent output of a plurality of recurrent outputs associated with a recurrent neural network based on a zeroth recurrent output of the plurality of recurrent outputs, the zeroth recurrent output equal to a zero vector comprising zero elements, the generating the first recurrent output comprising feeding a first frame-level feature set to the recurrent neural network, the recurrent neural network associated with the neural network; and
  generating an $m^{th}$ recurrent output of the plurality of recurrent outputs based on an $(m-1)^{th}$ recurrent output of the plurality of recurrent outputs by feeding the $m^{th}$ frame-level feature set to the recurrent neural network; and
extracting, utilizing the one or more processors, a score distribution for a plurality of scores associated with the video from an $M^{th}$ recurrent output of the plurality of recurrent outputs.

2. The method of claim 1, wherein generating the $m^{th}$ frame-level feature set comprises:
  feeding the $m^{th}$ video frame to a first convolutional layer of a plurality of convolutional layers associated with the neural network;
  generating a second plurality of feature maps by applying the $m^{th}$ video frame to the first convolutional layer;
  generating an $(i+1)^{th}$ plurality of feature maps by applying an $i^{th}$ plurality of feature maps to an $i^{th}$ convolutional layer of the plurality of convolutional layers, where $1 \leq i \leq N$ and N is a number of the plurality of convolutional layers; and
  obtaining an $(i+1)^{th}$ feature set of the plurality of feature sets from the $(i+1)^{th}$ plurality of feature maps.

3. The method of claim 2, wherein generating the $(i+1)^{th}$ plurality of feature maps comprises:
  generating an $(i+1)^{th}$ plurality of filtered feature maps by applying an $i^{th}$ plurality of filters on the $i^{th}$ plurality of feature maps, the $i^{th}$ plurality of filters associated with the $i^{th}$ convolutional layer;
  generating an $(i+1)^{th}$ plurality of normalized feature maps by applying a batch normalization process associated with the $i^{th}$ convolutional layer on the $(i+1)^{th}$ plurality of filtered feature maps, each normalized feature map of the $(i+1)^{th}$ plurality of normalized feature maps associated with a respective filtered feature map of the $(i+1)^{th}$ plurality of filtered feature maps;
  generating an $(i+1)^{th}$ plurality of non-linear feature maps by implementing an $i^{th}$ non-linear activation function associated with the $i^{th}$ convolutional layer on each of the $(i+1)^{th}$ plurality of normalized feature maps; and
  obtaining the $(i+1)^{th}$ plurality of feature maps by applying a max pooling associated with the $i^{th}$ convolutional layer on each of the $(i+1)^{th}$ plurality of non-linear feature maps.

4. The method of claim 3, wherein obtaining the $(i+1)^{th}$ feature set comprises applying a global average pooling on the $(i+1)^{th}$ plurality of non-linear feature maps, the global average pooling comprising obtaining an average of each non-linear feature map of the $(i+1)^{th}$ plurality of non-linear feature maps.

5. The method of claim 1, wherein generating the $m^{th}$ frame-level feature set comprises generating the plurality of feature sets by:
  generating a first feature set of the plurality of feature sets, comprising:
    generating a horizontal gradient feature map by applying a horizontal gradient filter of a size $r_1 \times p_1$ on an $m^{th}$ luminance channel of the $m^{th}$ video frame, where $r_1$ and $p_1$ are positive integers;
    generating a vertical gradient feature map by applying a vertical gradient filter of a size $r_1 \times p_1$ on the $m^{th}$ luminance channel;
    obtaining a mean horizontal gradient feature by averaging the horizontal gradient feature map, the mean horizontal gradient feature associated with the first feature set;
    obtaining a standard deviation horizontal gradient feature by obtaining a standard deviation of the horizontal gradient feature map, the standard deviation horizontal gradient feature associated with the first feature set;
    obtaining a mean vertical gradient feature by averaging the vertical gradient feature map, the mean vertical gradient feature associated with the first feature set; and
    obtaining a standard deviation vertical gradient feature by obtaining a standard deviation of the vertical gradient feature map, the standard deviation vertical gradient feature associated with the first feature set;
  generating a second feature set of the plurality of feature sets, comprising:
    generating a Laplacian feature map by applying a Laplacian filter of size $r_2 \times p_2$ on the $m^{th}$ luminance channel;
    generating a mean Laplacian feature by averaging the Laplacian feature map, the mean Laplacian feature associated with the second feature set; and
    generating a standard deviation Laplacian feature by obtaining a standard deviation of the Laplacian feature map, the standard deviation Laplacian feature associated with the second feature set;
  generating a third feature set of the plurality of feature sets, comprising:
    generating a plurality of mean subtracted contrast normalized (MSCN) values by generating an $(r,p)^{th}$ MSCN value of the plurality of MSCN values according to an operation defined by the following:

$$\hat{F}_1(r, p) = \frac{F_1(r, p) - \mu_1(r, p)}{\sigma_1(r, p) + C_1}$$

where:
  $\hat{F}_1(r,p)$ is the $(r,p)^{th}$ MSCN value where $r \in [1,H]$, $p \in [1,W]$, H is a height of the $m^{th}$ video frame, W is a width of the $m^{th}$ video frame, and $C_1$ is a first constant number,
  $F_1(r,p)$ is an $(r,p)^{th}$ luminance value of a plurality of luminance values associated with the $m^{th}$ luminance channel,
  $\mu_1(r,p)$ is an $(r,p)^{th}$ first weighted local mean of a plurality of first weighted local means defined by the following:

$$\mu_1(r, p) = \sum_{k=-K_1}^{K_1} \sum_{l=-L_1}^{L_1} w_{k,l} F_1(r+k, p+l)$$

where:
$K_1$ is a height of a first Gaussian filter,
$L_1$ is a width of the first Gaussian filter, and
$w_{k,l}$ is a $(k,l)^{th}$ weight associated with the first Gaussian filter defined by the following:

$$w_{k,l} = \frac{e^{-a_1(k^2+l^2)}}{\sum_{k=-K_1}^{K_1} \sum_{l=-L_1}^{L_1} e^{-a_1(k^2+l^2)}}$$

where $a_1$ is a second constant number, and
$\sigma_1(r,p)$ is an $(r,p)^{th}$ first weighted local standard deviation of a plurality of first weighted local standard deviations defined by the following:

$$\sigma_1(r, p) = \sqrt{\sum_{k=-K_1}^{K_1} \sum_{l=-L_1}^{L_1} w_{k,l} [F_1(r+k, p+l) - \mu_1(r, p)]^2}$$

generating a first generalized Gaussian distribution (GGD) feature and a second GGD feature by applying a moment-matching method on the plurality of MSCN values, the first GGD feature and the second GGD feature associated with the third feature set, the moment-matching method comprising a GGD defined by the following:

$$f_1(x; \alpha_1, \beta_1) = \frac{\alpha_1}{2\beta_1 \Gamma\left(\frac{1}{\alpha_1}\right)} e^{-\frac{|x|^{\alpha_1}}{\beta_1^{\alpha_1}}}$$

where:
$f_1(.;.,.)$ is the GGD,
$\Gamma(.)$ is a gamma function,
$\alpha_1$ is the first GDD feature, and
$\beta_1$ is the second GDD feature;
generating a plurality of pair-wise product sets by generating a plurality of pair-wise product values associated with a respective pair-wise product set of the plurality of pair-wise product sets, generating the plurality of pair-wise product values comprising generating an $(r,p,\tilde{r},\tilde{p})^{th}$ pair-wise product value of the plurality of pair-wise product values according to an operation defined by the following:

$G_1(r,p,\tilde{r},\tilde{p}) = \hat{F}_1(r,p) \times \hat{F}_1(\tilde{r},\tilde{p})$ where:
$G_1(r,p,\tilde{r},\tilde{p})$ is the $(r,p,\tilde{r},\tilde{p})^{th}$ pair-wise product value, and
$|r-\tilde{r}|+|p-\tilde{p}|=1$, $\tilde{r} \in [1,H]$, and $\tilde{p} \in [1,W]$;
generating a plurality of first asymmetric GGD (AGGD) features, a plurality of second AGGD features, and a plurality of third AGGD features by applying the moment-matching method on the plurality of pair-wise product sets, each of the plurality of first AGGD features, the plurality of second AGGD features, and the plurality of third AGGD features associated with a respective pair-wise product set of the plurality of pair-wise product sets, wherein the plurality of first AGGD features, the plurality of second AGGD features, and the plurality of third AGGD features are associated with the third feature set, the moment-matching method comprising an AGGD defined by the following:

$$f_2(x; \gamma_1, \beta_{l,1}, \beta_{r,1}) = \begin{cases} \frac{\gamma_1}{(\beta_{l,1}+\beta_{r,1})\Gamma\left(\frac{1}{\gamma_1}\right)} e^{-\frac{|x|^{\gamma_1}}{\beta_l^{\gamma_1}}}, \forall x \leq 0 \\ \frac{\gamma_1}{(\beta_{l,1}+\beta_{r,1})\Gamma\left(\frac{1}{\gamma_1}\right)} e^{-\frac{|x|^{\gamma_1}}{\beta_{r,1}^{\gamma_1}}}, \forall x > 0 \end{cases}$$

where:
$f_2(.;.,.,.)$ is the AGGD,
$\gamma_1$ is a first AGGD feature of the plurality of first AGGD features,
$\beta_{l,1}$ is a second AGGD feature of the plurality of second AGGD features, and
$\beta_{r,1}$ is a third AGGD feature of the plurality of third AGGD features;
generating a plurality of mean AGGD features by generating each of the plurality of mean AGGD features according to an operation defined by the following:

$$\eta_1 = (\beta_{r,1} - \beta_{l,1}) \frac{\Gamma\left(\frac{2}{\gamma_1}\right)}{\Gamma\left(\frac{1}{\gamma_1}\right)}$$

where $\eta_1$ is a mean AGGD feature of the plurality of mean AGGD features associated with a respective pair-wise product set, the plurality of mean AGGD features associated with the third feature set;
generating an $m^{th}$ down-sampled luminance channel by down sampling the $m^{th}$ luminance channel with a factor of 2;
generating a plurality of down-sampled MSCN values by generating a $(t,s)^{th}$ down-sampled MSCN value of the plurality of down-sampled MSCN values according to an operation defined by the following:

$$\hat{F}_2(t, s) = \frac{F_2(t, s) - \mu_2(t, s)}{\sigma_2(t, s) + C_2}$$

where:
$\hat{F}_2(t,s)$ is the $(t,s)^{th}$ down-sampled MSCN value, $$t \in \left[1, \left\lfloor \frac{H}{2} \right\rfloor\right], s \in \left[1, \left\lfloor \frac{W}{2} \right\rfloor\right],$$

and $C_2$ is a third constant number,
$F_2(r,p)$ is a $(t,s)^{th}$ down-sampled luminance value of a plurality of down-sampled luminance values associated with the $m^{th}$ down-sampled luminance channel, $\mu_2(t,s)$ is a $(t,s)^{th}$ second weighted local mean of a plurality of second weighted local means defined by the following:

$$\mu_2(t, s) = \sum_{k=-K_2}^{K_2} \sum_{l=-L_2}^{L_2} g_{k,l} F_2(t+k, s+l)$$

where:
$K_2$ is a height of a second Gaussian filter,
$L_2$ is a width of the second Gaussian filter, and
$g_{k,l}$ is a $(k,l)^{th}$ weight associated with a second Gaussian filter defined by the following:

$$g_{k,l} = \frac{e^{-a_2(k^2+l^2)}}{\sum_{k=-K}^{K} \sum_{l=-L}^{L} e^{-a_2(k^2+l^2)}}$$

where $a_2$ is a fourth constant number, and
$\sigma_2(t,s)$ is a $(t,s)^{th}$ second weighted local standard deviation of a plurality of second weighted local standard deviations defined by the following:

$$\sigma_2(t, s) = \sqrt{\sum_{k=-K}^{K} \sum_{l=-L}^{L} g_{k,l}[F_2(t+k, s+l) - \mu_2(t, s)]^2}$$

generating a first down-sampled GGD feature and a second down-sampled GGD feature by applying the moment-matching method on the plurality of down-sampled MSCN values, the first down-sampled GGD feature and the second down-sampled GGD feature associated with the third feature set, the moment-matching method comprising the GGD defined by the following:

$$f_1(x; \alpha_2, \beta_2) = \frac{\alpha_2}{2\beta_2 \Gamma\left(\frac{1}{\alpha_2}\right)} e^{-\frac{|x|^{\alpha_2}}{\beta_2^{\alpha_2}}}$$

where:
$\alpha_2$ is the first down-sampled GDD feature, and
$\beta_2$ is the second down-sampled GDD feature;
generating a plurality of down-sampled pair-wise product sets by generating a plurality of down-sampled pair-wise product values associated with a respective down-sampled pair-wise product set of the plurality of down-sampled pair-wise product sets, generating the plurality of down-sampled pair-wise product values comprising generating a $(t,s,\tilde{t},\tilde{s})^{th}$ down-sampled pair-wise product value of the plurality of down-sampled pair-wise product values according to an operation defined by the following:

$$G_2(t,s,\tilde{t},\tilde{s}) = \hat{F}_2(t,s) \times \hat{F}_2(\tilde{t},\tilde{s})$$

where:
$G_2(t,s,\tilde{t},\tilde{s})$ is the $(t,s,\tilde{t},\tilde{s})^{th}$ down-sampled pair-wise product value, and $$|t - \tilde{t}| + |s - \tilde{s}| = 1, \tilde{t} \in \left[1, \left\lfloor \frac{H}{2} \right\rfloor\right], \text{ and } \tilde{s} \in \left[1, \left\lfloor \frac{W}{2} \right\rfloor\right];$$

generating a plurality of first down-sampled AGGD features, a plurality of second down-sampled AGGD features, and a plurality of third down-sampled AGGD features by applying the moment-matching method on the plurality of down-sampled pair-wise product sets, each of the plurality of first down-sampled AGGD features, the plurality of second down-sampled AGGD features, and the plurality of third down-sampled AGGD features associated with a respective down-sampled pair-wise product set of the plurality of down-sampled pair-wise product sets, wherein the plurality of first down-sampled AGGD features, the plurality of second down-sampled AGGD features, and the plurality of third down-sampled AGGD features are associated with the third feature set, the moment-matching method comprising the AGGD defined by the following:

$$f_2(x; \gamma_2, \beta_{l,2}, \beta_{r,2}) = \begin{cases} \frac{\gamma_2}{(\beta_{l,2} + \beta_{r,2})\Gamma\left(\frac{1}{\gamma_2}\right)} e^{\frac{|x|^{\gamma_2}}{\beta_{l,2}^{\gamma_2}}}, & \forall x \leq 0 \\ \frac{\gamma_2}{(\beta_{l,2} + \beta_{r,2})\Gamma\left(\frac{1}{\gamma_2}\right)} e^{-\frac{|x|^{\gamma_2}}{\beta_{r,2}^{\gamma_2}}}, & \forall x > 0 \end{cases}$$

where:
$\gamma_2$ is a first down-sampled AGGD feature of the plurality of first down-sampled AGGD features,
$\beta_{l,2}$ is a second down-sampled AGGD feature of the plurality of second down-sampled AGGD features, and
$\beta_{r,2}$ is a third down-sampled AGGD feature of the plurality of third down-sampled AGGD features; and
generating a plurality of mean down-sampled AGGD features by generating each of the plurality of mean down-sampled AGGD features according to an operation defined by the following:

$$\eta_2 = (\beta_{r,2} - \beta_{l,2}) \frac{\Gamma\left(\frac{2}{\gamma, 2}\right)}{\Gamma\left(\frac{1}{\gamma, 2}\right)}$$

where $\eta_2$ is a mean down-sampled AGGD feature of the plurality of mean down-sampled AGGD features associated with a respective down-sampled pair-wise product set, the plurality of mean down-sampled AGGD features associated with the third feature set;
generating a fourth feature set of the plurality of feature sets, comprising:
obtaining a mean luminance feature by averaging the $m^{th}$ luminance channel, the mean luminance feature associated with the fourth feature set; and
obtaining a standard deviation luminance feature by obtaining a standard deviation of the $m^{th}$ luminance channel, the standard deviation luminance feature associated with the fourth feature set;

generating a fifth feature set of the plurality of feature sets, comprising:
  obtaining a first mean chrominance feature by averaging a first chrominance channel of the $m^{th}$ video frame, the first mean chrominance feature associated with the fifth feature set;
  obtaining a first standard deviation chrominance feature by obtaining a standard deviation of the first chrominance channel, the first standard deviation chrominance channel associated with the fifth feature set;
  obtaining a second mean chrominance feature by averaging a second chrominance channel of the $m^{th}$ video frame, the second mean chrominance feature associated with the fifth feature set; and
  obtaining a second standard deviation chrominance feature by obtaining a standard deviation of the second chrominance channel, the second standard deviation chrominance channel associated with the fifth feature set;
generating a sixth feature set of the plurality of feature sets, comprising:
  obtaining a first colorfulness feature map according to an operation defined by the following:

$$rg = R - G$$

where:
    rg is the first colorfulness feature map,
    R is a red channel of the $m^{th}$ video frame, and
    G is a green channel of the $m^{th}$ video frame;
  obtaining a second colorfulness feature map according to an operation defined by the following:

$$yb = 0.5(R+G) - B$$

where:
    yb is the second colorfulness feature map, and
    B is a blue channel of the $m^{th}$ video frame;
  obtaining a first mean colorfulness feature by averaging the first colorfulness feature map, the first mean colorfulness feature associated with the sixth feature set;
  obtaining a first standard deviation colorfulness feature by obtaining a standard deviation of the first colorfulness feature map, the first standard deviation colorfulness feature associated with the sixth feature set;
  obtaining a second mean colorfulness feature by averaging the second colorfulness feature map, the second mean colorfulness feature associated with the sixth feature set;
  obtaining a second standard deviation colorfulness feature by obtaining a standard deviation of the second colorfulness feature map, the second standard deviation colorfulness feature associated with the sixth feature set;
  obtaining a third mean colorfulness feature according to an operation defined by the following:

$$\mu_{yrgb} = \sqrt{\mu_{rg}^2 + \mu_{yb}^2}$$

where:
    $\mu_{yrgb}$ is the third mean colorfulness feature associated with the sixth feature set,
    $\mu_{rg}$ is the first mean colorfulness feature; and
    $\mu_{yb}$ is the second mean colorfulness feature;
  obtaining a third standard deviation colorfulness feature according to an operation defined by the following:

$$\sigma_{yrgb} = \sqrt{\sigma_{rg}^2 + \sigma_{yb}^2}$$

where:
    $\sigma_{yrgb}$ is the third standard deviation colorfulness feature associated with the sixth feature set,
    $\sigma_{rg}$ is the first standard deviation colorfulness feature, and
    $\sigma_{yb}$ is the second standard deviation colorfulness feature; and
  obtaining an overall colorfulness feature according to an operation defined by:

$$M_{yrgb} = \sigma_{yrgb} + 0.3\mu_{yrgb}, \qquad \text{Equation (22)}$$

where $M_{yrgb}$ is the overall colorfulness feature associated with the sixth feature set; and
generating a seventh feature set of the plurality of feature sets, comprising:
  obtaining a difference luminance channel by subtracting an $(m-1)^{th}$ luminance channel of an $(m-1)^{th}$ video frame from the $m^{th}$ luminance channel;
  obtaining a mean temporal feature by averaging the difference luminance channel, the mean temporal feature associated with the seventh feature set; and
  obtaining a standard deviation temporal feature by obtaining a standard deviation of the difference luminance channel, the standard deviation temporal feature associated with the seventh feature set.

6. The method of claim 1, further comprising training the neural network prior to repeating the first iterative process, training the neural network comprising:
  initializing the neural network by a plurality of initial weights; and
  repeating a second iterative process until a termination condition is satisfied, the second iterative process comprising:
    generating a plurality of updated weights by feeding a training video of a plurality of training videos to the neural network; and
    replacing the plurality of initial weights with the plurality of updated weights.

7. The method of claim 6, wherein generating the plurality of updated weights comprises:
  repeating a third iterative process M times, an $m^{th}$ iteration of the third iterative process comprising:
    generating an $m^{th}$ training frame-level feature set associated with an $m^{th}$ training video frame of a plurality of training video frames, the plurality of training video frames associated with the training video;
    generating a first training recurrent output based on a zeroth training recurrent output by feeding a first training frame-level feature set to the recurrent neural network, the zeroth training recurrent output equal to the zero vector; and
    generating an $m^{th}$ training recurrent output based on an $(m-1)^{th}$ training recurrent output by feeding the $m^{th}$ training frame-level feature set to the recurrent neural network;
  extracting a training score distribution for the plurality of scores associated with the training video from an $M^{th}$ training recurrent output by feeding the $M^{th}$ training recurrent output to a first fully connected layer of a plurality of fully connected layers associated with the neural network;
  generating a plurality of adjustment values by minimizing a loss function, each of the plurality of adjustment values associated with a respective initial weight of the plurality of initial weights; and obtaining the plurality of updated weights by adding each of the plurality of adjustment values to a respective initial weight of the plurality of initial weights.

8. The method of claim 7, wherein repeating the second iterative process comprises repeating the second iterative process until a value of the loss function becomes lower than a predefined threshold, the loss function defined by the following:

$$L(p, q) = \begin{cases} \sum_{m=1}^{M} p_m \log\left(\frac{p_m}{q_m}\right), \text{ or} \\ \sum_{m=1}^{M} |p_m - q_m| \end{cases}$$

where:
L(.,.) is the loss function,
p is the training distribution,
q is a ground truth distribution associated with the training image,
$p_m$ is an $m^{th}$ component of the training distribution,
$q_m$ is an $m^{th}$ component of the ground truth distribution, and
M is a number of the plurality of scores.

9. The method of claim 1, wherein:
feeding the first frame-level feature set to the recurrent neural network comprises feeding the first frame-level feature set to a long short-term memory (LSTM) network, the LSTM network comprising a plurality of LSTM layers; and
feeding the $m^{th}$ frame-level feature set to the recurrent neural network comprises feeding the $m^{th}$ frame-level feature set to the LSTM network.

10. The method of claim 1, wherein extracting the score distribution from the plurality of feature sets comprises:
generating a first fully connected output of a plurality of fully connected outputs by applying the $M^{th}$ recurrent output to a first fully connected layer of a plurality of fully connected layers; and
generating a $k^{th}$ fully connected output of the plurality of fully connected outputs by applying a $(k-1)^{th}$ fully connected output of a plurality of fully connected outputs to a $k^{th}$ fully connected layer of the plurality of fully connected layers;
wherein applying the $(k-1)^{th}$ fully connected output to the $k^{th}$ fully connected layer comprises implementing an $(N+k)^{th}$ non-linear activation function on the $(k-1)^{th}$ fully connected output, an $(N+L)^{th}$ non-linear activation function comprising a softmax function, where 1≤k≤L, N is a number of a plurality of convolutional layers associated with the neural network, and L is a number of the plurality of fully connected layers, a zeroth fully connected output comprises the plurality of feature sets, and an $L^{th}$ fully connected output of the plurality of fully connected outputs comprises the score distribution.

11. A system for quality assessment of a video utilizing a neural network, the system comprising:
a memory having processor-readable instructions stored therein; and
one or more processors configured to access the memory and execute the processor-readable instructions, which, when executed by the one or more processors configures the one or more processors to perform a method, the method comprising:
repeating, utilizing one or more processors, a first iterative process M times where M is a number of the plurality of video frames, an $m^{th}$ iteration of the first iterative process, where m ∈ [1,M], comprising:
generating an $m^{th}$ frame-level feature set associated with an $m^{th}$ video frame of the plurality of video frames, the $m^{th}$ frame-level feature set comprising a plurality of feature sets;
generating a first recurrent output of a plurality of recurrent outputs associated with a recurrent neural network based on a zeroth recurrent output of the plurality of recurrent outputs, the zeroth recurrent output equal to a zero vector comprising zero elements, generating the first recurrent output comprising feeding a first frame-level feature set to the recurrent neural network, the recurrent neural network associated with the neural network; and
generating an $m^{th}$ recurrent output of the plurality of recurrent outputs based on an $(m-1)^{th}$ recurrent output of the plurality of recurrent outputs by feeding the $m^{th}$ frame-level feature set to the recurrent neural network; and
extracting, utilizing the one or more processors, a score distribution for a plurality of scores associated with the video from an $M^{th}$ recurrent output of the plurality of recurrent outputs.

12. The system of claim 11, wherein generating the $m^{th}$ frame-level feature set comprises:
feeding the $m^{th}$ video frame to a first convolutional layer of a plurality of convolutional layers associated with the neural network;
generating a second plurality of feature maps by applying the $m^{th}$ video frame to the first convolutional layer;
generating an $(i+1)^{th}$ plurality of feature maps by applying an $i^{th}$ plurality of feature maps to an $i^{th}$ convolutional layer of the plurality of convolutional layers, where 1≤i≤N and N is a number of the plurality of convolutional layers; and
obtaining an $(i+1)^{th}$ feature set of the plurality of feature sets from the $(i+1)^{th}$ plurality of feature maps.

13. The system of claim 12, wherein generating the $(i+1)^{th}$ plurality of feature maps comprises:
generating an $(i+1)^{th}$ plurality of filtered feature maps by applying an $i^{th}$ plurality of filters on the $i^{th}$ plurality of feature maps, the $i^{th}$ plurality of filters associated with the $i^{th}$ convolutional layer;
generating an $(i+1)^{th}$ plurality of normalized feature maps by applying a batch normalization process associated with the $i^{th}$ convolutional layer on the $(i+1)^{th}$ plurality of filtered feature maps, each normalized feature map of the $(i+1)^{th}$ plurality of normalized feature maps associated with a respective filtered feature map of the $(i+1)^{th}$ plurality of filtered feature maps;
generating an $(i+1)^{th}$ plurality of non-linear feature maps by implementing an $i^{th}$ non-linear activation function associated with the $i^{th}$ convolutional layer on each of the $(i+1)^{th}$ plurality of normalized feature maps; and
obtaining the $(i+1)^{th}$ plurality of feature maps by applying a max pooling associated with the $i^{th}$ convolutional layer on each of the $(i+1)^{th}$ plurality of non-linear feature maps.

14. The system of claim 13, wherein obtaining the $(i+1)^{th}$ feature set comprises applying a global average pooling on the $(i+1)^{th}$ plurality of non-linear feature maps, the global average pooling comprising obtaining an average of each non-linear feature map of the $(i+1)^{th}$ plurality of non-linear feature maps.

15. The system of claim 11, wherein generating the $m^{th}$ frame-level feature set comprises generating the plurality of feature sets by:
   generating a first feature set of the plurality of feature sets, comprising:
      generating a horizontal gradient feature map by applying a horizontal gradient filter of a size $r_1 \times p_1$ on an $m^{th}$ luminance channel of the $m^{th}$ video frame, where $r_1$ and $p_1$ are positive integers;
      generating a vertical gradient feature map by applying a vertical gradient filter of a size $r_1 \times p_1$ on the $m^{th}$ luminance channel;
      obtaining a mean horizontal gradient feature by averaging the horizontal gradient feature map, the mean horizontal gradient feature associated with the first feature set;
      obtaining a standard deviation horizontal gradient feature by obtaining a standard deviation of the horizontal gradient feature map, the standard deviation horizontal gradient feature associated with the first feature set;
      obtaining a mean vertical gradient feature by averaging the vertical gradient feature map, the mean vertical gradient feature associated with the first feature set; and
      obtaining a standard deviation vertical gradient feature by obtaining a standard deviation of the vertical gradient feature map, the standard deviation vertical gradient feature associated with the first feature set;
   generating a second feature set of the plurality of feature sets, comprising:
      generating a Laplacian feature map by applying a Laplacian filter of size $r_2 \times p_2$ on the $m^{th}$ luminance channel;
      generating a mean Laplacian feature by averaging the Laplacian feature map, the mean Laplacian feature associated with the second feature set; and
      generating a standard deviation Laplacian feature by obtaining a standard deviation of the Laplacian feature map, the standard deviation Laplacian feature associated with the second feature set;
   generating a third feature set of the plurality of feature sets, comprising:
      generating a plurality of mean subtracted contrast normalized (MSCN) values by generating an $(r,p)^{th}$ MSCN value of the plurality of MSCN values according to an operation defined by the following:

$$\hat{F}_1(r, p) = \frac{F_1(r, p) - \mu_1(r, p)}{\sigma_1(r, p) + C_1}$$

where:
   $\hat{F}_1(r,p)$ is the $(r,p)^{th}$ MSCN value where $r \in [1,H]$, $p \in [1,W]$, H is a height of the $m^{th}$ video frame, W is a width of the $m^{th}$ video frame, and $C_1$ is a first constant number,
   $F_1(r,p)$ is an $(r,p)^{th}$ luminance value of a plurality of luminance values associated with the $m^{th}$ luminance channel,
   $\mu_1(r,p)$ is an $(r,p)^{th}$ first weighted local mean of a plurality of first weighted local means defined by the following:

$$\mu_1(r, p) = \sum_{k=-K_1}^{K_1} \sum_{l=-L_1}^{L_1} w_{k,l} F_1(r+k, p+l)$$

where:
   $K_1$ is a height of a first Gaussian filter,
   $L_1$ is a width of the first Gaussian filter, and
   $w_{k,l}$ is a $(k,l)^{th}$ weight associated with the first Gaussian filter defined by the following:

$$w_{k,l} = \frac{e^{-a_1(k^2+l^2)}}{\sum_{k=-K_1}^{K_1} \sum_{l=-L_1}^{L_1} e^{-a_1(k^2+l^2)}}$$

where $a_1$ is a second constant number, and
   $\sigma_1(r,p)$ is an $(r,p)^{th}$ first weighted local standard deviation of a plurality of first weighted local standard deviations defined by the following:

$$\sigma_1(r, p) = \sqrt{\sum_{k=-K_1}^{K_1} \sum_{l=-L_1}^{L_1} w_{k,l} [F_1(r+k, p+l) - \mu_1(r, p)]^2}$$

generating a first generalized Gaussian distribution (GGD) feature and a second GGD feature by applying a moment-matching method on the plurality of MSCN values, the first GGD feature and the second GGD feature associated with the third feature set, the moment-matching method comprising a GGD defined by the following:

$$f_1(x; \alpha_1, \beta_1) = \frac{\alpha_1}{2\beta_1 \Gamma\left(\frac{1}{\alpha_1}\right)} e^{-\frac{|x|^{\alpha_1}}{\beta_1^{\alpha_1}}}$$

where:
   $f_1(.;.,.)$ is the GGD,
   $\Gamma(.)$ is a gamma function,
   $\alpha_1$ is the first GDD feature, and
   $\beta_1$ is the second GDD feature;
generating a plurality of pair-wise product sets by generating a plurality of pair-wise product values associated with a respective pair-wise product set of the plurality of pair-wise product sets, generating the plurality of pair-wise product values comprising generating an $(r,p,\tilde{r},\tilde{p})^{th}$ pair-wise product value of the plurality of pair-wise product values according to an operation defined by the following:

$$G_1(r,p,\tilde{r},\tilde{p}) = \hat{F}_1(r,p) \times \hat{F}_1(\tilde{r},\tilde{p})$$

where:
   $G_1(r,p,\tilde{r},\tilde{p})$ is the $(r,p,\tilde{r},\tilde{p})^{th}$ pair-wise product value, and
   $|r-\tilde{r}|+|p-\tilde{p}|=1$, $\tilde{r} \in [1,H]$, and $\tilde{p} \in [1,W]$;
generating a plurality of first asymmetric GGD (AGGD) features, a plurality of second AGGD features, and a plurality of third AGGD features by applying the moment-matching method on the plurality of pair-wise product sets, each of the plurality of first AGGD features, the plurality of second AGGD features, and the plurality of third AGGD features associated with a respective pair-wise product set of the plurality of pair-wise product sets, wherein the plurality of first AGGD features, the plurality of second AGGD features, and the plurality of third AGGD features are associated with the third feature set, the moment-matching method comprising an AGGD defined by the following:

$$f_2(x; \gamma_1, \beta_{l,1}, \beta_{r,1}) = \begin{cases} \dfrac{\gamma_1}{(\beta_{l,1}+\beta_{r,1})\Gamma\left(\dfrac{1}{\gamma_1}\right)} e^{-\frac{|x|^{\gamma_1}}{\beta_l^{\gamma_1}}}, & \forall x \leq 0 \\ \dfrac{\gamma_1}{(\beta_{l,1}+\beta_{r,1})\Gamma\left(\dfrac{1}{\gamma_1}\right)} e^{-\frac{|x|^{\gamma_1}}{\beta_{r,1}^{\gamma_1}}}, & \forall x > 0 \end{cases}$$

where:
$f_2(.;.,.,.)$ is the AGGD,
$\gamma_1$ is a first AGGD feature of the plurality of first AGGD features,
$\beta_{l,1}$ is a second AGGD feature of the plurality of second AGGD features, and
$\beta_{r,1}$ is a third AGGD feature of the plurality of third AGGD features;
generating a plurality of mean AGGD features by generating each of the plurality of mean AGGD features according to an operation defined by the following:

$$\eta_1 = (\beta_{r,1}-\beta_{l,1})\dfrac{\Gamma\left(\dfrac{2}{\gamma_1}\right)}{\Gamma\left(\dfrac{1}{\gamma_1}\right)}$$

where $\eta_1$ is a mean AGGD feature of the plurality of mean AGGD features associated with a respective pair-wise product set, the plurality of mean AGGD features associated with the third feature set;
generating an $m^{th}$ down-sampled luminance channel by down sampling the $m^{th}$ luminance channel with a factor of 2;
generating a plurality of down-sampled MSCN values by generating a $(t,s)^{th}$ down-sampled MSCN value of the plurality of down-sampled MSCN values according to an operation defined by the following:

$$\hat{F}_2(t,s) = \dfrac{F_2(t,s) - \mu_2(t,s)}{\sigma_2(t,s) + C_2}$$

where:
$\hat{F}_2(t,s)$ is the $(t,s)^{th}$ down-sampled MSCN value, $$t \in \left[1, \left\lfloor\dfrac{H}{2}\right\rfloor\right], s \in \left[1, \left\lfloor\dfrac{W}{2}\right\rfloor\right],$$

and $C_2$ is a third constant number,
$F_2(r,p)$ is a $(t,s)^{th}$ down-sampled luminance value of a plurality of down-sampled luminance values associated with the $m^{th}$ down-sampled luminance channel, $\mu_2(t,s)$ is a $(t,s)^{th}$ second weighted local mean of a plurality of second weighted local means defined by the following:

$$\mu_2(t,s) = \sum_{k=-K_2}^{K_2} \sum_{l=-L_2}^{L_2} g_{k,l} F_2(t+k, s+l)$$

where:
$K_2$ is a height of a second Gaussian filter,
$L_2$ is a width of the second Gaussian filter, and
$g_{k,l}$ is a $(k,l)^{th}$ weight associated with a second Gaussian filter defined by the following:

$$g_{k,l} = \dfrac{e^{-a_2(k^2+l^2)}}{\sum_{k=-K}^{K}\sum_{l=-L}^{L} e^{-a_2(k^2+l^2)}}$$

where $a_2$ is a fourth constant number, and
$\sigma_2(t,s)$ is a $(t,s)^{th}$ second weighted local standard deviation of a plurality of second weighted local standard deviations defined by the following:

$$\sigma_2(t,s) = \sqrt{\sum_{k=-K}^{K}\sum_{l=-L}^{L} g_{k,l}[F_2(t+k, s+l) - \mu_2(t,s)]^2}$$

generating a first down-sampled GGD feature and a second down-sampled GGD feature by applying the moment-matching method on the plurality of down-sampled MSCN values, the first down-sampled GGD feature and the second down-sampled GGD feature associated with the third feature set, the moment-matching method comprising the GGD defined by the following:

$$f_1(x; \alpha_2, \beta_2) = \dfrac{\alpha_2}{2\beta_2 \Gamma\left(\dfrac{1}{\alpha_2}\right)} e^{-\frac{|x|^{\alpha_2}}{\beta_2^{\alpha_2}}}$$

where:
$\alpha_2$ is the first down-sampled GDD feature, and
$\beta_2$ is the second down-sampled GDD feature;
generating a plurality of down-sampled pair-wise product sets by generating a plurality of down-sampled pair-wise product values associated with a respective down-sampled pair-wise product set of the plurality of down-sampled pair-wise product sets, generating the plurality of down-sampled pair-wise product values comprising generating a $(t,s,\tilde{t},\tilde{s})^{th}$ down-sampled pair-wise product value of the plurality of down-sampled pair-wise product values according to an operation defined by the following:

$$G_2(t,s,\tilde{t},\tilde{s}) = \hat{F}_2(t,s) \times \hat{F}_2(\tilde{t},\tilde{s})$$

where:
$G_2(t,s,\tilde{t},\tilde{s})$ is the $(t,s,\tilde{t},\tilde{s})^{th}$ pair-wise product value, and
$|r-\tilde{r}|+|p-\tilde{p}|=1$, $\tilde{r} \in [1,H]$, and $\tilde{p} \in [1,W]$; and $$|t-\tilde{t}|+|s-\tilde{s}|=1, \tilde{t} \in \left[1, \left\lfloor \frac{H}{2} \right\rfloor\right], \text{ and } \tilde{s} \in \left[1, \left\lfloor \frac{W}{2} \right\rfloor\right];$$

generating a plurality of first down-sampled AGGD features, a plurality of second down-sampled AGGD features, and a plurality of third down-sampled AGGD features by applying the moment-matching method on the plurality of down-sampled pair-wise product sets, each of the plurality of first down-sampled AGGD features, the plurality of second down-sampled AGGD features, and the plurality of third down-sampled AGGD features associated with a respective down-sampled pair-wise product set of the plurality of down-sampled pair-wise product sets, wherein the plurality of first down-sampled AGGD features, the plurality of second down-sampled AGGD features, and the plurality of third down-sampled AGGD features are associated with the third feature set, the moment-matching method comprising the AGGD defined by the following:

$$f_2(x; \gamma_2, \beta_{l,2}, \beta_{r,2}) = \begin{cases} \dfrac{\gamma_2}{(\beta_{l,2}+\beta_{r,2})\Gamma\left(\dfrac{1}{\gamma_2}\right)} e^{-\dfrac{|x|^{\gamma_2}}{\beta_{l,2}^{\gamma_2}}}, & \forall x \leq 0 \\[2ex] \dfrac{\gamma_2}{(\beta_{l,2}+\beta_{r,2})\Gamma\left(\dfrac{1}{\gamma_2}\right)} e^{-\dfrac{|x|^{\gamma_2}}{\beta_{r,2}^{\gamma_2}}}, & \forall x > 0 \end{cases}$$

where:
$\gamma_2$ is a first down-sampled AGGD feature of the plurality of first down-sampled AGGD features,
$\beta_{l,2}$ is a second down-sampled AGGD feature of the plurality of second down-sampled AGGD features, and
$\beta_{r,2}$ is a third down-sampled AGGD feature of the plurality of third down-sampled AGGD features; and generating a plurality of mean down-sampled AGGD features by generating each of the plurality of mean down-sampled AGGD features according to an operation defined by the following:

$$\eta_2 = (\beta_{r,2} - \beta_{l,2}) \frac{\Gamma\left(\dfrac{2}{\gamma,2}\right)}{\Gamma\left(\dfrac{1}{\gamma,2}\right)}$$

where $\eta_2$ is a mean down-sampled AGGD feature of the plurality of mean down-sampled AGGD features associated with a respective down-sampled pair-wise product set, the plurality of mean down-sampled AGGD features associated with the third feature set;

generating a fourth feature set of the plurality of feature sets, comprising:
obtaining a mean luminance feature by averaging the $m^{th}$ luminance channel, the mean luminance feature associated with the fourth feature set; and
obtaining a standard deviation luminance feature by obtaining a standard deviation of the $m^{th}$ luminance channel, the standard deviation luminance feature associated with the fourth feature set;

generating a fifth feature set of the plurality of feature sets, comprising:
obtaining a first mean chrominance feature by averaging a first chrominance channel of the $m^{th}$ video frame, the first mean chrominance feature associated with the fifth feature set;
obtaining a first standard deviation chrominance feature by obtaining a standard deviation of the first chrominance channel, the first standard deviation chrominance channel associated with the fifth feature set;
obtaining a second mean chrominance feature by averaging a second chrominance channel of the $m^{th}$ video frame, the second mean chrominance feature associated with the fifth feature set; and
obtaining a second standard deviation chrominance feature by obtaining a standard deviation of the second chrominance channel, the second standard deviation chrominance channel associated with the fifth feature set;

generating a sixth feature set of the plurality of feature sets, comprising:
obtaining a first colorfulness feature map according to an operation defined by the following:

$$rg = R - G$$

where:
rg is the first colorfulness feature map,
R is a red channel of the $m^{th}$ video frame, and
G is a green channel of the $m^{th}$ video frame;
obtaining a second colorfulness feature map according to an operation defined by the following:

$$yb = 0.5(R+G) - B$$

where:
yb is the second colorfulness feature map, and
B is a blue channel of the $m^{th}$ video frame;
obtaining a first mean colorfulness feature by averaging the first colorfulness feature map, the first mean colorfulness feature associated with the sixth feature set;
obtaining a first standard deviation colorfulness feature by obtaining a standard deviation of the first colorfulness feature map, the first standard deviation colorfulness feature associated with the sixth feature set;
obtaining a second mean colorfulness feature by averaging the second colorfulness feature map, the second mean colorfulness feature associated with the sixth feature set;
obtaining a second standard deviation colorfulness feature by obtaining a standard deviation of the second colorfulness feature map, the second standard deviation colorfulness feature associated with the sixth feature set;
obtaining a third mean colorfulness feature according to an operation defined by the following:

$$\mu_{yrgb} = \sqrt{\mu_{rg}^2 + \mu_{yb}^2}$$

where:
$\mu_{yrgb}$ is the third mean colorfulness feature associated with the sixth feature set,
$\mu_{rg}$ is the first mean colorfulness feature; and $\mu_{yb}$ is the second mean colorfulness feature;

obtaining a third standard deviation colorfulness feature according to an operation defined by the following:

$$\sigma_{yrgb} = \sqrt{\sigma_{rg}^2 + \sigma_{yb}^2}$$

where:
- $\sigma_{yrgb}$ is the third standard deviation colorfulness feature associated with the sixth feature set,
- $\sigma_{rg}$ is the first standard deviation colorfulness feature, and
- $\sigma_{yb}$ is the second standard deviation colorfulness feature; and obtaining an overall colorfulness feature according to an operation defined by:

$$M_{yrgb} = \sigma_{yrgb} + 0.3\mu_{yrgb}$$

where $M_{yrgb}$ is the overall colorfulness feature associated with the sixth feature set; and generating a seventh feature set of the plurality of feature sets, comprising:
- obtaining a difference luminance channel by subtracting an $(m-1)^{th}$ luminance channel of an $(m-1)^{th}$ video frame from the $m^{th}$ luminance channel;
- obtaining a mean temporal feature by averaging the difference luminance channel, the mean temporal feature associated with the seventh feature set; and
- obtaining a standard deviation temporal feature by obtaining a standard deviation of the difference luminance channel, the standard deviation temporal feature associated with the seventh feature set.

16. The system of claim 11, wherein the method further comprises training the neural network prior to repeating the first iterative process, training the neural network comprising:
- initializing the neural network by a plurality of initial weights; and
- repeating a second iterative process until a value of the loss function becomes lower than a predefined threshold, the loss function defined by the following:

$$L(p, q) = \begin{cases} \sum_{m=1}^{M} p_m \log\left(\frac{p_m}{q_m}\right), \text{ or} \\ \sum_{m=1}^{M} |p_m - q_m| \end{cases}$$

where:
- $L(.,.)$ is the loss function,
- p is the training distribution,
- q is a ground truth distribution associated with the training image,
- $p_m$ is an $m^{th}$ component of the training distribution,
- $q_m$ is an $m^{th}$ component of the ground truth distribution, and
- M is a number of the plurality of scores;

wherein the second iterative process comprises:
- generating a plurality of updated weights by feeding a training video of a plurality of training videos to the neural network; and
- replacing the plurality of initial weights with the plurality of updated weights.

17. The system of claim 16, wherein generating the plurality of updated weights comprises:
repeating a third iterative process M times, an $m^{th}$ iteration of the third iterative process comprising:
- generating an $m^{th}$ training frame-level feature set associated with an $m^{th}$ training video frame of a plurality of training video frames, the plurality of training video frames associated with the training video;
- generating a first training recurrent output based on a zeroth training recurrent output by feeding a first training frame-level feature set to the recurrent neural network, the zeroth training recurrent output equal to the zero vector; and
- generating an $m^{th}$ training recurrent output based on an $(m-1)^{th}$ training recurrent output by feeding the $m^{th}$ training frame-level feature set to the recurrent neural network;

extracting a training score distribution for the plurality of scores associated with the training video from an $M^{th}$ training recurrent output by feeding the $M^{th}$ training recurrent output to a first fully connected layer of a plurality of fully connected layers associated with the neural network;

generating a plurality of adjustment values by minimizing a loss function, each of the plurality of adjustment values associated with a respective initial weight of the plurality of initial weights; and obtaining the plurality of updated weights by adding each of the plurality of adjustment values to a respective initial weight of the plurality of initial weights.

18. The system of claim 11, wherein:
feeding the first frame-level feature set to the recurrent neural network comprises feeding the first frame-level feature set to a long short-term memory (LSTM) network, the LSTM network comprising a plurality of LSTM layers; and
feeding the $m^{th}$ frame-level feature set to the recurrent neural network comprises feeding the $m^{th}$ frame-level feature set to the LSTM network.

19. The system of claim 11, wherein extracting the score distribution from the plurality of feature sets comprises:
generating a first fully connected output of a plurality of fully connected outputs by applying the $M^{th}$ recurrent output to a first fully connected layer of a plurality of fully connected layers; and
generating a $k^{th}$ fully connected output of the plurality of fully connected outputs by applying a $(k-1)^{th}$ fully connected output of a plurality of fully connected outputs to a $k^{th}$ fully connected layer of the plurality of fully connected layers;
wherein applying the $(k-1)^{th}$ fully connected output to the $k^{th}$ fully connected layer comprises implementing an $(N+k)^{th}$ non-linear activation function on the $(k-1)^{th}$ fully connected output, an $(N+L)^{th}$ non-linear activation function comprising a softmax function, where $1 \leq k \leq L$, N is a number of a plurality of convolutional layers associated with the neural network, and L is a number of the plurality of fully connected layers, a zeroth fully connected output comprises the plurality of feature sets, and an $L^{th}$ fully connected output of the plurality of fully connected outputs comprises the score distribution.

* * * * *